(12) United States Patent
Yahata et al.

(10) Patent No.: US 8,051,100 B2
(45) Date of Patent: Nov. 1, 2011

(54) RECORDING MEDIUM, RECORDING DEVICE, AND PLAYBACK DEVICE FOR USE IN INDIVIDUAL SALES AND METHOD THEREFOR

(75) Inventors: Hiroshi Yahata, Osaka (JP); Wataru Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 12/336,010

(22) Filed: Dec. 16, 2008

(65) Prior Publication Data

US 2009/0228520 A1 Sep. 10, 2009

Related U.S. Application Data

(60) Provisional application No. 61/014,303, filed on Dec. 17, 2007.

(51) Int. Cl.
*G06F 17/30* (2006.01)

(52) U.S. Cl. ........ 707/791; 707/823; 707/828; 707/829; 707/831; 707/913; 707/914; 707/915; 707/916

(58) Field of Classification Search .................. 707/791, 707/913, 914, 915, 916, 828, 829, 823, 831
See application file for complete search history.

(56) References Cited

U.S. PATENT DOCUMENTS

| | | | |
|---|---|---|---|
| 6,088,506 A | 7/2000 | Yoshio et al. | |
| 6,266,478 B1 | 7/2001 | Yoshio et al. | |
| 6,567,612 B2 | 5/2003 | Yoshio et al. | |
| 6,735,628 B2 * | 5/2004 | Eyal | 709/223 |
| 6,865,431 B1 * | 3/2005 | Hirota et al. | 700/94 |
| 7,346,270 B2 | 3/2008 | Yoshio et al. | |
| 7,885,512 B2 * | 2/2011 | Takashima et al. | 386/241 |
| 2002/0090208 A1 | 7/2002 | Hatanaka | |
| 2002/0147728 A1 * | 10/2002 | Goodman et al. | 707/104.1 |
| 2002/0186960 A1 | 12/2002 | Hatanaka | |
| 2002/0191962 A1 | 12/2002 | Hatanaka | |
| 2003/0016950 A1 * | 1/2003 | Ando et al. | 386/95 |
| 2004/0078383 A1 * | 4/2004 | Mercer et al. | 707/102 |
| 2004/0228618 A1 * | 11/2004 | Yoo et al. | 386/95 |
| 2004/0252198 A1 | 12/2004 | Hatanaka | |
| 2005/0175326 A1 * | 8/2005 | Kim et al. | 386/126 |
| 2005/0192982 A1 * | 9/2005 | Takahashi | 707/100 |
| 2005/0259968 A1 * | 11/2005 | Tsumagari et al. | 386/95 |
| 2006/0007821 A1 * | 1/2006 | Takashima | 369/47.13 |
| 2006/0083138 A1 * | 4/2006 | Kubo | 369/53.2 |
| 2006/0098936 A1 | 5/2006 | Ikeda et al. | |
| 2006/0159366 A1 * | 7/2006 | Darwish | 382/276 |
| 2006/0193608 A1 * | 8/2006 | Kim | 386/126 |
| 2007/0025694 A1 * | 2/2007 | Takashima et al. | 386/95 |
| 2007/0027873 A1 * | 2/2007 | Factor et al. | 707/9 |
| 2007/0083485 A1 * | 4/2007 | Hashimoto | 707/1 |

(Continued)

FOREIGN PATENT DOCUMENTS

JP 09-282848 10/1997

(Continued)

*Primary Examiner* — Thanh-Ha Dang

(74) *Attorney, Agent, or Firm* — Wenderoth, Lind & Ponack, L.L.P.

(57) ABSTRACT

A recording medium has a hierarchical directory structure. In the directory structure, a ROOT/BDMV directory and a MoDESTxx/BDMV directory are located below a root directory. The ROOT/BDMV directory contains a BD-J application that constitutes a FirstPlayback title. The BD-J application is a program to be first executed by a playback device upon loading of the recording medium to a playback device. When executed, the BD-J application causes the playback device to display a menu for receiving a user operation of selecting the BDMV directory and executes a root change function. The root change function is to cause the playback device to recognize the selected MoDESTxx directory as a virtual root directory.

12 Claims, 26 Drawing Sheets

U.S. PATENT DOCUMENTS

| | | | |
|---|---|---|---|
| 2007/0253679 A1* | 11/2007 | Tanaka et al. | 386/95 |
| 2007/0274680 A1* | 11/2007 | Ikeda et al. | 386/83 |
| 2007/0286575 A1* | 12/2007 | Oashi et al. | 386/95 |
| 2009/0003173 A1* | 1/2009 | Kim et al. | 369/94 |
| 2009/0060476 A1* | 3/2009 | Iwamoto et al. | 386/126 |
| 2010/0046923 A1 | 2/2010 | Ikeda et al. | |
| 2010/0046924 A1 | 2/2010 | Ikeda et al. | |

FOREIGN PATENT DOCUMENTS

| | | |
|---|---|---|
| JP | 10-177646 | 6/1998 |
| JP | 2001-110169 | 4/2001 |
| JP | 2002-042449 | 2/2002 |
| JP | 2006-109494 | 4/2006 |
| JP | 2008-204300 | 9/2008 |

* cited by examiner

Directory & File Structure After Purchase of Movies A1–A30

FIG. 7
Upper Half: Before Execution of MoDEST Root Change API
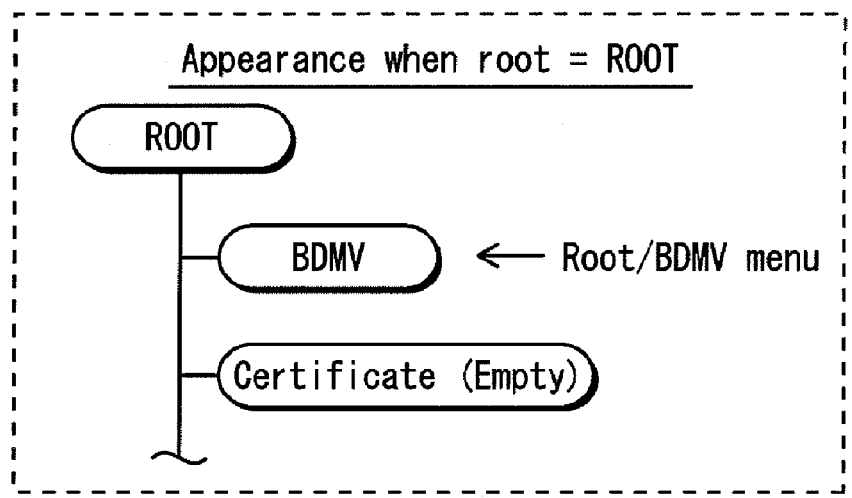
Lower Half: After Execution of MoDEST Root Change API
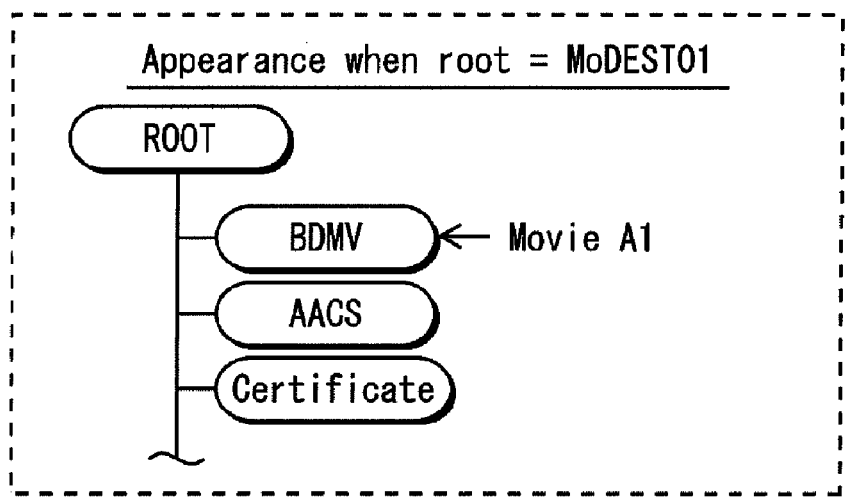

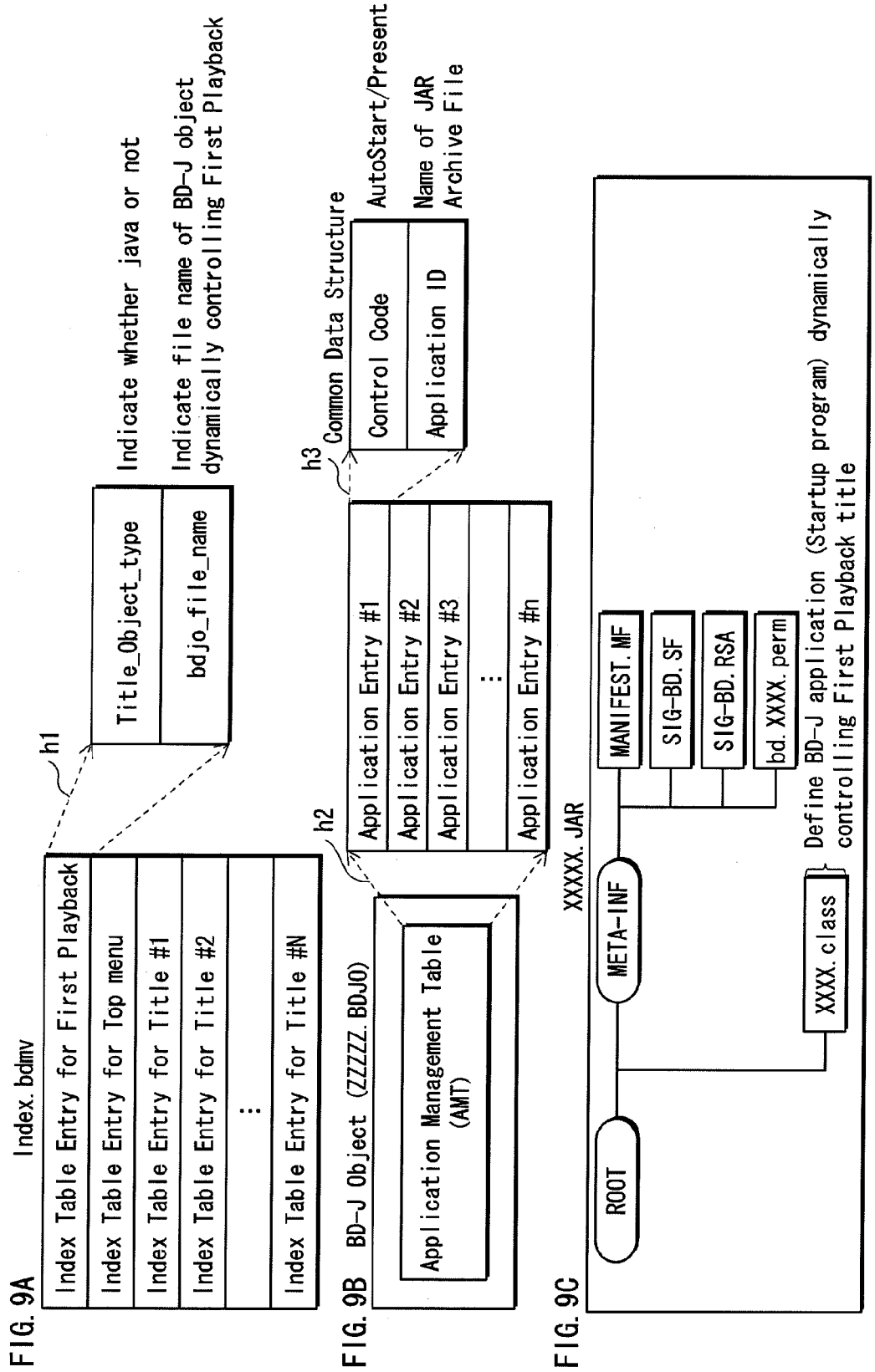

FIG. 10B Example of Display on MoD/EST Non-Compliant Player

FIG. 18

Merge Management Information (bumf.xml)

| 8.3 Format File Path on Removable Medium | File Path on VFS |
|---|---|
| 12345abc/12345678/90abcdef/00001.mpl | BDMV/PLAYLIST/00001.mpls |
| 12345abc/12345678/90abcdef/mo.bdm | BDMV/MovieObject.bdmv |
| 12345abc/12345678/90abcdef/00001.mts | BDMV/STREAM/00001.m2ts |

*Any file in MoDESTxx/BDMV directory is specified and merged in the same way as a file in ROOT/BDMV directory

FIG. 22

| Ranges of PID Values | Streams Assigned to Respective Ranges |
|---|---|
| 0x0100 | program_map |
| 0x1001 | PCR |
| 0x1011 | Primary Video Stream |
| 0x1100~0x111F | Primary Audio Stream |
| 0x1200~0x121F | PG Stream |
| 0x1400~0x141F | IG Stream |
| 0x1B00~0x1B1F | In_MUX_Secondary Video Stream |

FIG. 24

| Ranges of PID Values | Streams Assigned to Respective Ranges |
|---|---|
| 0x0100 | program_map |
| 0x1001 | PCR |
| 0x1200~0x121F | PG Stream |
| 0x1400~0x141F | IG Stream |
| 0x1A00~0x1A1F | Secondary Audio Stream |
| 0x1B00~0x1B1F | Secondary Video Stream |

RECORDING MEDIUM, RECORDING DEVICE, AND PLAYBACK DEVICE FOR USE IN INDIVIDUAL SALES AND METHOD THEREFOR

This application claims benefit to the provisional U.S. application 61/014,303, filed Dec. 17, 2007.

BACKGROUND OF THE INVENTION (1) Field of the Invention

The present invention relates to the technical field of recording of audiovisual contents (hereafter "AV contents.")

(2) Description of the Related Art

An AV content is defined by a combination of an audiovisual stream (hereafter "AV stream") and playback control information such as PlayList information. Generally, large-capacity removable mediums are used for recording AV contents. The storage capacity of a recent removable medium is increasing and it is said that a single layer Blu-ray disc will soon be able to store up to 25 GB and an 8-layer Blu-ray disc capable of storing up to 200 GB will soon be put into practical use. It is also expected that semiconductor memory cards having solid copyright protection function and being capable of storing multi-terabyte data may become available within five years.

Meanwhile, the advancement of coding technology is improving compression efficiency year-by-year, so that a two-hour movie may be encoded with MPEG-4 AVC with the bit rate of 8 Mbps or so to provide a sufficiently Hi-vision content. In this case, the data size of such a two-hour Hi-vision content is about 2×60×60×8 Mbits=7.2 GB. Which is to say, a single-layer 25 GB removable medium is capable of storing up to three two-hour Hi-vision contents. Similarly, a dual-layer 50 GB Blu-ray disc is capable of storing up to twelve Hi-vision contents each of which is one-hour long (i.e. twelve episodes corresponding to one television season).

Note that the techniques of recording AV contents each defined by an AV stream and PlayList information known in the art include the one disclosed in the following patent document.

Patent Document 1:
JP Patent Application Publication No. 9-282848 (JP Patent Application No. 8-83478)

SUMMARY OF THE INVENTION

Problems the Invention is Attempting to Solve

It should be noted here that read-only Blu-ray discs used for movie distribution (called "BD-ROMs") are required to meet detailed specifications, including the maximum number of AV streams and of playlists as well as the maximum data size of management information used to manage AV streams and playlists. For this reason, even if a removable medium has a sufficient capacity available, it is still not permitted to store a plurality of contents into a single removable medium, rather than into a plurality of BD-ROMs. The specifications of BD-ROM contents ensure that contents stored on BD-ROMs are duly played by a minimum standard hardware configuration. Suppose that the number of streams and/or playlists exceeds the maximum permissible number or the data size exceeds the maximum permissible size, correct playback by a playback device may not be ensured. More specifically, a typical playback device starts playback of an AV stream after reading PlayList information and stream information onto memory. Thus, if the number of AV streams and/or the data size of management information stored on a removable medium exceeds the upper limit that can be stored to the memory, the playback device can no longer be trusted to correctly play back the removable medium. For this reason, the playback device ejects such a removable medium to refuse playback.

For the above-stated reason, the demand for storing a plurality of contents into a single recording medium rather than into a plurality of BD-ROMs cannot be met, unless the hardware configuration of a playback device is somehow addressed to ensure correct playback of such a removable medium. In view of this, one may arrive at the idea of increasing the number of BDMV directories included in one removable medium.

Here, a "BDMV directory" is a standard directory for storing a plurality of pieces of PlayList information and a plurality of AV streams constituting contents. The playback device recognizes a plurality of AV streams and a plurality of pieces of PlayList information contained in the BDMV directory to execute playback control. Thus, one may think that a plurality of movies exceeding the predetermined maximum number can be stored into a single removable medium, by providing the removable medium with a plurality of BDMV directories and storing a plurality of AV streams and a plurality of pieces of PlayList information constituting the movies into the respective directories.

Unfortunately, however, this idea cannot be put into practice for another reason described below. That is, an existing BD-ROM player is normally provided with the functionality of automatically accessing the BDMV directory immediately below the root directory and starting playback of a title to be played first (First Playback title). In the case where a single medium has a plurality of BDMV directories recorded thereon, there are plurality of First Playback titles in the BDMV directories. That is, an existing player is not able to specify which one of the First Playback titles is to be played first.

In order to address the above inconvenience, it is required that a first one of a plurality of BDMV directories on a BD-ROM be designated as "BDMV directory 1" and the subsequent BDMV directories to be sequentially designated as "BDMV directory 2, BDMV directory 3 . . . ". Naturally, files contained in the respective BDMV directories are specified with different file paths.

It should be noted here that a playback control program supplied to a playback device from a removable medium, such as BD-ROM, uses file paths in instructions to be processed by the playback device. If it is required to change file paths depending on the BDMV directory containing the playback control program, it takes extra trouble in the authoring.

In view of the above circumstances, the size of a content that can be stored on a single recording medium is undesirably limited to the size of a content that can be stored in a single BDMV directory. Thus, it is difficult to effectively advertise to users the capacity of a recording medium in terms of the number of contents that can be stored to the recording medium.

The present invention aims to provide a recording medium capable of storing a larger number of contents basically as long as the capacity of the recording medium permits, so that the users can appreciate the difference in capacity.

Means for Solving the Problems

In order to solve the problems noted above, a recording medium according to one aspect of the present invention has a hierarchical directory structure. The recording medium has, in the hierarchical directory structure, a root directory; a default directory and a service domain directory both below the root directory; and a movie directory below the service domain directory. The default directory contains a startup program. The service domain directory is created at a time when an AV stream is received via an Manufacturing on Demand service or an Electric Sell Through service. The movie directory contains the AV stream. The startup program is a program to be first executed by a playback device upon loading of the recording medium to the playback device. When executed, the startup program causes the playback device to display a menu. In response to a user operation made on the menu to select the movie directory, the startup program causes the playback device to execute a root change function, so that the service domain directory to which the selected movie directory belongs is recognized as a virtual root directory.

Effects of the Invention

In response to a user operation made on the menu to select one of the directories, the startup program causes the playback device to recognize, as a virtual root directory, the service domain directory to which the selected movie directory belongs. As a result, the playback device executes playback as if the recording medium loaded thereto contains the movie directory immediately below the root directory. If the recording medium contains, in the movie directory below the service domain directory, an AV stream provided via MoD (Manufacturing on Demand) and EST (Electric Sell Through) services, playback of the AV stream is automatically started. In this manner, the present invention allows a single recording medium, instead of a plurality of BD-ROMs, to store a plurality of contents while ensuring correct operation of the playback device, so that the user can appreciate the difference in capacity of each recording medium in terms of the number of contents that can be stored to the medium.

According to the present invention, in addition, it is not required to change file paths described in a playback control program that executes actual playback control of an AV stream, irrespective of which of the directories the playback control program belongs to. That is, the playback control program is enabled to operate to access the recording medium, just in the same manner as a playback control program supplied from a conventional BD-ROM does.

With the above arrangement, the authoring process required to be made by a movie studio in order to distribute a movie on a single recording medium is the same as that required to distribute the movie via a plurality of BD-ROMs.

The recording medium according to the present invention is suitably used as a repository of services of selling online a movie that was commercially released on BD-ROM one or two years ago. This allows users to purchase online a plurality of movies and store them into a single recording medium rather than into a plurality of separate BD-ROMs. Thus, the user can keep the plurality of movies collectively in the single recording medium rather than in a plurality of separate BD-ROMs, which helps and encourages the user to organize his personal library of movies.

In addition, such services are implemented without additional trouble of authoring, which encourages a movie studio to implement such online services to make additional profit from the same movie that was previously sold on BD-ROM.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 7 is a view showing change in the file system structure before and after execution of the MoDESTRootChange API;

FIG. 9A shows the internal structure of Index.bdmv, FIG. 9B shows the internal structure of a BD-J object, and FIG. 9C is a view showing the internal structure a Java™ archive file;

FIG. 10B shows a menu displayed when the removable medium is loaded to a MoD/EST non-compliant player;

FIG. 18 shows the internal structure of merge management information;

FIG. 22 shows a PID assignment map of the elementary streams recorded in the MoDESTxx/BDMV directory;

FIG. 24 shows a PID assignment map of the elementary streams multiplexed in the AV stream to be stored in the BUDA directory;

REFERENCE NUMERALS

| 100, 101 | Removable Medium |
|---|---|
| 102a, 102b | Recording Device |
| 103 | Playback Device |
| 104 | Built-in Medium |
| 105 | Television |

DETAILED DESCRIPTION OF THE INVENTION

Embodiment 1

With reference to the drawings, the following describes an embodiment of a recording medium, a recording device, and a playback device each having the means for solving the problems noted above.

Figure 1:
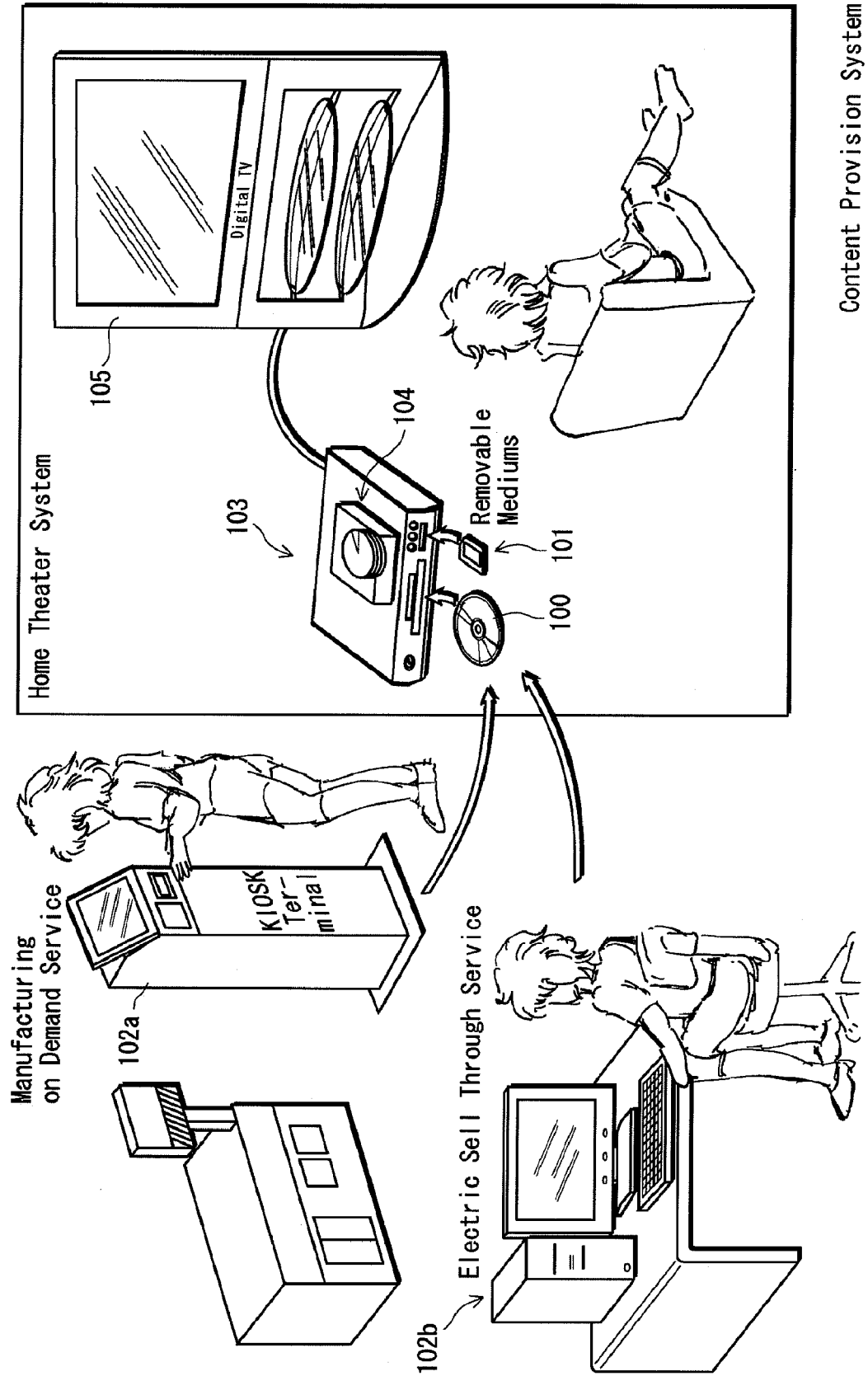
FIG. 1 is a view showing a content provision system in which a recording medium, a recording device, and a playback device are used.

FIG. 1 is a view showing a content provision system in which the recording medium, the recording device, and the playback device are used. The content provision system embodies MoD (Manufacturing on Demand) and EST (Electric Sell Through) services.

The following describes the underlying purpose of the content provision via MoD (Manufacturing on Demand) service and EST (Electric Sell Through) service. Distribution on BD-ROMs is not suitable for sales of contents which are not expected to sell well, due to the cost required for stamping process of removable mediums. In addition, the distribution on read-only mediums involves a relatively high shipment cost and management cost at retailers. In view of these aspects, there is a need in recent years for services which enable sales of contents, by recording an individual content on a recordable or rewritable removable medium only in response to a user request. Suppose that this sales form is applied to old movies that were released on BD-ROMs one or two years ago. In such a case, selling of old movies via MoD and EST services will make additional profits. Note that contents distributed to users via MoD and EST services are referred to as "MOD/EST contents".

The following describes the components of this system. The content provision system shown in FIG. 1 is composed of removable mediums 100 and 101, recording devices 102a and 102b, a playback device 103, a built-in medium 104, and a television 105.

<Removable Medium 100>

The removable medium 100 is a rewritable BD-RE or a write-once read-multiple BD-R and used as a repository of contents received via the MoD (Manufacturing on Demand) and EST (Electric Sell Through) services.

<Removable Medium 101>

The removable medium 101 is a semiconductor memory card, such as an SD memory card or memory stick, and used as a repository of contents in the MoD (Manufacturing on Demand) and EST (Electric Sell Through) services.

<Recording Devices 102a and 102b>

The recording device 102a is a KIOSK terminal and provides a pay service (MoD service) of downloading a content from the WWW server in response to a user operation of selecting the content and writes the downloaded content onto either of the removable mediums 100 and 101.

The recording device 102b is a PC and provides a pay service (EST service) of downloading a content from the WWW server in response to a user operation of selecting the content and writes the downloaded content onto either one of the removable mediums 100 and 101.

<Playback Device 103>

The playback device 103 configures a home theater system with the television 105 and executes playback of BD-ROMs and the removable mediums 100 and 101. The playback device 103 may be a player supporting or not supporting the MoD and EST services. The former type of the playback device 103 is referred to as an "MoD/EST compliant player" and the latter "MoD/EST non-compliant player".

<Built-in Medium 104>

The built-in medium 104 is used as a repository of bonus contents received from the WWW server of a movie distributor. Bonus contents are provided to BD-ROM purchasers as a free gift, a premium or a prize. A bonus content is not able to be played solely but only in combination with a BD-ROM. Examples of bonus contents include sub-audio data and/or subtitle data in a language not recorded in the BD-ROM, a rewards video content, and a movie trailer. Video streams used to execute picture-in-picture playback or stereoscopic playback in combination with a content recorded on a BD-ROM are also examples of bonus contents. The MoD and EST services are to sell on line old contents, which were commercially available in the form of BD-ROM. Thus, a purchaser of a content via the MoD and EST services is entitled to receive the same bonus content as that given to the purchaser of BD-ROMs. In order to receive such a bonus content, the playback device 103 is provided with the built-in medium 104. Yet, bonus contents may be recorded not only on the built-in medium 104 but also on the removable mediums 100 and 101. A directory in each of the built-in medium 104 and the removable mediums 100 and 101 used to store bonus contents is referred to as "BUDA (Binding Unit Data Area) directory". In addition, "BUDA content" refers to a set of files to be stored in the BUDA directory and played as a bonus content. Playback of a BUDA content is executed by constructing a virtual package. The "virtual package" refers to a package that is virtually created by combining data stored in one directory with data stored in another director.

Here, one basic combination of directories is the root/BDMV directory on the BD-ROM with the BUDA directory on the built-in medium 104. However, possible combinations of directories according to this embodiment include the combination of the MoDESTxx/BDMV directory on a removable medium with the BUDA directory on the same removable medium, and the combination of the MoDESTxx/BDMV directory on either of the removable mediums 100 and 101 with the BUDA directory on the built-in medium 104. That is to say, a virtual package according to the present embodiment may be created by any of various combinations of directories. Thus, a virtual package may be created by combining two directories on one and the same recording medium or on different recording mediums.

<Television 105>

The television 105 displays video playback of a movie or a menu to provide an interactive environment to a user.

This concludes the description of the system embodying the MoD and EST services. The following now describes the manufacturing of the removable mediums 100 and 101.

<Internal Structure of Removable Mediums 100 and 101>

Figure 2:
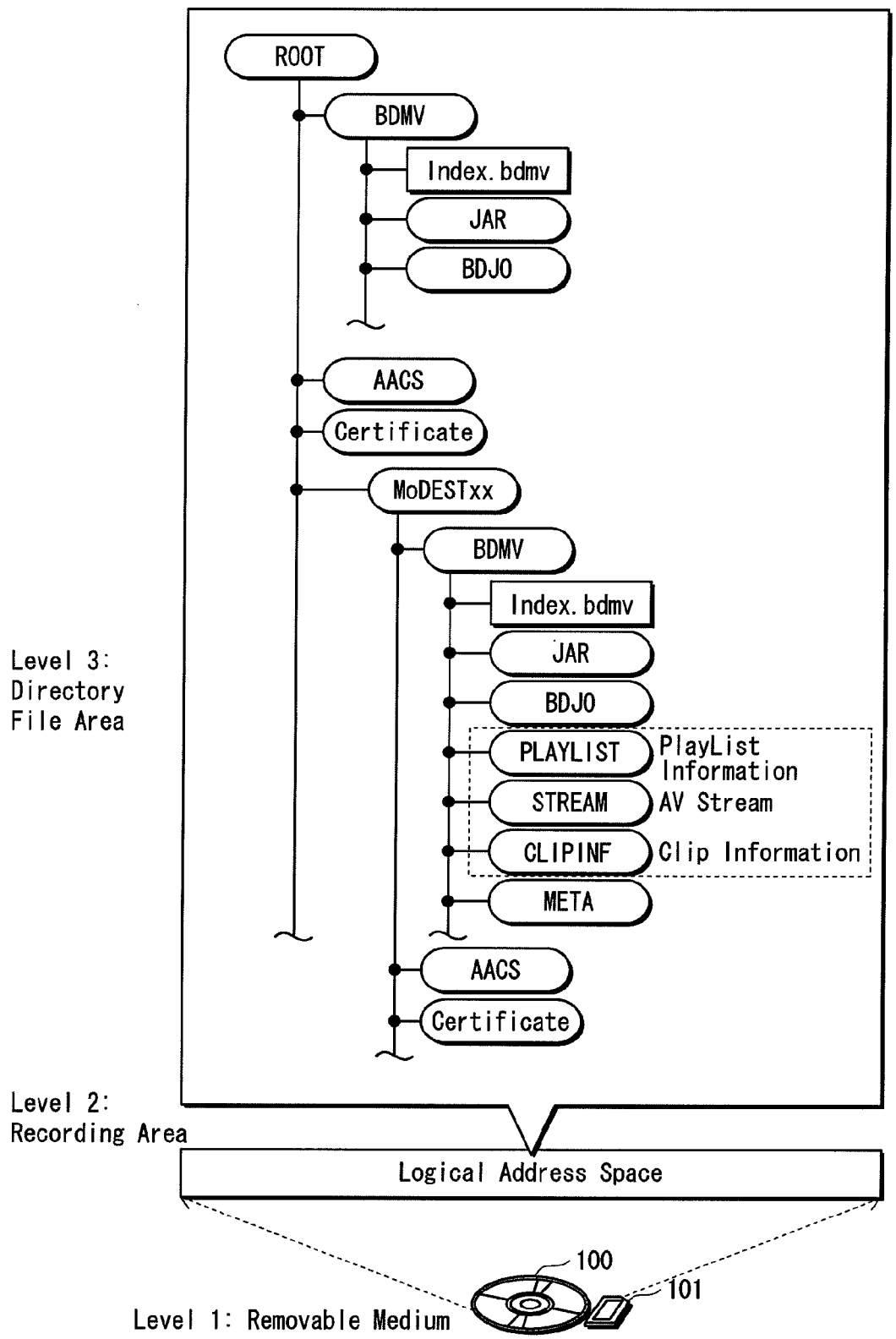
FIG. 2 is a view showing the internal structure of each of removable mediums 100 and 101.

FIG. 2 is a view showing the internal structure of each of the removable mediums 100 and 101. Level 1 in the figure shows the removable mediums 100 and 101, Level 2 shows the recording area of each of the removable mediums 100 and 101 depicted in a laterally drawn-out form. As shown in Level 2, the recording area has a "logical address space".

The "logical address space" stores various types of data starting with the area management information for the file system. The "file system" refers to a UDF or ISO9660 file system. In the present embodiment, a file system in the Extension 2.3 format is adopted. This file system enables data stored in the logical address space to be read out with the use of the directory and file structure. The location of a file in the file system can be identified by file path information (referred to as "file path") that is composed of a directory name and a file name each of which is a string of 255 characters or less.

Level 3 of FIG. 2 shows the structure of directories and files created according to the file system shown on Level 2. As shown in the figure, the BD-ROM has the BDMV directory and the MoDESTxx directory immediately below the root directory (ROOT).

The following describes the file and directory structure of each of the removable mediums 100 and 101.

<BDMV Directory Immediately Below Root Directory>

The BDMV directory located immediately below the root directory is created at the time when a BDMV directory below the MoDESTxx directory is created. Note that the BDMV directory immediately below the root directory is denoted as the "root/BDMV directory".

The root/BDMV directory is in compliance with the BDMV format described in the BD-ROM Part3 specifications and is created at the time when a MoDESTxx/BDMV content is first created. When a new content is additionally recorded and thus a BDMV directory is created below the MoDESTxx directory, the previously created BDMV directory immediately below the root directory may or may not be updated. The data stored in the root/BDMV directory may be updated at the time of adding/updating a MoDESTxx/BDMV directory. It is also possible that data stored in the root/BDMV directory is separately distributed/recorded for the MoD/EST services. The root/BDMV directory is an essential or "default" directory for the removable medium 100 or 101 to be recognized by a player.

Suppose that no edition (deletion and/or addition) of the root/BDMV is expected, the root/BDMV directory may be provided in advance by default, in compliance with a BDMV directory for BD-ROM Part 3. This default provision means to store an AV stream constituting a content and PlayList information according to the BD-ROM format. The Index.bdmv file, the JAR directory, and the BDJO directory contained in the root/BDMV directory shown in the figure constitute a content compliant with the BDMV format described in the BD-ROM Part3 specifications. Details of the internal structure of directories and files will be described later.

<MoDESTxx Directory Below BDMV Directory>

The MoDESTxx directory is added at the time when the user receives the MoD and EST services. That is to say, the MoDESTxx directory is dependent on the services and thus is a "service domain directory". Immediately below this MoDESTxx directory, a BDMV directory identical to the root/BDMV directory exists. Note that the BDMV directory immediately below the MoDESTxx directory is denoted as the "MoDESTxx/BDMV directory".

The files and directories located below the MoDESTxx directory are all compliant with the BD-ROM Part 3 specifications. An AV stream and the PlayList information are recorded into the MoDESTxx directory in compliance with the BD-ROM Part3 specifications. Such an AV stream and PlayList information correspond to a movie that was first distributed on BD-ROM and contained in the root/BDMV directory of BD-ROM. Among MOD/EST contents, a set of files contained in the MoDESTxx/BDMV directory and constitutes an actual movie is denoted as a "MoDEST/BDMV content". The MoD and EST services according to this embodiment is to sell movies that was distributed in the form of BD-ROM before. Thus, the MoDEST/BDMV content is identical in substance to the content distributed on BD-ROMs (i.e. BD-ROM content). The MoDESTxx directory cannot be recognized by playback devices not supporting the MoD and EST services (MoD/EST non-compliant players). When loaded to a non-compliant player, the removable medium 100 or 101 is treated as a blank medium.

Among directories belonging to the MoDESTxx directory, the PLAYLIST, STREAM, and CLIPINF directories store data defining the entity of the movie. The following describe these directories.

<PLAYLIST Directory>

The PLAYLIST directory contains files with the extension "mpls" (such as xxxxx.mpls where "xxxxx" is variable and the extension "mpls" is fixed).

Files with the extension "mpls" store PlayList information. The PlayList information includes MainPath information, Subpath information, and PlayListMark information.

1) The MainPath information defines one or more logical playback sections each by defining a pair of temporal points "In_Time" and "Out_Time" on the playback time line of the AV stream. The MainPath information also includes a stream number table (STN_table) indicating which of the elementary streams multiplexed in the AV stream are valid for playback and which are not.

2) PlayListMark information includes information indicating one or more temporal points each corresponding to a chapter start point within a corresponding playback section of the AV stream defined by the pairs of In_Time information and Out_Time information.

3) Subpath information includes information indicating an elementary stream to be synchronized with playback of the AV stream and also includes one or more pairs of In_Time information and Out_Time information each specifying a temporal point on the playback timeline of the specified elementary stream. Playback of the AV stream starts when a Java™ application for playback control instructs a Java™ virtual machine to create a JMF player instance to execute playback of the PlayList information. The JMF (Java Media Frame work) player instance is an actual data entity created on the heap memory of the virtual machine according to the JMF player class.

A "title" is a playback unit constituted by a combination of an AV stream and PlayList information. AV playback of a BD-ROM is executed in the unit of a title. Among titles contained in the root/BDMV directory and MoDESTxx/BDMV directories, the first title to be played is specifically called a "First Playback title".

<STREAM Directory>

The STREAM directory contains files with the extension "M2TS" (xxxxx.m2ts, where "xxxxx" is variable and the extension "m2ts" is fixed).

Each file with the extension "m2ts" is a digital AV stream in the MPEG-TS (Transport Stream) format. Such a digital AV stream is obtained by multiplexing a video stream, one or more audio streams, a presentation graphics stream, and an interactive graphics stream. The video stream represents the video of a movie, each audio stream represents the audio of the movie, the presentation graphics stream represents subtitles of the movie, and the interactive graphics stream represents a menu for the movie.

<CLIPINF Directory>

The CLIPINF directory contains files with the extension "clpi" (xxxxx.clip, where "xxxxx" is variable and the extension "clpi" is fixed)).

The files with the extension "clpi" are provided in one-to-one with AV streams and each is a piece of management information of a corresponding AV stream. The management information is referred to as Clip information and includes information indicating the coding format, frame rate, bit rate, resolution of a corresponding digital AV stream and also includes an EP_map indicating the start point of each of a plurality of GOPs.

Note that a description of the directories other than those described above will be given later. This concludes the description of the MoDESTxx directory.

The following describes the directory structure of a removable medium to which where 30 movies A1-A30 are purchased and stored.

Figure 3:
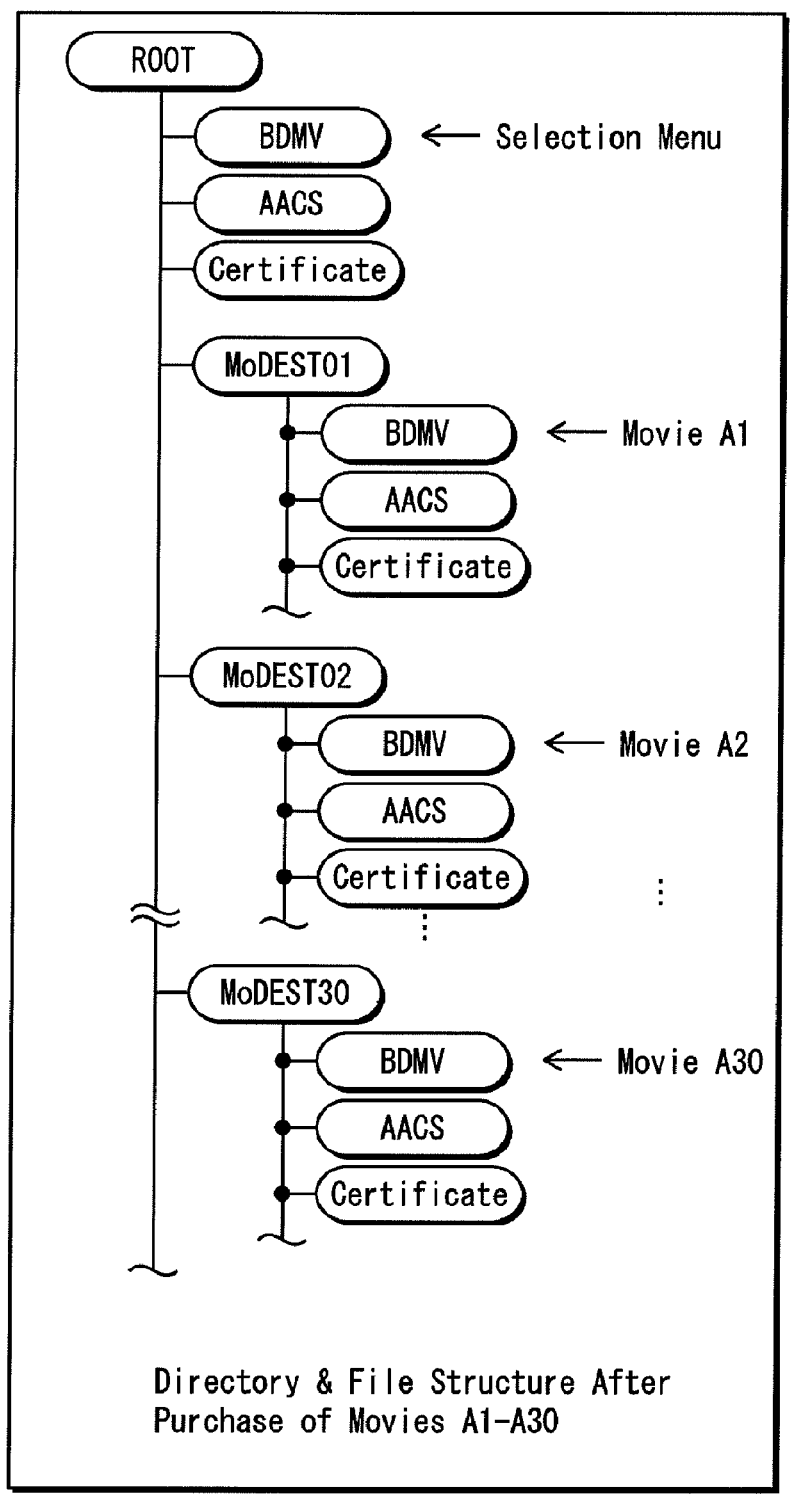
FIG. 3 shows the directory structure of the removable medium after a user has purchased 30 contents, which are the movies A1-A30.

FIG. 3 shows the directory structure of a removable medium after the user has purchased 30 contents, which are the movies A1-A30. In the figure, the MoDEST01, MoDEST02 . . . MoDEST30 directories are added to the removable medium 100 or 101. Note that addition of a MoDEST directory is possible as long as the capacity of the removable medium permits.

The maximum number of MoDEST directories that can be created immediately below the root directory is limited to 30 for the following reason. Each time when either of the removable mediums 100 and 101 is loaded, the startup program stored in the BDMV directory immediately below the root directory dynamically creates a menu showing the listing of contents residing on the loaded removable medium 100 or 101 (hereinafter, the menu is referred to as a "root/BDMV menu"). The process of creating the menu showing the listing of MoDESTxx directories takes too long if there are too many MoDEST directories on the loaded removable medium 100 or 101. In addition, in the case where a plurality of 8-cm single-layer discs (each of such a BD can store up to 7.5 GB), which are generally used in a video camera or the like, are copied into one 12-cm 8-layer disc (such a BD can store up to 200 GB), up to 27 (about 30) contents can be copied.

It is required that each MoDESTxx/BDMV directory stores the name and a thumbnail of a stored content, and the names and thumbnails are used as items of the root/BDMV menu.

Each MoDESTxx/BDMV directory is an "actual movie directory" used to store the entity of a content. The data stored in the MoDESTxx/BDMV directory is compliant with the BDMV format described in the BD-ROM Part 3 specifications. The data recorded in the MoDESTxx directory is invisible to the user irrespective of what file operation is made. The MoDESTxx/BDMV directory contains Disc Library Metadata and thus two tags <name> and <thumbnail> are essential. Yet, whether or not the root/BDMV directory uses the Disc Library Metadata is optional. MoD/EST compliant players are provided, as a requirement, with an API for virtually changing the root directory of the removable medium 100 or 101 loaded to the player. Once the root directory is virtually changed, the player is allowed to execute playback of the MoDESTxx/BDMV directory just in the same manner as execution of BD-ROM playback. Thus, it is not necessary to newly develop/verify the playback behavior of MoD/EST contents since it is the same as playback behavior of any BD-ROM.

This concludes the embodiments of the recording mediums. Next, a description of the recording devices 102a and 102b is given.

(Recording Devices 102a and 102b)

The following description relating to the recording device 102a also applies to the recording device 102b. When recording a new content into a removable medium, the recording device 102a does not record the new content into the BDMV directory immediately below the root directory. Rather, the recording device 102a creates a MoDESTxx directory and then creates a BDMV directory immediately below the MoDESTxx directory and records the new content into the newly created MoDESTxx/BDMV directory. For purposes of description, suppose that the removable medium 101 has a BDMV directory immediately below the root directory of and the BDMV directory contains an AV stream and PlayList information constituting a content. Then, even if another content is additionally purchased and recorded into the removable medium 101, the BDMV directory located immediately below the root directory is no longer usable to store any additional content for the following reason. Briefly, it is technically difficult to create a program executable on a BD-ROM playback device to allow playback of two or more contents stored in a single root/BDMV directory. That is to say, it is technically difficult to store two different contents within one BDMV directory without causing a problem.

Figure 4:
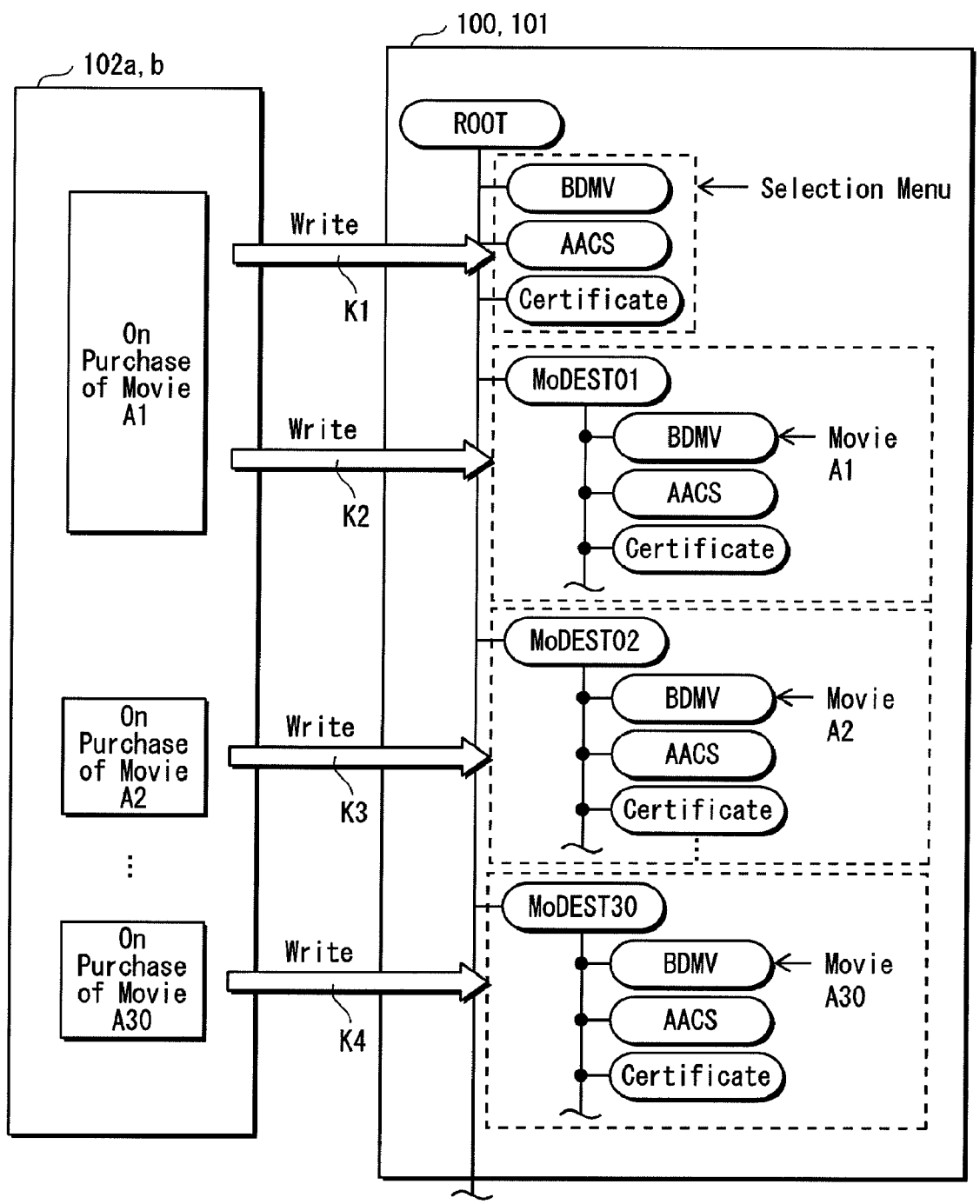
FIG. 4 is a view schematically showing how the data recorded on the removable medium is updated as a result of additionally recording a plurality of contents.

FIG. 4 is a view schematically showing how the data recorded on the removable medium 100 (101) is updated as a result of additionally recording a plurality of contents.

The right-hand side of FIG. 4 shows the directory structure that is identical to the directory structure shown in FIG. 3, and the left-hand side shows the internal state of the individual recording device 102a (102b). The left-hand side showing the internal state includes the boxes labeled as "upon purchase of Movie A1", "upon purchase of Movie A2" . . . "upon purchase of Movie A30". Arrows k1, k2, k3, and k4 each represent the write operation performed by the recording device to record a new directory. Upon purchase of Movie A1, the root/BDMV directory and the MoDEST01/BDMV directory are recorded at the same time onto the removable medium 100 (101). Upon purchase of Movie A2, the MoDEST02/BDMV directory is recorded onto the removable medium 100 (101). Upon purchase of Movie A30, the MoDEST30/BDMV directory is recorded onto the removable medium 100 (101).

As described above, at the time of the first-purchase (k1), the root/BDMV directory and the MoDEST01/BDMV directory are recorded concurrently. Yet, after the second and subsequent purchases (k2, k3, and k4), only the MoDEST02/BDMV directory, MoDEST04/BDMV directory, and MoDEST30/BDMV directory corresponding to the purchased contents are sequentially added to the removable medium.

Figure 5:
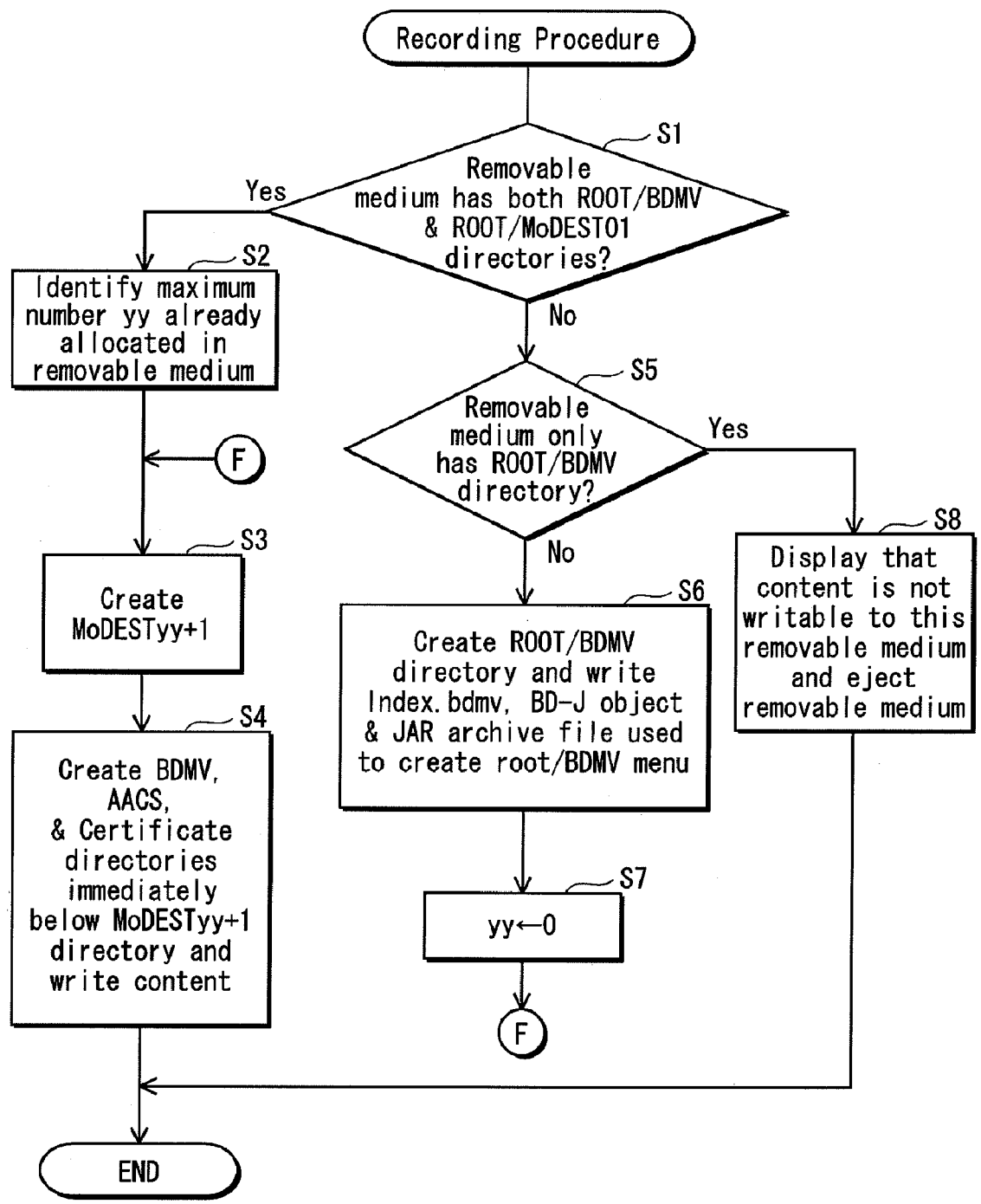
FIG. 5 is a view showing the recording procedure performed by the recording device.

The following describes the recording procedure performed by each of the recording devices 102a (102b), with reference to FIG. 5. FIG. 5 is a view showing the recording procedure performed by the recording device.

In response to an instruction to write a content via the MoD and EST services, the recording device 102a (102b) judges whether the removable medium loaded to the recording device already has a combination of the root/BDMV directory and a MoDESTxx directory recorded thereon (Step S1). If the combination exists, the recording device identifies the maximum one of the numbers "yy" already allocated to the existing MoDEST directories (Step S2) and creates the MoDEST yy+1 directory (Step S3). The recording device then creates a BDMV directory, an AACS directory, and a Certificate directory immediately below the MoDEST directory yy+1 and records the content into that directory (Step S4). On the other hand, if the combination of the root directory with the BDMV directory or with the MoDESTxx directory exists or the root/BDMV directory exists alone (Step S5: Yes), the recording device displays that the removable medium (100 or 101) is not usable to store the content and ejects the removable medium 100 (Step S8).

If the removable medium has no BDMV directory, the recording device creates the root/BDMV directory and records Index.bdmv, BDJ object, and JAR archive files that are used to create the root/BDMV menu (Step S6), sets the value of "yy" to "0" (Step S7) and moves onto Step S3 in which the MoDESTyy+1 directory is created (Step S3). The recording device then creates BDMV, AACS, and Certificate directories immediately below the MoDEST directory yy+1 (Step S4).

This concludes the description of the recording devices 102a and 102b.

<Playback Device 103>

In response to the loading of a removable medium, the playback device 103 performs a basic operation of automatically executing playback of the removable medium, starting from the First Playback title that is normally stored in the BDMV directory immediately below the root directory. In order to utilizes the basic operation of existing BD-ROM players, i.e. the operation of automatically executing playback of the First Playback title stored in the BDMV directory immediately below the root directory, without requiring any change to player design, MoD/EST compliant players are provided with the following API (MoDESTRootChange API) and system property (MoDESTRootChange system property)<

<MoDESTRootChange API>

The MoDESTRootChange API is an API for changing the root. After successfully changing the file path described in the argument for the API call so as to specify the root directory, the API returns a response indicating "SUCCESS" to the application that called the API. If failed to change the file path to specify the root directory, the API returns a response indicating "NoSuchMethodException" to the calling application.

Figure 6:
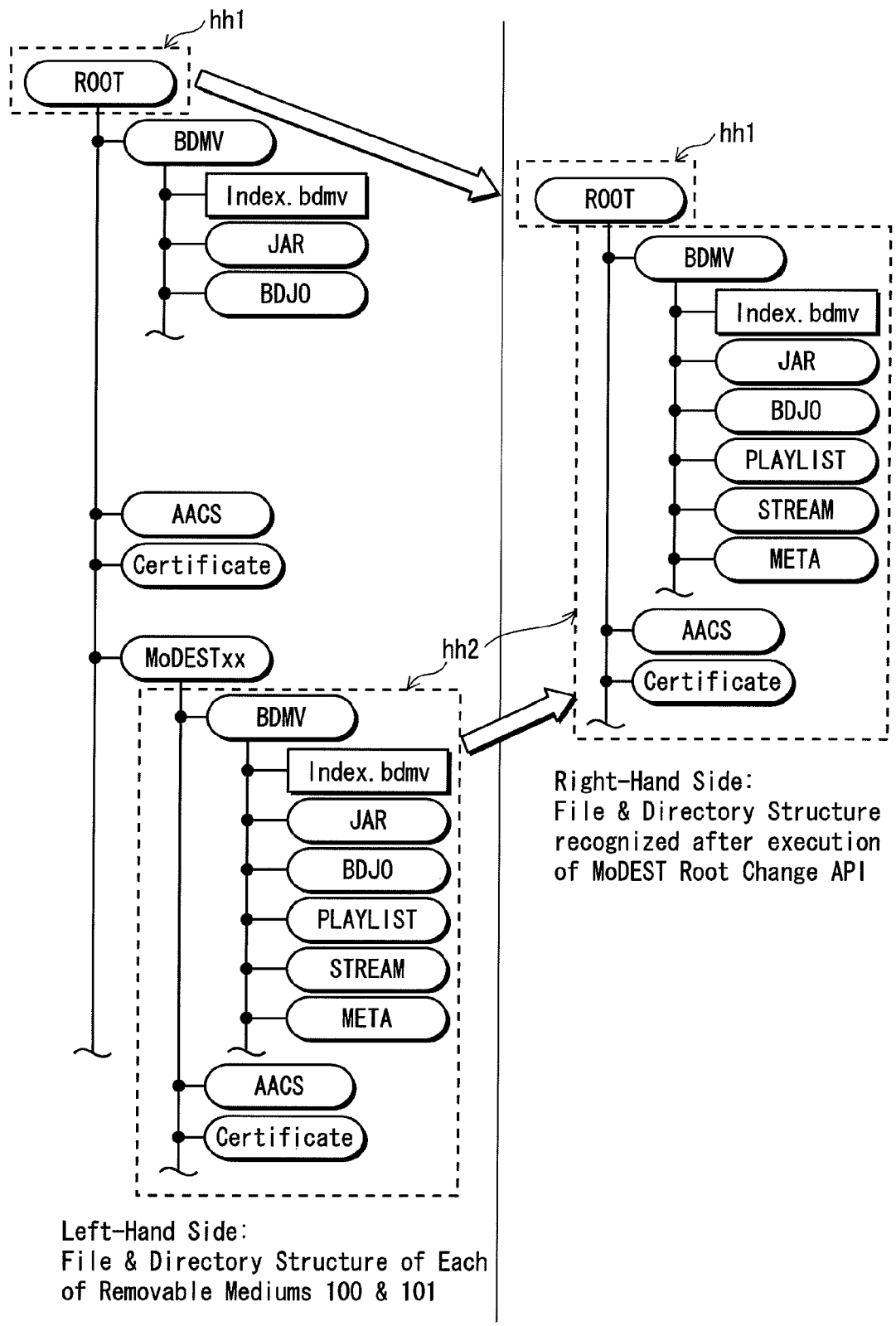
FIG. 6 is a view schematically showing an example of the file system recognized as a result of a MoDESTRootChange API call.

FIG. 6 is a view schematically showing an example of the file system recognized as a result of a MoDESTRootChange API call. The left-hand side of FIG. 6 is the file system structure shown in FIG. 2. The right-hand side of FIG. 6 shows the file system recognized as a result of the MoDESTRootChange API. In the figure, broken line boxes hh1 and hh2 enclose portions of the file system structure that are recognized after the MoDESTRootChange API is executed. That is, only the root directory and the MoDESTxx/BDMV directory of the file system structure shown on left-hand side is recognized, so that the recording medium is processed in the same manner as a removable medium storing the MoDESTxx/BDMV directory located immediately below the root directory.

FIG. 7 is a view showing change in the file system structure before and after execution of the MoDESTRootChange API. The upper half of FIG. 7 shows the file system structure before execution of MoDESTRootChange API, whereas the lower half shows the file system structure after execution of MoDESTRootChange API. In the file system structure recognized before execution of MoDESTRootChange API, the BDMV directory containing a movie is located immediately below the root directory.

However, in the file system structure recognized after execution of MoDESTRoot Change API, the BDMV directory containing the movie A1 is located immediately below the root directory.

<Format of API Call>

The following describes the format of call to the MoDESTRootChange API. The arguments to the MoDESTRootChange API call include ID/relative path/absolute path.

The ID mentioned above refers to the last two digits "xx" uniquely identifying a MoDESTxx directory. An example of the API call with the ID of a MoDESTxx directory used as an argument is shown below.

MoDESTRootChange(01)

Examples of the API call with the relative path used as an argument are shown below.

MoDESTRootChange . . . /MoDEST01)
MoDESTRootChange ( /MoDEST01)

It is applicable as shown in the examples below to use the first and second arguments to call the root change function.

MoDESTRootChange (MoDEST01, root)
MoDESTRootChange (MoDEST01, NULL)

This concludes the description of the MoDESTRootChange API. The following describes the MoDESTRootChange system property in detail.

<MoDESTRootChange System Property>

The MoDESTRootChange system property is a player variable indicating whether the playback device is capable of executing a root change command and takes a value indicating either "YES" or "NO". In the case where the system property="NO", the playback device is judged to be a MoD/EST non-compliant player.

In the case where it is ensured that a playback device not supporting the MoDESTRootChange API returns the value indicating "NoSuchMethodException" without fail, it is duly judged that the playback device is a MoD/EST non-compliant player. In the case where "NoSuchMethodException" may or may not be returned, the MoDESTRootChange system property is used to judge that the playback device is a MoD/EST non-compliant player.

Further, the use of this system property makes it possible to judge, as a MoD/EST compliant player, a playback device having the playback function of MoDEST/BDMV contents but without the MoDESTRootChange API.

Such a judgment with the use of the system property is made on assumption of the following case, for example. In the case where the playback device 103 is provided with a GUI component so-called "media cross bar" that allows a user to select one of a plurality of recording mediums, the MoDESTRootChange API is not required. Thus, when a call to the MoDESTRootChange API is made, the playback device returns NoSuchMethodException. This type of MoD/EST compliant players are provided with GUI component that is used as an alternative to the MoDESTRootChange API and essentially capable of playing back MoDEST/BDMV contents. In view of this, it is preferable that a program constituting the First Playback title use the MoDESTRootChange system property to judge whether the playback device is a MoD/EST compliant player, so that a playback device capable of playback MoDEST/BDMV contents but without the MoDESTRootChange API is duly judged as a MoD/EST compliant player. In order to enable such a judgment, the playback device 103 has the MoDESTRootChange system property.

<State Transition>

Figure 8:
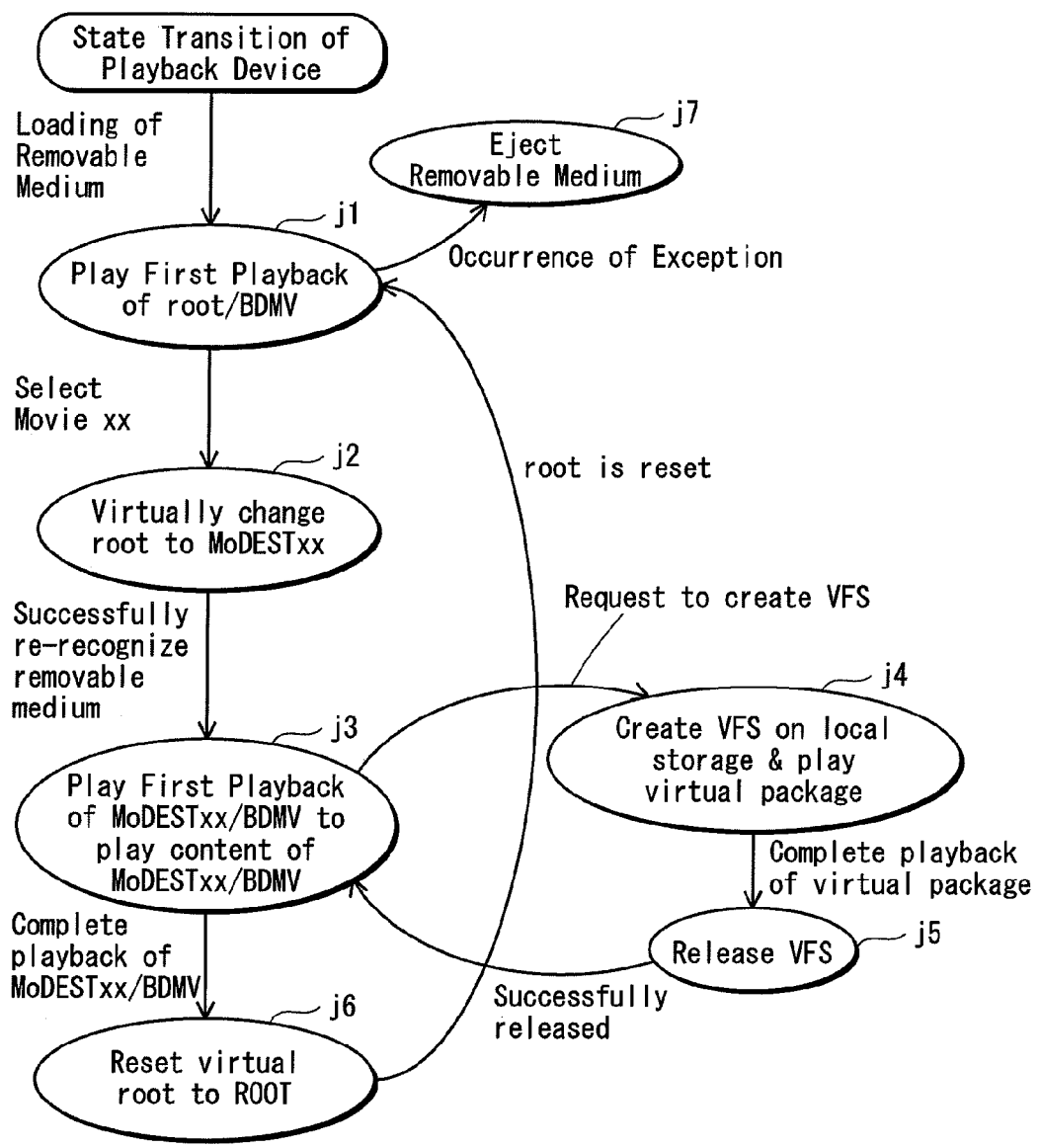
FIG. 8 shows the state transition of the playback device 103.

The control state of the playback device 103 changes in the following manner. Upon loading of either of the removable mediums 100 and 101, the playback device 103 does not automatically start playback of the BDMV directory immediately below the root directory. Rather, the playback device 103 recognizes that the loaded removable medium has a plurality of BDMV directories. If more than one MoDESTxx directory exists, the playback device 103 allows one of the MoDESTxx/BDMV directories to be selected and starts executing playback of the BDMV directory located below the selected MoDESTxx directory. Upon completion of the playback, the playback device 103 goes back to the state of displaying the root/BDMV menu. FIG. 8 shows the state transition of the playback device 103.

State j1

Upon occurrence of an event that a removable medium is loaded, i.e. a removable medium storing a MOD/EST content is loaded to a MoD/EST compliant player, the playback device 103 goes into State ji. In this state, the playback device 103 executes playback of First Playback title stored in the root/BDMV directory.

State j2

Upon occurrence of an event that "Movie xx is selected" while in State j1, the playback device 103 goes into State j2. That is, the event that "Movie xx is selected" is equivalent to an even that "the BDMV directory below the MoDESTxx directory is selected on the root/BDMV menu". Thus, when placed in State j2, the playback device 103 executes a process of changing "the root directory to the MoDESTxx directory corresponding to xx". As a result, the playback device 103 recognizes the removable medium in the same manner as a BD-ROM that only stores the MoDESTxx directory and the BDMV, AACS, and Certificate directories located below the MoDESTxx directory.

State j3

Upon occurrence of an event that "the removable medium is successfully re-recognized" while in State j2, the playback device 103 goes into State j3. In this state, "the playback device 103 executes First Playback title stored in the MoDESTxx/BDMV directory, so that playback of the MoDESTxx/BDMV content is executed".

State j4

Upon occurrence of an event that "the BD-J application, which is the startup program constituting the First Playback title, requests to create a VFS" while in State j3, the playback device 103 is triggered to go into State j4. In this state, the playback device 103 "creates a virtual file system (i.e. creates a Virtual File System) on the removable medium (100 or 101) and the built-in medium 104 and executes playback of the virtual package". The virtual file system enables the playback device to handle the removable medium 100 or 101 and the built-in medium 104 as a single unit. Thus, by downloading a bonus content onto any of the removable mediums 100 and 101 and the built-in medium 104, the playback device is enabled to execute playback of the bonus content in combination with a content residing on the removable medium 100 or 101 via the VFS (Virtual File System) in the same manner with playback of a BD-ROM.

State j5

Upon occurrence of an event that "playback of the virtual package completes" while in State j4, the playback device 103 goes into State j5. In this state, the playback device 103 releases the VFS. Upon successfully releasing the VFS, the playback device 103 is triggered to goes back into State j3, i.e., goes back to State j1 in which "playback of First Playback title in the MoDESTxx/BDMV directory is executed".

State j6

Upon occurrence of an event that "playback of the MoDESTxx/BDMV directory completes in State j3" or "the VFS is released in State j5", the playback device 103 goes into State j6. In this state, the playback device 103 performs the process of "resetting the virtual root to the original root of the removable medium". Upon successfully performing the resetting process and thus an event that "the root is reset to the root of the removable medium" occurs, the playback device 103 is triggered back into the state in which "playback of First Playback title in the root/BDMV is executed".

Once the root location of the removable medium recognized by the playback device is virtually changed with the use of the MoDESTRootChange API, the behavior of the playback device to execute playback of the removable medium is equivalent to the behavior of executing playback of any BD-ROM, i.e. a removable medium simply having a set of BDMV, AACS, Certificate directories immediately below the root directory. That is to say, it is not necessary to change the software design of the playback device. In addition, although it is necessary to verify the API used for executing the root change, verification of playback of MoDEST/BDMV contents is not necessary, since the playback is executed in the same manner as the BD-ROM playback.

In addition, the playback device is ensured to recognize as if a plurality of BD-ROM contents are all recorded on a single removable medium. As a consequence, users are allowed to make the same operations as those for BD-ROM viewing, so that users can make operations without difficulty. Note that no state transaction is assumed to occur from one MoDESTxx/BDMV directory to another MoDESTxx/BDMV directory. Rather, the state transition occurs from a MoDESTxx/BDMV to the root/BDMV and from the root/BDMV to a MoDESTxx. Through the execution of the MoDESTRootChange API, a MoDESTxx directory is virtually treated as the root of the removable medium. Yet, it is desirable that the player status is reset upon removal of the removable medium, so that the root directory of a removable medium subsequently loaded is recognized again as the "root" of the removable medium.

This concludes the description of the playback device 103. The state transition of the playback device 103 is caused based on the BD-J application, which is a program contained in the MoDESTxx directory and for a playlist playback control. Among the data contained in the root/BDMV directory shown in FIG. 2, the state transition is caused by the Index.bdmv file, the BDJ object contained in the BDJO directory, and the Java™ archive file contained in the JAR directory. The following describes the Index.bdmv file, BDJ object and Java™ archive file.

<Index.bdmv>

First of all, Index.bdmv is described. FIG. 9A shows the internal structure of Index.bdmv. Each of the removable mediums 100 and 101 has recorded thereon various types of titles. Index.bdmv shown in the left-hand side of FIG. 9A includes indexes defined for each of the various titles. More specifically, the following are included: the Index Table Entry for First Playback title of the removable medium 100 (101), the Index Table Entry for the top menu, the Index Table Entry for Title #1, Index Table Entry regarding Title#2, . . . regarding #N. This table specifies all the titles, top menu, and Movie or BDJ object constituting the First Playback title. Each time a title or menu is called, the playback device 103 executing BD-ROM playback refers to Index.bdmv to execute a predetermined Movie or BDJ object. In addition, in the top menu, a Movie or BDJ object to be called when such a command as "MenuCall" is executed in response to a user operation made on the remote controller.

The lead lines h1 in the figure indicates that the data structure common to all Index Table Entries are shown in close-up. The Index Table Entry is defined based on this common data structure including the following data fields: "Title_object_type" and "bdjo_file_name".

The data field "Title_object_type" indicates whether "the operation-mode object associated with a corresponding title is a Movie or BDJ object.

The data field "bdjo_file_name" indicates the file name of the BDJ object associated with a corresponding title.

By such an Index.bdmv, the title is associated with a corresponding operation-mode object.

<BDMV Directory Structure ZZZZZ.BDJO>

The ZZZZZ.BDJO ("ZZZZZ" is variable and the extension "BDJO" is fixed) is a file storing a BDJ object described above. FIG. 9B shows the internal structure of the BDJ object. As shown in the left-hand side of FIG. 9B, the BDJ object contains an application management table.

The application management table (AMT) is a table for implementing "application signaling". The "application signaling" refers to the control process of managing a "title" on the BD-ROM as a lifecycle of the application and accordingly activating and terminating the application. Here, the term "lifecycle" refers to a section defined on a timeline of the entire content recorded on the BD-ROM during which the application lives on the heap memory of the virtual machine. The term "to live" refers to the state in which the application resides on the heap memory and executable by the virtual machine. Such a Java™ application that is controlled based on the application management table contained in a BDJ object is referred to as a "BD-J application".

The lead lines h2 indicate that the internal structure of the application management table is shown in close-up. As indicated by the lead lines h2, the application management table is composed of a plurality of application entries #1-#n. The lead lines h3 indicate the data structure common to all the application entries. As indicated by the lead lines h3, each application entry includes "control code" and "application ID". The control code defines the activation behavior of a corresponding application, i.e., whether the application is set to be automatically activated during the title (AutoStart) or to be activated in response to a call from another application (Present). The "application ID" is a five-digit number used as the file name of a Java™ archive file and thus identifies the Java™ application to be activated.

AJAR Directory>

Next, the following describes the JAR directory. The JAR directory contains a Java™ archive file (XXXXX.JAR).

The Java™ archive file stores a plurality of files in the directory structure. FIG. 9C is a view showing the internal structure the Java™ archive file.

In this directory structure, the "XXXX.class" is present immediately below the root directory, and the "MANIFEST.MF", "SIG-BD.SF", "SIG-BD.RSA", and "bd.XXXX.perm" files are stored in the META-MF directory.

This XXXX.class (class file) is a class file containing a class structure that defines a BD-J application executable on a Java™ virtual machine. The MANIFEST.MF file corresponds to a digital certificate and the SIG-BD.SF file stores the hash value of the MANIFEST.MF file. The SIG-BD.RSA file is a file storing a digital certificate chain and signature information. The bd.XXXX.perm is a permission request file and stores information indicating what permission is given to the BD-J application to be executed.

The BD-J application defined by the class file in the Java™ archive file is a Java™ Xlet that is controlled by the application manager via the Xlet interface. The Xlet interface has the following four states: "loaded", "paused", "active", and "destroyed".

In addition, the Java™ application implements the HAVi framework designed according to GEM 1.0.2 with the use of a standard Java library for displaying image data in JFIF (JPEG), PNG, and other formats. The HAVi framework is a GUI framework containing the remote control navigation functionality according to GEM 1.0.2. The Java™ application executes, in synchronism with video display, display of buttons based on the HAVi framework, display of text, and online display (the contents of BBS). Users are allowed to interact with the display by operating a remote controller.

This concludes the description of JAR files.

The JAR files described above are located in the root/BDMV directory as well as in the MoDESTxx/BDMV directory. Each JAR file executes a different process depending on whether the JAR file belongs to the root/BDMV directory or to a MoDESTxx/BDMV directory. The following describes BD-J applications defined by the JAR files belonging to the respective directories.

<BD-J Application Defined by JAR File in Root/BDMV Directory>

The BD-J application defined by a JAR file belonging to the root/BDMV directory configures First Playback title of the removable medium (100 or 101) and is a startup program set to be executed first upon loading the removable medium (100 or 101) to the playback device. With this BD-J application, a menu presenting all the MoDESTxx/BDMV directories (root/BDMV menu) is displayed to the user and a user operation of selecting one of the MoDESTxx/BDMV directories presented on the menu is acceptable.

<BD-J Application Defined by JAR File in MoDESTxx/BDMV Directory>

The BD-J application defined by a JAR file belonging to a MoDESTxx/BDMV directory executes actual playback control of a MoDESTxx content. This BD-J application displays a menu for receiving user operations relating to the MoDESTxx directory (MoDESTxx/BDMV menu) and receives user operations made on the MoDESTxx/BDMV menu to request for playback start of the MoDESTxx directory, chapter selection, audio selection, and subtitle selection. In addition, the BD-J application creates a virtual package as necessary and executes playback of a playlist that is recognized in the virtual package. As described above, each BD-J application defined by a JAR file executes a different process depending a BDMV directory to which the JAR file belongs.

This concludes the description of Java™ archive files. Next, metadata stored in the META directory is described.

<Metadata>

The metadata stored in the META directory is an XML file used as a media library of the removable medium (100 or 101). The metadata at least includes the name of a content and link information indicating a link to a JPEG thumbnail file. The content name and the link information are used by the BD-J application contained in the root/BDMV directory creates the root/BDMV menu. The library metadata of the removable medium (100 or 101) may be stored in BD.INFO or separately in an XML file located below the BDMV directory. Although <name> and <thumbnail> are essential data elements in Disc Library Metadata, other data elements are optional.

<Menu Configuration of MoD/EST Removable Medium>

Figure 10A:
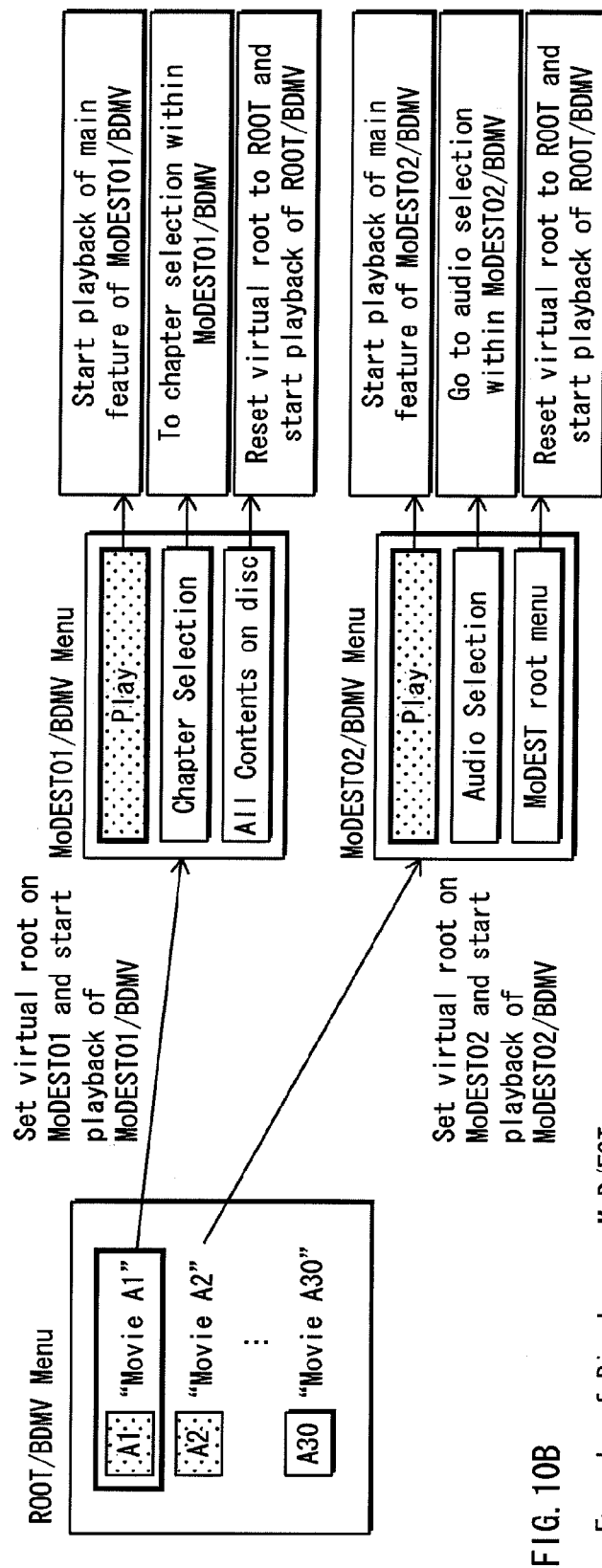
FIG. 10A shows a root/BDMV menu.

The following describes the menu displayed by the BD-J application with the use of the metadata described above, with reference to FIG. 10. FIG. 10A shows the root/BDMV menu. In FIG. 10, the root/BDMV menu is shown on the left-hand side and the MoDESTxx/BDMV menu is shown in the middle. The right-hand side of the figure shows processes performed in response to user operations of selecting the respective menu items on the MoDESTxx/BDMV menu.

Root/BDMV Menu

The "the root/BDMV menu" is a menu that visually presents titles contained in the respective MoDESTxx/BDMV directories and receives a user operation of selecting one of the titles contained in the plurality of MoDESTxx directories on the removable medium (100 or 101). To realize the visual presentation of the titles, pairs of tags, namely <name> and <thumbnail> contained in the respective MoDESTxx/BDMV directories are used. The pairs of <name> and <thumbnail> tags constitute GUI components corresponding to the respective MoDEST directories on the removable medium.

The GUI components generated from the respective pairs of <name> and <thumbnail> tags correspond in one-to-one with 30 movies A1, A2 . . . A30 reproduced by executing playback of 30 MoDEST contents on the removable medium. The GUI components include a button A1 which is a GUI component corresponding to Movie A1, a button A2 which is a GUI component corresponding to Movie A2, and a button 30 which is a GUI component corresponding to Movie A30. Each of theses buttons is generated from the name and thumbnail included in a corresponding piece of library metadata stored on the removable medium. When a button is placed into the selected state, it is indicated that playback of a corresponding movie is ready to be started.

When a button is placed into the activated state, the MoDESTRootChange API is executed to virtually change the rood directory to the BDMV directory located below the MoDESTxx directory corresponding to the GUI component placed into the activated state.

MoDEST01/BDMV Menu

The "MoDEST01/BDMV menu" is a top menu that can be called with a menu call in the MoDESTxx/BDMV directory. The "MoDEST01/BDMV menu" visually presents operations that are available in the MoDEST01/BDMV directory and receives a user operation of selecting one of the available operations. The removable medium (100 or 101) has a BDMV directory per MoDESTxx directory and each BDMV directory contains Index.bdmv. In the example shown in the figure, a user operation is made to select the MoDEST01/BDMV directory. In response, the top menu unique to the MoDEST01/BDMV directory is displayed as the MoDEST01/BDMV menu, which enables user operations unique to the MoDEST01/BDMV directory to be made. The MoDEST01/BDMV menu contains arranged thereon the following buttons: a "Play button" to start main feature playback of a content contained in the MoDEST01/BDMV directory, a "Chapter Selection button" for selecting a chapter, and "All Contents on Disc button" for returning to the root/BDMV menu of the entire removable medium.

When the "All Contents on Disc button" is put to the activated state, the MoDESTRootChange API is executed. As a result of the execution, the ROOT is reset to the root directory of the removable medium, so that the root/BDMV menu is displayed again.

MoDEST02/BDMV Menu

The "MoDEST02/BDMV menu" is a top menu that can be called with a menu call in the MoDEST02/BDMV directory. The "MoDEST02/BDMV menu" visually presents operations that are available in the MoDEST02/BDMV directory and receives a user operation of selecting one of the available operations. In response to a user operation selecting the MoDEST02/BDMV directory on the root/BDMV menu, the top menu unique to the MoDEST02/BDMV directory is displayed as the MoDEST02/BDMV menu, which enables user operations unique to the MoDEST02/BDMV directory to be made. The MoDEST02/BDMV menu contains arranged thereon the following buttons: a "Play button" to start main feature playback of a content contained in the MoDEST02/BDMV directory, an "Audio Selection button" for selecting an audio stream, and "All Contents on Disc button" for returning to the root/BDMV menu of the entire removable medium.

When the "MoDEST root menu button" is put to the activated state, the MoDESTRootChange API is executed. As a result of the execution, the ROOT is reset to the root directory of the removable medium, so that the root/BDMV menu is displayed again.

As described above, the BDMV directory immediately below the MoDESTxx directory contains "the MoDEST01/BDMV menu" or "the MoDEST02/BDMV menu" each of which includes a button for resetting the virtual root to the root of the removable medium. The above menus are examples that are displayed when the removable medium is loaded to a MoD/EST compliant player.

FIG. 10B shows a menu displayed when the removable medium is loaded to a MoD/EST non-compliant player. This menu shows that the loaded removable medium is a removable medium having a MoDEST/BDMV content recorded thereon and the removable medium needs to be loaded to a MoD/EST compliant player in order to execute playback of the MoDEST/BDMV content.

Figure 11:
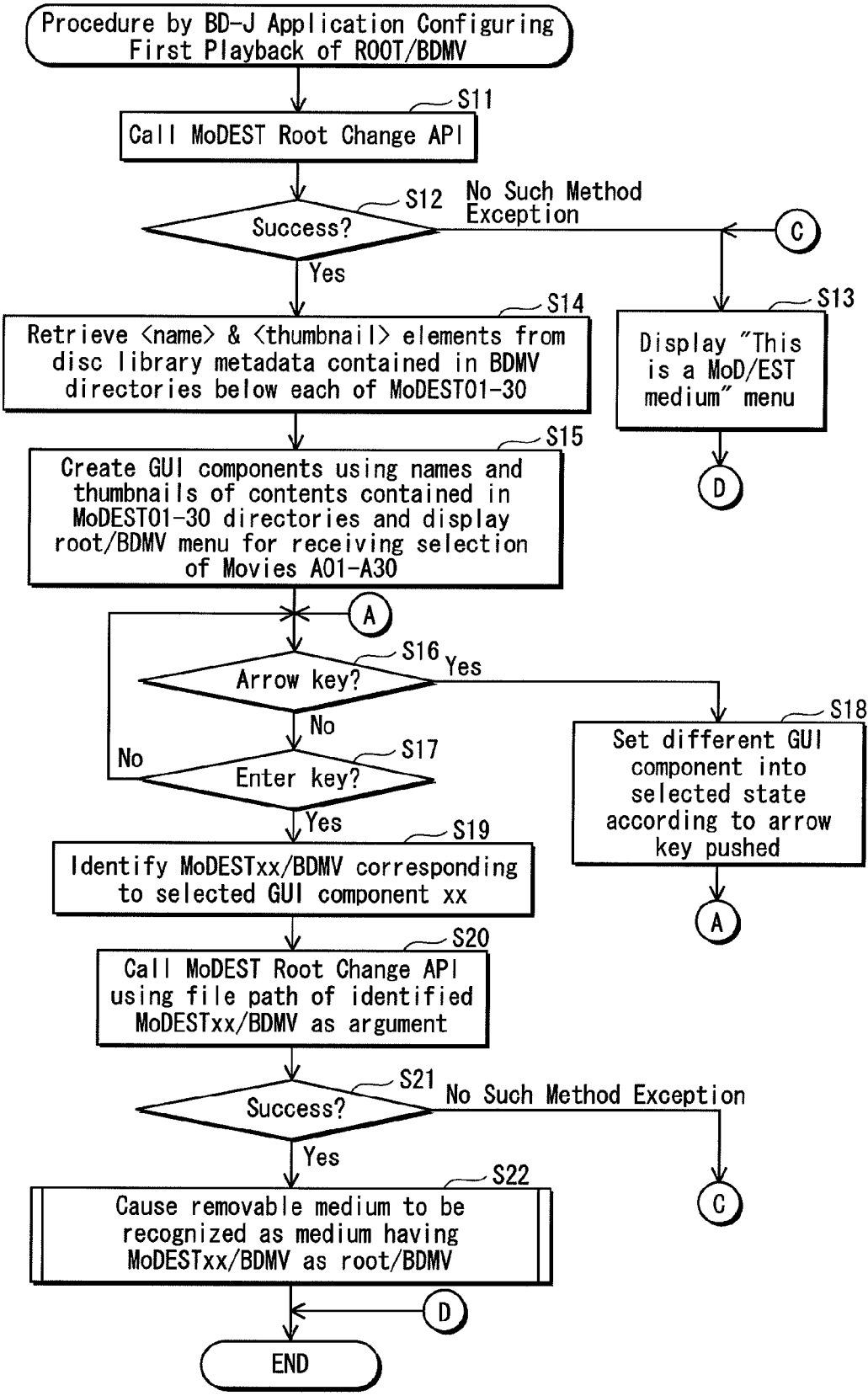
FIG. 11 is a flowchart showing the procedure of processes performed by a BD-J application constituting a First Playback title, i.e., by a startup program.

The following description relates to processes performed by the BD-J application which is a startup program, with the use of the root/BDMV menu and the MoDESTxx/BDMV menus. FIG. 11 is a flowchart showing the procedure of processes performed by the BD-J application constituting the First Playback title, i.e., by the BD-J application which acts as a startup program.

The BD-J application calls a MoDESTRootChange System API (Step S11) to see if the playback device has a MoDESTRootChange API (Step S12). If not, the "this is a MoD/EST medium" menu is displayed (Step S13). In this way, if the playback device is a non-compliant player, the player is notified that the removable medium cannot be played.

If the playback device has a MoDESTRootChange API, the BD-J application contained in the BDMV directory immediately below the root directory acquires the <name> and <thumbnail> elements from library metadata contained in each of the MoDEST01-30 directories contained in the removable medium (Step S14) and generates a GUI component for each MoDESTxx directory from the content name and the representative thumbnail to display the root/BDMV menu for receiving a user operation of selecting any of Movies A01-A30 (Step S15). Then, the processing moves to a loop composed of steps S16-S17 to wait for a user operation to be made. In Step S16, a judgment as to whether any arrow key is pushed. If any arrow key is pushed, another GUI component is put to the selected state according to the arrow key pushed (Step S18) and goes back to Step S16. If an Enter key is pushed to activate a button in the selected state (Step S17: Yes), a MoDESTxx/BDMV directory corresponding to the activated GUI component is identified (Step S19). Then, the BD-J application calls the MoDESTRootChange API using the file path of the MoDESTxx/BDMV as an argument (Step S20). If a response "SUCCESS" is returned to the call (Step S21: Yes), the MoDESTxx directory is set as a virtual root directory. Once the root is changed in the above manner, the BDMV directory is located immediately below the MoDESTxx directory and thus the removable medium is treated in the same way as a BD-ROM that has a single BDMV directory immediately below the root directory. If a response "NoSuchMethodException" is returned in Step S21, the processing moves to Step S13.

Then, the BD-J application causes the playback device to recognize the loaded removable medium as a removable medium having the MoDESTxx/BDMV directory as its root/BDMV directory and to execute playback of the First Playback title contained in the MoDESTxx/BDMV directory (Step S22). Upon completion of the playback, the BD-J application resets the virtual root to the original root. After this process, the MoDESTxx directory is no longer recognized as the root directory. That is, the virtual root is reset to the root directory of the loaded removable medium (100 or 101) upon completion of the playback.

As described above, according to the present embodiment, the removable mediums 100 and 101 are used as repositories for the MoD and EST services of online sales of old movies which was initially released on BD-ROM one or two years ago. By purchasing on online a plurality of movies, which is equivalent in volume to a plurality of BD-ROMs, users are allowed to stores the movies collectively in either of the removable mediums 100 and 101, rather than separately in a plurality of BD-ROMs. This helps the users to organize the personal library of movies more easily.

From the standpoint of the movie studios, the MoD and EST services are highly profitable, because such online sales are provided without any additional cost required for authoring.

(Modifications of Embodiment 1)

The following modifications are desirable to embody the removable mediums 100 and 101, the recording device 102, and the playback device 103 according to Embodiment 1.

(Function of Acquiring Additional Information)

Preferably, the BD-J application contained in the root/BDMV directory renders the root/BDMV menu with the use of additional information regarding the title contained in the MoDESTxx directory (director's name and trailer). In order to obtain such additional information, the BD-J application searches the provider's database using, as a keyword, the <name> element of the disc library metadata contained in the MoDESTxx directory to retrieve additional information of a corresponding title.

(Access Reference Information by BD-J Application)

A BD-J application is provided separately for each of root/BDMV and MoDESTxx/BDMV directories. Preferably, each BD-J application generates resume information and updates the resume information each time a content in the MoDESTxx/BDMV directory is played. Preferably, in addition, the playback device 103 resumes playback based on the resume information when the removable medium 100 or 101 is loaded or when the root directory is virtually changed to the MoDESTxx directory.

(Material Creation for Root/BDMV Menu)

In the above description, the BD-J application constituting the First Playback title uses metadata contained in the BDMV directory to create the root/BDMV menu. Preferably, the type and attribute of a stream stored below the BDMV directory is listed in metadata and the BD-J application is configured to read the stream type and attribute to automatically create a menu. With provision of such a BD-J application, the menu is used commonly for both BD-ROM and MoDEST.

The BD-J application constituting a First Playback title may acquire materials for the root menu by accessing a network based on the content specification information acquired from, for example, the MoDESTxx/BDMV/META/DL.

Embodiment 2

According to Embodiment 1, a MoDEST/BDMV content is downloaded by using the dedicated recording devices 102a and 102b. Embodiment 2 of the present invention relates to an improvement according to which the playback device 103 downloads a MoDEST/BDMV content.

In this embodiment, the playback device 103 is a so-called "internet appliance" and also is a "recording and playback device" that doubles as a recording device. Similarly to the recording device 102, the playback device 103 enables a user to purchase a MoDEST/BDMV content thorough the MoD and EST services. In this case, the BD-J application constituting the First Playback title executes the following processes.

That is, upon activation of the BD-J application contained in the BDMV directory immediately below the root directory, the BD-J application judges whether the playback device 103 is connectable to a network. If the playback device 103 is connectable to a network, the BD-J application causes the playback device 103 to display the root/BDMV menu and executes the functionality of managing MOD/EST contents on the removable medium.

This management functionality is a set of functions including the function of receiving a user operation for purchasing a MoDEST/BDMV content and downloading the MoDEST/BDMV content, the function of storing the downloaded content into the MoDESTxx directory, so that the downloaded content is added to playable contents, and the function of deleting a MoDEST/BDMV content that is no longer needed from the MoDESTxx directory.

The BD-J application acquires purchase information regarding various titles from a specific Web site and displays the acquired purchase information to allow the user to purchase a desired title.

1) Purchasing Function

The following describes the purchasing function. The BD-J application constituting the First Playback title displays, on the root/BDMV menu, a button for receiving a user operation to proceed to purchase a content. At a push of this button, the BD-J application of the root/BDMV displays a page for purchasing a title. This page contains information regarding each title, including prices for the same title at competitors such as Walmart, Amazon and Blockbuster, download time, and the data size (the number of blocks required to record the title on the removable medium).

That page also prompts the user to select one of the built-in medium 104 and the removable mediums 100 and 101 as a downloading destination. Preferably, the root/BDMV menu also displays free spaces (in blocks) remaining in the built-in medium 104 and the removable mediums. For example, on the purchase page, each title exceeding the free spaces of the removable mediums 100 and 101 and the built-in medium 104 may be gray-out and each of such a title is excluded form selectable titles.

2) Downloading Function

The following describes the downloading function. In response to a user operation of purchasing a content, the BD-J application downloads, into a new MoDESTxx directory, the BDMV directory of the purchased content and the AACS and Certificate directories containing the copyright protection information of the content.

At this time, the permission request file (corresponding to dvb.persistent.root in DVB-MHP) is provided in each MoDESTxx directory. In addition, this Permission Request contained in the MoDESTxx directory has a YES/NO property indicating the functionally of file creation/deletion. If the system property is set to Yes, the BD-J application is allowed to create/delete a file in the virtual root directory set by the MoDESTRootChange API.

3) Deletion Operation

A deletion operation by a user is received on the root/BDMV menu. Prior to displaying the root/BDMV menu, it is judged in advance whether an operation of deleting the MoDESTxx directory is enabled or not, based on the type of the drive/medium type/file system type. If deletion is enabled, a button for receiving a user operation for deleting a MoDESTxx directory is displayed on the root/BDMV menu. Upon receipt of a user operation of requesting deletion of a MoDEST/BDMV content, the MoDESTxx directory corresponding to the requested MoDEST/BDMV content is no longer necessary and thus deleted.

As described above, according to the present embodiment, the playback device 103 doubles as the recording device 102, which allows the user to purchase and view a MoDEST/BDMV content at home. In addition, the user is allowed to build a library on the built-in medium 104 of the playback device 103 to make addition and deletion to the library.

Embodiment 3

According to the above embodiment, the root change is realized by the BD-J application. However, according to Embodiment 3 of the present invention, the root change is realized by a Movie object. The term "Movie object" refers to a program described on a command base and dynamically changes the playback proceeding of a title in the HDMV mode. The Movie object is contained in MovieObject.bdmv located immediately below the BDMV directory.

In order to execute the root change in the movie mode, the following commands and PSRs are defined.

MoDESTRootChange Command

The MoDESTRootChange command is a command for changing the root to the MoDESTxx directory specified by the argument and is substantially the same as an API.

PSR

A PSR (Player Setting Register) is a resister indicating the state setting of the playback device 103. The set value of this register indicates whether the root change function is enabled or not. The Movie object refers to the PSR at run time and causes the playback device 103 to execute the MoDESTRootChange command, if the root change function is enabled.

In the case where the root change function is realized with the use of a command, the MoDESTRootChange command is embedded in the button information included in the graphics stream constituting the menu.

<Graphics Stream>

The following describes the graphics stream constituting a menu.

The graphics stream constituting a menu is referred to as an Interactive Graphics (IG) stream. The interactive control defined by the IG stream is compatible with the interactive control on the DVD playback device. The IG stream is composed of functional segments including ICSs (Interactive Composition Segments), PDSs (Palette Definition Segments), and ODSs (Object Definition Segments).

Each ODS (Object Definition Segment) is a piece of graphics data defining graphics used to render a button.

Each PDS (Palette Definition Segment) is a functional segment defining the color of graphics data to be rendered.

Each ICS (Interactive Composition Segment) is a functional segment defining the interactive control for causing the button state to change in response to a user operation.

The following is a description of ICSs. Each ICS is composed of a plurality of pieces of button information that are associated in one-to-one with buttons appearing on an interactive control display. Each piece of button information includes: "neighbor_info" indicating a button that should be placed into the focused state at a push of a Move key during the time the button associated with the button information is in the focused state; "state_info" identifying ODSs defining the respective states of the associated button, such as normal and selected states; and "navigation command" to be executed by the playback device when the associated button is activated.

With the MoDESTRootChange command embedded as the navigation command in button information, the root change command is executed by the playback device in response to a user operation made on the menu rendered with the use of the Interactive Graphics stream.

As described above, according to the present embodiment, the root change functionality is duly realized in the movie mode. In addition, the command for causing the playback device to execute the root change command is embedded in the Interactive Graphics stream.

Embodiment 4

Embodiment 4 of the present invention relates to an authoring system for the authoring of a MoDEST content.

The authoring system is established in a production studio for the distribution of a movie content and provided for use by the authoring staff. According to the operations made by a member of the authoring staff, a digital stream is compressed in compliance with the MPEG standard and a scenario defining how the movie title is played is created. Then, a volume image for BD-ROM is created from the compressed digital stream and the scenario.

Figure 12:
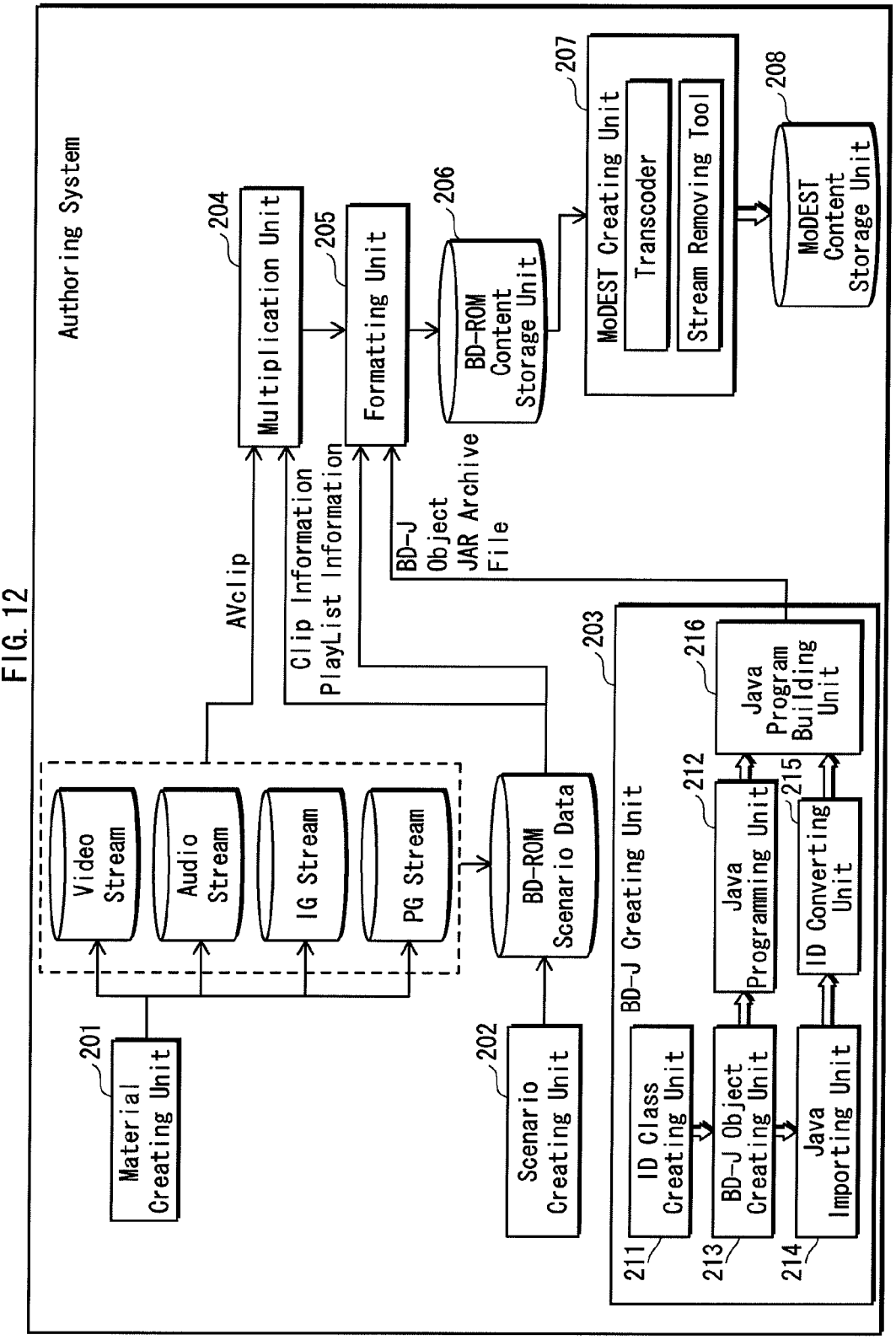
FIG. 12 is a view showing the internal structure of an authoring system.

FIG. 12 is a view showing the internal structure of the authoring system. As shown in FIG. 12, the recording device according to the present invention includes a material creating unit 201, a scenario creating unit 202, a BD-J creating unit 203, a multiplication unit 204, a formatting unit 205, a BD-ROM content storage unit 206, a MoDEST creating unit 207, and a MoDEST/BDMV content storage unit 208.

<Material Creating Unit 201>

The material creating unit 201 creates various streams, such as video stream, audio stream, presentation graphics stream, and interactive graphics stream in the following manner. The video stream is created by coding uncompressed image data in the bitmap format, for example. The video compression standard used herein may be MPEG4-AVC or MPEG2, for example. The audio stream is created by coding uncompressed audio data in the Linear PCM format, for example. The audio compression standard used herein may be AC3, for example. In addition, the presentation graphics stream is a stream carrying subtitles in the format compliant with the BD-ROM standard and created from a subtitle information file. The subtitle information file contains subtitle image data, display timing data, and special effect data of the subtitles, such as fade-in/fade-out. The interactive graphics stream is in the format compliant with the menu screen of the BD-ROM standard and created from a menu file. The menu file contains bitmap image data used to render the menu and data defining the state transition and display effect of the respective buttons appearing in the menu.

<Scenario Creating Unit 202>

The scenario creating unit 202 creates a scenario in the format compliant with the BD-ROM standard, based on the information of the respective streams created by the material creating unit 201 and operations made via GUI by the authoring staff member. The scenario mentioned herein is a file containing Index.bdmv, Movie object, and playlist. In addition, the scenario creating unit 202 creates a parameter file describing which streams constitute the respective AV Clips to be multiplexed.

<BD-J Creating Unit 203>

The BD-J creating unit 203 creates Java code in IDE (IDE Integrated Development Environment) and compiles the created Java program source code and converts the compiled data into a JAR archive file.

<Multiplication Unit 204>

The multiplication unit 204 multiplexes a plurality of streams, such as video, audio, subtitle, and button streams described in the BD-ROM scenario data into an AV Clip in the MPEG2-TS format. At the same time, Clip information associated with the AV Clip is also created.

<Formatting Unit 205>

The formatting unit 205 creates a BD-ROM disc image in the UDF format, which is compliant with the BD-ROM standard, by organizing (i) the BD-ROM scenario data created by the scenario creating unit 202, (ii) the BD-J application created by the BD-J creating unit 203, and (iii) the AV Clip and Clip information file created by the multiplication unit 204 into files and directories in the format compliant with the BD-ROM standard. The formatting unit 205 then converts the thus created BD-ROM disc image into data for BD-ROM press. The pressing process is carried out based on the resulting data, so that pre-recorded BD-ROMs are produced.

<BD-ROM Content Storage Unit 206>

The BD-ROM content storage unit 206 contains the BD-ROM disc image created through the formatting process.

<MoDEST Creating Unit 207>

The MoDEST creating unit 207 includes a transcoder and a stream removing tool. After the BD-ROM authoring, the MoDEST creating unit 207 performs the authoring of a MoDEST content. To be more specific, the stream removing tool automatically removes elementary streams at the time of the conversion of the BD-ROM content into the MoDEST content.

<MoDEST/BDMV Content Storage Unit 208>

The MoDEST/BDMV content storage unit 208 stores the MoDEST/BDMV content created by the MoDEST creating unit 207. The MoDEST/BDMV content stored in the playback control engine 208 is supplied to the MoD and EST services.

This concludes the description of the authoring system. The following now describes the internal structure of the BD-J creating unit 203. The BD-J creating unit 203 is composed of an ID class creating unit 211, a Java™ programming unit 212, a BDJ object creating unit 213, a Java™ importing unit 214, an ID converting unit 215, and a Java™ Program Building Unit 216.

1. ID Class Creating Unit 211

The ID class creating unit 211 creates an ID class source code with the use of title configuration information.

The title configuration information defines the relationship among various playback units, such as titles, Movie objects, BD-J objects and PlayLists, using a tree structure. To be more specific, the title configuration information defines a node corresponding to a "medium" of the BD-ROM to be produced, a node corresponding to a "title" that is available for playback in Index.bdmv on the BD-ROM, nodes corresponding to "a Movie object and a BD-J object" constituting the title, and nodes of "PlayLists" that are available for playback in the Movie object and BD-J object, and also defines the relationship among the title, Movie object, BD-J object and PlayLists by connecting these nodes with edges. In the title configuration information, the PlayLists are described using abstract names such as MainPlaylist and MenuPlaylist, rather than using the specific file names, such as 00001.mpls and 00002.mpls, which are used to record the PlayLists onto the BD-ROM. When data for BD-ROM is produced in parallel with data for DVD-video, it is desirable that the configuration of the playback units is defined in an abstract form.

The ID class source code is a source code of a Java™ class library used by the Java™ program to access the Index.bdmv and PlayList information that is to be ultimately created on the disc. The ID class source code contains a constructor that reads a predetermined PlayList file from the removable medium by specifying a PlayList number. Playback of an AV Clip is executed using instances created by running the constructor. The variable names in the ID class library are defined using the names of the playlist nodes, such as MainPlaylist and MenuPlaylist, defined by the title configuration information. Note that the playlist number used herein is a dummy number.

2. Java™ Programming Unit 212

The Java™ programming unit 212 creates the source code of a Java™ program in accordance with editing operations made by the user via a user interface such as GUI. A BD-J application is later created based on the Java™ program source code. In order to create a Java™ program as a BD-J application, it is necessary to make a reference to information specific to the BD-ROM, such as the Index.bdmv and PlayList. In order to make such a reference, an ID class library as described above is used. The BD-J application constituting the First Playback title is described in a manner to cause the playback device to execute the root change function with the user of the MoDESTRootChange API and MoDESTRootChange system property.

3. BD-J Object Creating Unit 213

The BD-J object creating unit 213 creates BD-J object creation information based on the Java™ program source code and the ID class source code created by the Java™ programming unit 212. The BD-J object creation information provides a template of a BD-J object to be ultimately recorded on the BD-ROM and specifies a playlist with the variable names defined by the ID class library, rather than with the specific file names such as 00001.mpls and 00002.mpls.

4. Java™ Importing Unit 214

The Java™ importing unit 214 imports the Java™ program source code, ID class source code, and BD-J object creation information created by the BD-J object creating unit 213. The Java™ importing unit 214 uses the title configuration information to associate the Java™ program source code, ID class source code, and BD-J object creation information with their corresponding BD-J objects. In addition, the Java™ importing unit 214 sets the BD-J object creation information for BD-J object nodes defined by the title configuration information.

5. ID Converting Unit 215

The ID converting unit 215 converts the ID class source code imported by the Java™ importing unit 214 into a title number and a playlist number. The ID converting unit 215 also converts the BD-J object creation information to bring the playlist name defined in a BD-J object into agreement with the actual PlayList number on the removable disc.

6. Java™ Program Building Unit 216

The Java™ program building unit 216 compiles the ID class source code and the Java™ program source code converted by the ID converting unit 215 to output a resulting BD-J object and BD-J application. The BD-J application output by the Java™ program building unit 216 is in the JAR archive file format.

This concludes the description of the playback control engine 204.

Figure 13:
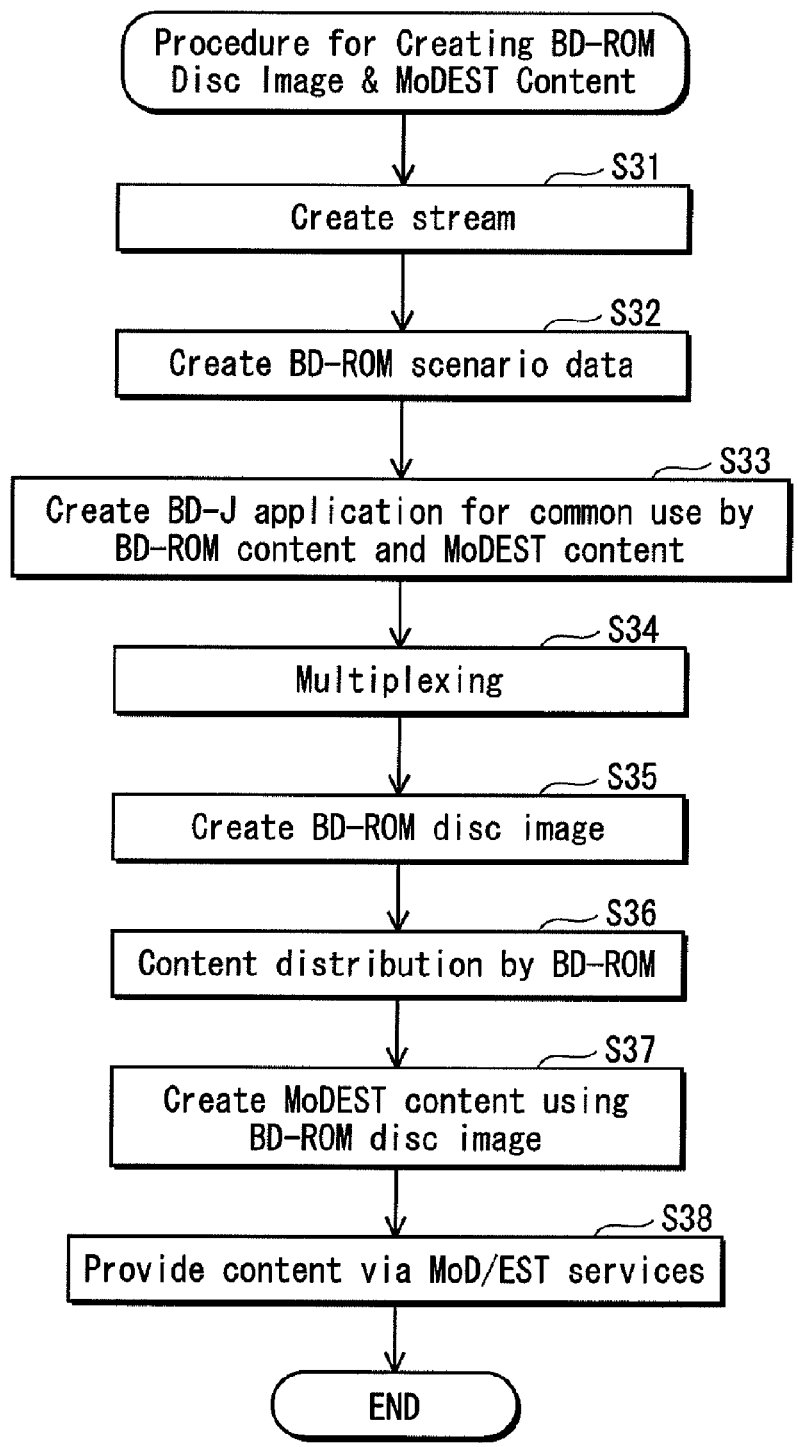
FIG. 13 is a flowchart showing the procedure of creating a BD-ROM disc image and a MoDEST/BDMV content.

FIG. 13 is a flowchart showing the procedure of creating a BD-ROM disc image and a MoDEST/BDMV content.

In Step S31, the material creating unit 201 creates a video stream, an audio stream, an IG stream, and a PG stream.

In Step S32, the scenario creating unit 202 creates BD-ROM scenario data that describes playback scenario of index.bdmv, Movie object, and PlayList information.

In Step S33, the BD-J creating unit 203 creates a BD-J application that can be used for both the BD-ROM content and MoDEST/BDMV content.

In Step S34, the multiplication unit 204 creates an AV Clip and an associated Clip information file from the BD-ROM scenario data.

In Step S35, the formatting unit 207 reorganizes the BD-ROM scenario data, the converted AV Clip, the Clip information file, reconstructed bytecode data into the files and directories complaint with the BD-ROM standard. As a result, the BD-ROM disc image compliant with the BD-ROM standard are created.

In Step S36, BD-ROMs are produced with the use of the BD-ROM disc image to distribute the movie in the form of BD-ROM.

In Step S37, the volume image of a MoDEST/BDMV content is created from the BD-ROM disc image.

In Step S38, the movie is distributed with the use of the MoDEST/BDMV content.

<Creation of BD-J Application>

In order to perform the authoring of the BD-ROM disc image in view of the future use for a MoDEST/BDMV content, it is preferable to embed, in the BD-J application, control that operates on the MoDEST/BDMV content.

In particular, the following processes should be embedded in the BD-J application. That is, in response to an event of pushing the STOP key presented on the BD-ROM menu, the display goes back to the screen saver. However, in response to a push of the STOP button presented on the MoDESTxx/BDMV menu, the display does not go back to the screen saver. Instead, the MoDESTRootChange API is called to reset the virtual root to the root directory. As long as these processes are embedded, a MoDEST/BDMV content can be crated, without requiring any change to the BD-ROM disc image.

The authoring system according to the present embodiment aims to commonly develop the BD-ROM disc image and MoDEST/BDMV content. In order to achieve this aim, the following processes need to be described in the Java language to create the BD-J application.

Figure 14:
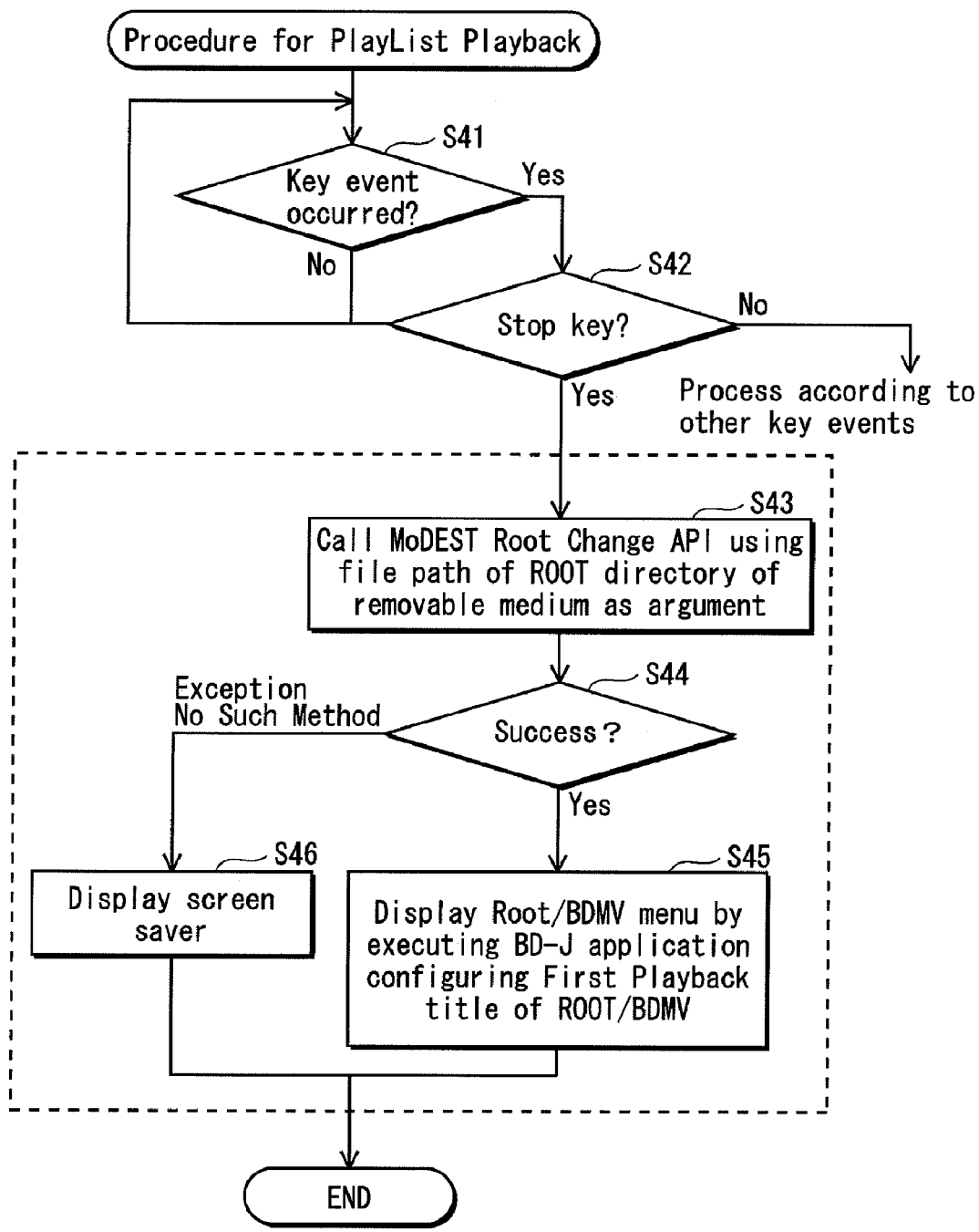
FIG. 14 is a flowchart showing the procedure of processes to be executed in response to a push of the STOP key during playlist playback.

FIG. 14 is a flowchart showing the procedure of processes to be executed in response to a push of the STOP key during playlist playback. The Java application instructs creation of a JMF player instance regarding the PlayList information, so that the playback device 103 is caused to execute playback of the PlayList information. After the playback, the control is transferred to the flowchart shown in FIG. 14. Step S41 is a judging step of judging whether any key event has occurred. In response to occurrence of a key event, it is judged in Step S42 whether the key event occurred is a STOP key event. If the key event is not a STOP key event, the processing moves onto the steps of processing the other key events. If the key event is a STOP key event, the MoDESTRootChange API is called in Step S43, using the root directory as the argument. If the call to the MoDESTRootChange API is successful (Step S44:Yes), the First Playback title in the root/BDMV directory is played, so that the root/BDMV menu is displayed (Step S45). If NoSuchMethodException occurs, the screen saver is displayed instead (Step S46).

As described above, the addition of a simple sentence to call the MoDESTRootChange API in response to a STOP key event to the Java application is all that is necessary to cause the playback device 103 to execute the process of returning to the root/BDMV menu in response to when the playlist playback is stopped. Addition of this sentence to the BD-J application at the time of BD-ROM authoring eliminates the need of any change to the BD-J application constituting the First Playback title even when a MoDEST/BDMV content is newly created based on the BD-ROM content.

Note that the root/BDMV menu for BD-ROM may be merged with the MoDESTxx/BDMV menu for MoD/EST, and the authoring may be performed on the merged menu. To this end, an API (GetCurrentPath) is additionally required in order for the BD-J application to acquire the file path that is currently selected. By calling the additional API, either of the root/BDMV menu and the MoDESTxx/BDMV menu is used. In such a case, the root/BDMV menu is restored in response to a push of the STOP key for an extended duration or repeatedly in succession.

(Modifications of Embodiment 4)

In order for the user to use his own PC as the recording device 102b, a series of software components constituting the BD-J creating unit 203 may be downloaded to the PC, along with the MoDEST/BDMV content purchased through the MoD and EST services. With the series of software components downloaded, the user's PC can be used as an authoring device and to create a BD-J application.

In this case, the user is allowed to modify the BD-J application constituting the First Playback title distributed with the MoDEST/BDMV content to suit the needs or preferences of the user. By making such modifications, the user may enjoy the MoDEST/BDMV content with the root/BDMV menu dedicated specifically for his personal library.

When supplying the series of software components constituting the BD-J creating unit 203 to the user, the provider may provide such a service that is available for a limited time only in order to promote purchases on the root menu created by the user.

Embodiment 5

Embodiment 5 of the present invention describes the internal structure of the MoDESTxx directory and the process of creating a virtual package, based on the data and file structure of the MoDESTxx directory.

Figure 15:
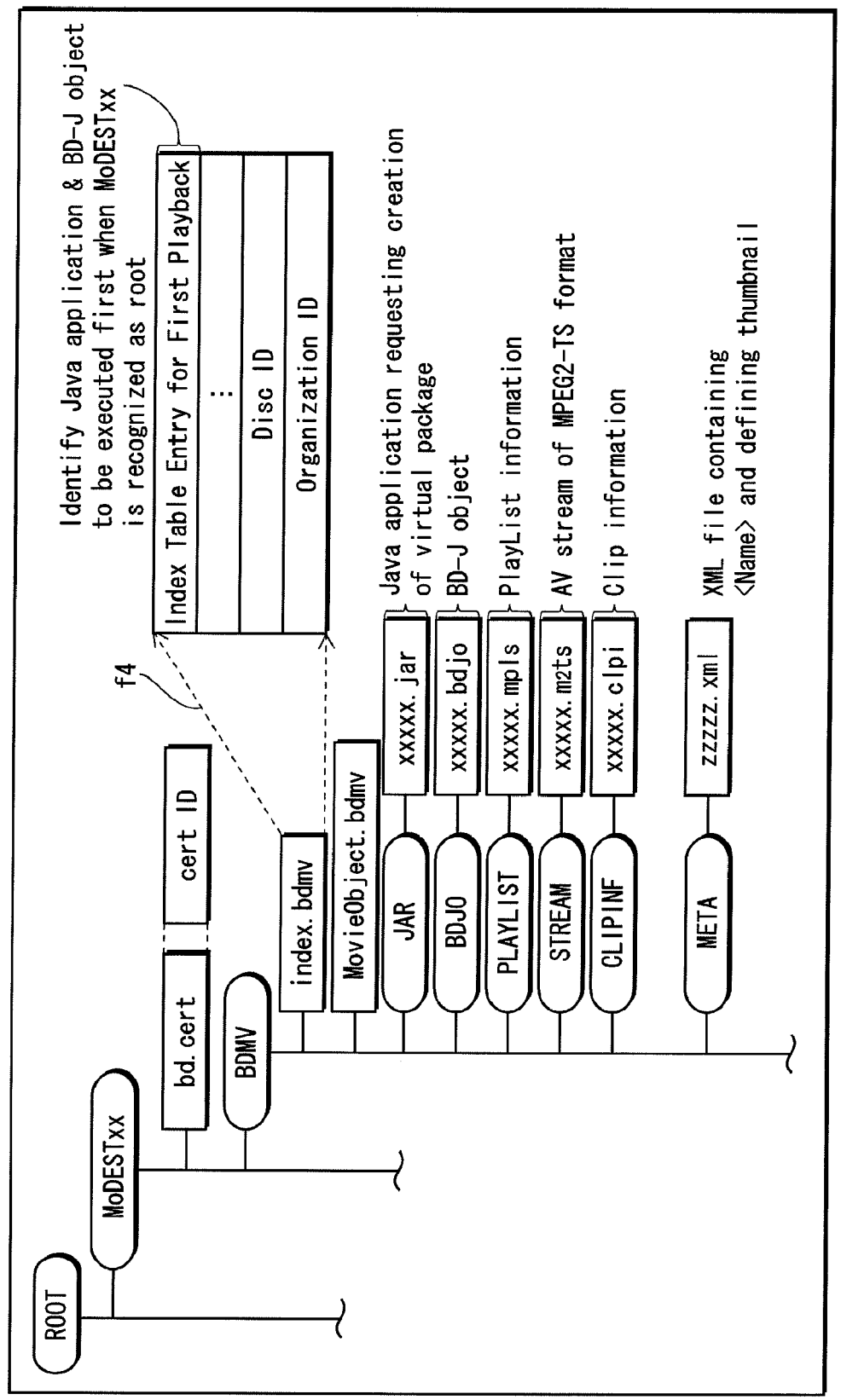
FIG. 15 is a view showing the structure of directories and files below a MoDESTxx directory.

FIG. 15 is a view showing the structure of directories and files below the MoDESTxx directory.

The bd.cert file and the BDMV directory are located immediately below the MoDESTxx directory.

The bd.cert (fixed file name) is a certificate (hereinafter referred to as a merge certificate) to be used for a signature verification when a BUDA content is merged with a BD-ROM content or with a MoDEST/BDMV content corresponding to the BD-ROM. The merge certificate is a certificate that is used for authenticating the file (merge management information file) which stores merge management information of the BD-ROM. The merge certificate includes a public key publicized by the provider. The file format of the merge certificate may be, for example, X.509. The detailed specifications of X.509 are recited in CCITT Recommendation X.509 (1988), "The Directory - - - Authentication Framework" issued from the International Telegraph and Telephone Consultative Committee. The lead line f1 in FIG. 15 indicates the usage of the bd.cert file. As indicated by this lead line, the bd.cert file is used for the purpose of extracting an ID (called "Cert ID") unique to the certificate.

Under the BDMV directory, five sub-directories (a PLAYLIST directory, a CLIPINF directory, a STREAM directory, a BDJO directory, and a JAR directory) exist. Also, two types of files (index.bdmv and MovieObject.bdmv) exist under the BDMV directory. Since the "CLIPINF directory", "STREAM directory", and "BDJO directory" have been already described in Embodiment 1, the description hereinafter relates to the other directories and files.

<Index.bdmv>

The index.bdmv is management information relating to the entire MoDESTxx/BDMV directory. After the MoDESTxx/BDMV is recognized as the root directory, the index.bdmv is read first to cause the playback device to uniquely identify the content stored in the MoDESTxx/BDMV directory. The lead line f4 in FIG. 15 indicates the close-up of the internal structure of index.bdmv. As described in Embodiment 1, the index.bdmv includes information specifying the BDJ object constituting the First Playback title that is to be played first after the MoDESTxx/BDMV directory is recognized as the root directory. In addition, the index.bdmv contains information such as: an Organization ID (32 bits) that is an identifier of the provider of the movie work; and a disc ID (128 bits) that is an identifier uniquely assigned to the BD-ROM provided by the provider. When a BD-ROM content on a BD-ROM is distributed through the MoD and EST services, the same disc ID used to identify the BD-ROM is used.

<JAR Directory>

The JAR directory located below the MoDESTxx/BDMV directory contains a file with the extension "jar" (where "jar" (xxxxx.jar, where "xxxxx" is variable and extension "jar" is fixed).

Each file with the extension "jar" is a Java™ archive file and contains an application constituting the First Playback title in the MoDEST/BDMV content. Such an application builds a virtual package having the MoDESTxx/BDMV directory and the BUDA directory in combination.

<BDJO Directory>

The BDJO directory located below the MoDESTxx/BDMV directory contains a file with the extension "bdjo" (xxxxx.bdjo, where "xxxxx" is variable and the extension "bdjo" is fixed). The BDJO directory stores a BDJ object for causing the Java™ application contained in the MoDESTxx/BDMV directory to execute as BD-J application.

This concludes the description of the directories and files in the MoDESTxx directory. The following now describes the details of the playback device 103.

Figure 16:
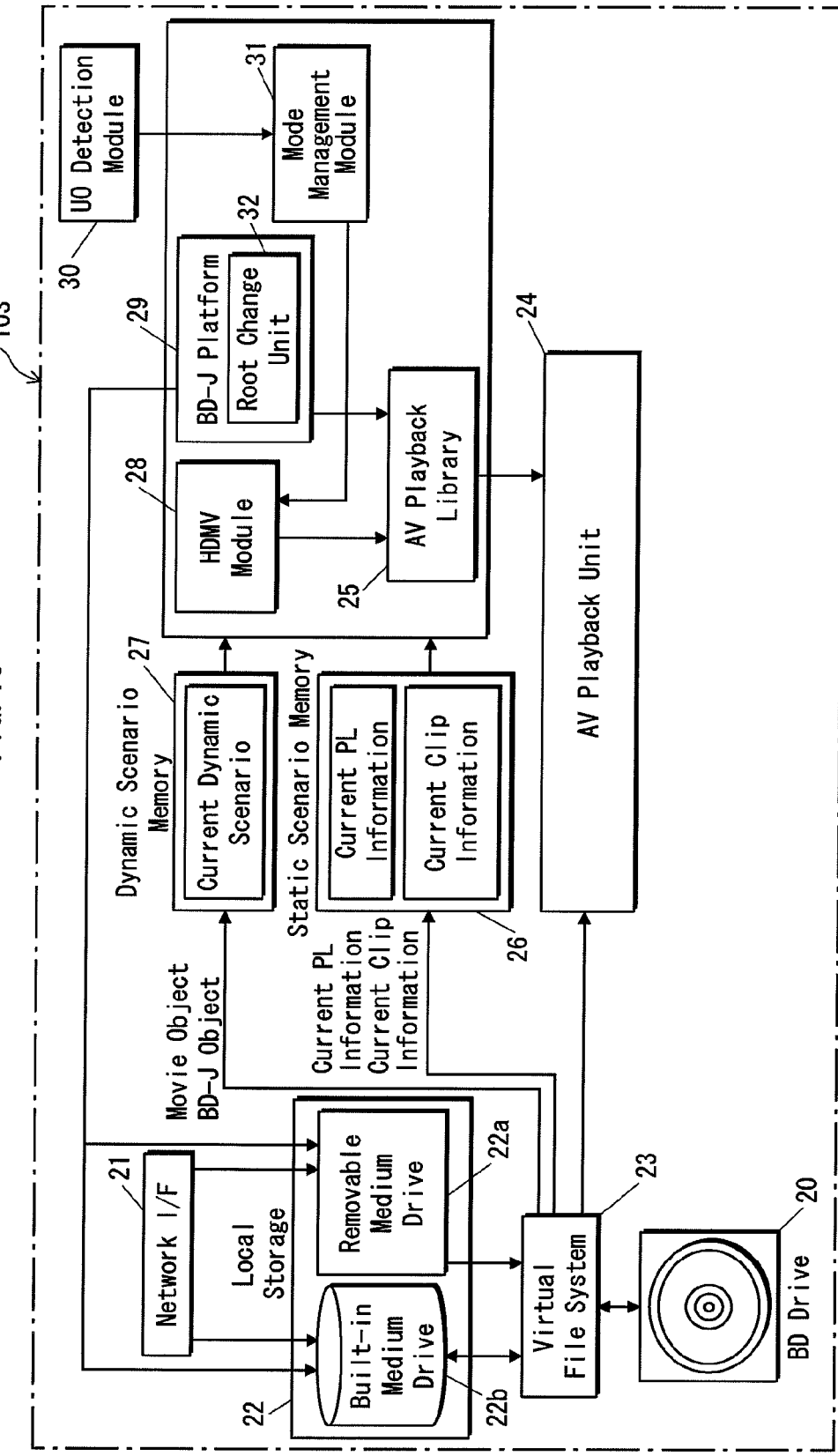
FIG. 16 is a block diagram showing the functional structure of the playback device 103.

FIG. 16 is a block diagram showing the functional structure of the playback device 103. As shown in FIG. 16, the playback device 103 includes a BD drive 20, a network interface 21, a local storage 22, a virtual file system 23, a static scenario memory 26, a dynamic scenario memory 27, an HDMV module 28, a BD-J module 29, a UO detection module 30, a mode management module 31, and a root change unit 32. Note that in the playback device 103, Linux is adopted as the operating system, and the hardware and the software of the playback device 103 are controlled via Linux. The playback device 103 of Embodiment 5 can be industrially manufactured in the following manner. That is, a Java™ platform is formed by fully implementing Java™ 2Micro_Edition (J2ME) Personal Basis Profile (PBP 1.0) and Globally Executable MHP specification (GEM1.0.2) for package media targets, and then providing the following functional components on the Java™ platform.

(BD Drive 20)

The BD drive 20 performs loading/ejecting of the BD-ROM onto and from the playback device, and performs accesses to the BD-ROM. Since the operating system of the present BD-ROM playback device 103 is Linux, a command "/mount point BD/BDMV" is issued to assign the BDMV directory to the BD drive 20.

(Network Interface 21)

The network interface 21 executes a protocol stack for the network connection. The network interface 21 causes the playback device 103 to recognize the drive provided in the server computer on the network, as the network drive. The network interface 21 performs downloading and uploading data via the network drive. The network interface 21 is used to download a BUDA content publicized on the Internet.

(Local Storage 22)

The local storage 22 is composed of a drive 22a for accessing the removable medium, which is a semiconductor memory card, and a drive 22b for accessing the built-in medium 104. The local storage 22 is used to store bonus contents. The area for storing bonus contents is divided for each BD-ROM, and the area for storing data to be used by the application is divided for each application. The removable mediums 100 and 101 and the built-in medium 104 also store merge management information that includes description of rules for merging a downloaded bonus content with data on the BD-ROM, the rules referred to as merge rules.

As described before, the operating system of the BD-ROM playback device 103 is Linux. Accordingly, when the removable medium drive 22b is an SD memory card drive, and a drive name "SD" has been assigned to the removable medium drive, a command "/mount point SD/BUDA" is issued to assign the SD drive for the removable medium 101a directory for storing BUDA contents (BUDA directory). Similarly, the BUDA directory may be assigned to the drive for accessing the built-in medium. With this arrangement, the BUDA directory for storing a BUDA content can be provided at any location in the virtual package.

(Virtual File System 23)

The virtual file system 23 virtually creates a BD-ROM (virtual package) by merging the bonus content recorded on either of the built-in medium 104 and the removable mediums 100 and 101, with the content recorded on the BD-ROM. The virtual package creation is performed based on the merge management information recorded on a corresponding one of the built-in medium 104 and the removable mediums 100 and 101 together with the bonus content. Through the VFS, the HDMV modulate 28 and BD-J platform 29 can access the virtual package just in the same say as accessing the original BD-ROM. During playback of the virtual package, the playback device 103 execute the playback control using both data on the BD-ROM and data on the corresponding one of the built-in medium 104 and removable mediums.

(Virtual File System 23)

The virtual file system 23 creates a virtual BD-ROM (virtual package) by merging a bonus content residing on the removable medium or either of removable mediums with the content residing on the BD-ROM, based on the merge management information stored on the removable mediums 100 and 101 and the built-in medium 104. By virtue of the VFS, the HDMV module 28 and the BD-J module 29 can refer to both the virtual package and the original BD-ROM in the same manner. When the virtual package is played back, the playback device 103 performs a playback control using both of the data on the BD-ROM and the data on the built-in medium 104 or on the removable medium.

(AV Playback Unit 24)

The AV playback unit 24 executes playback of AV streams recorded on the removable mediums 100 and 101 and the built-in medium 104 based on the PlayList information and Clip information.

(AV Playback Unit 24)

The AV playback unit 24 executes playback of the AV stream recorded on the removable mediums 100 and 101 and the built-in medium 104, based on the PlayList information and the Clip information.

(AV Playback Library 25)

The AV playback library 25 executes the AV playback function or the PlayList playback function, when it receives a function call from the BD-J module 29 or BD-J platform 29. The AV playback function includes functions succeeded from DVD players and CD players, such as the playback start, playback stop, pause, release of pause, release of still picture function, fast-forward at speed specified by an immediate value, rewind at speed specified by an immediate value, audio switch, subtitle switch, and angle switch. The PlayList playback function includes some of these AV playback functions, such as the playback start and playback stop, where the PlayList playback functions are performed based on the PlayList information.

(Static Scenario Memory 26)

The static scenario memory 26 is a memory for storing a current PL information and current Clip information. The current PL information is a piece of PlayList information that is the current target of processing, among a plurality of pieces of PlayList information recorded on the BD-ROM, the removable mediums 100 and 101, and the built-in medium 104.

(Dynamic Scenario Memory 27)

The dynamic scenario memory 27 is a memory in which the current dynamic scenario is preliminarily stored. The dynamic scenario memory 27 is subjected to processes performed by the HDMV module 28 and the BD-J platform 29. The current dynamic scenario is a Movie object or a BD-J object that is the current target of execution, among the Movie objects and BD-J objects recorded on the BD-ROM, the removable mediums 100 and 101, and the built-in medium 104.

(HDMV Module 28)

The HDMV module 28 is a DVD virtual player that is an execution entity in the HDMV mode, and executes the Movie object read onto the dynamic scenario memory 27.

(BD-J Platform 29)

The BD-J platform 29 is a Java™ platform, and is composed of a Java™ virtual machine, configuration, and profile. The BD-J platform 29 generates the current Java™ object by generating a Java™ bytecode from a Java™ class file read out onto the dynamic scenario memory 27, and executes the generated current Java™ object. The Java virtual machine converts a Java object written in the Java language, into the native code for the CPU of the playback device.

(UO Detection Module 30)

The UO detection module 30 detects a user operation having been input via an input device such as a remote control or a front panel of the playback device 103, and notifies the mode management module 31 of the detected user operation. This notification is made as the UO detection module 30 generates a UO (User Operation) in accordance with an interrupt generated by an interrupt handler provided in a device driver corresponding to the input device in concern, and outputs the generated UO to the mode management module 31. The UO is an event (UO event) that occurs when a key included in a key matrix provided on a remote control or a front panel is depressed and the depression of the key is detected. The UO includes a key code corresponding to the depressed key. More specifically, when the interrupt handler provided in the device driver corresponding to the remote control or the front panel detects a depression of a key by a key sense for the key matrix, the interrupt handler generates an interrupt signal based on the key depression. With the generation of the interrupt signal, the UO event is generated.

(Mode Management Module 31)

The mode management module 31 holds the index.bdmv read out from any of the BD-ROM, the removable mediums 100 and 101, and the built-in medium 104, and performs a mode management and a branch control. The mode management by the mode management module 31 is an assignment of a module, namely, an assignment of the HDMV module 28 or the BD-J platform 29 that is to execute the dynamic scenario.

(Root Change Unit 32)

The root change unit 32 performs the root change function in response to a call to the MoDESTRootChange API, with the applied use of a mounting process that is available in the file system such as UNIX. The mounting process refers to a process of attaching a directory U managed under the file system of a computer A (server) to a directory X managed under the file system of a computer B (client). As a result of the mounting process, an access request from an application residing on the computer B to the directory U residing on the computer A is made by specifying the directory X rather than the directory U in the computer A. By using this mouthing process, the root change unit 32 instructs the kernel of the real-time OS to perform a mounting process that designates the root directory of the removable medium as the "mount destination directory X" and the BDMV directory immediately below the MoDEST directory as the "mount source directory". As a result of the mounting process, the management information regarding the MoDESTxx directory, from among the directories and files managed by the OS, is located immediately below the management information of the root directory. Through the above mounting process, the root change function is performed.

The mounting process is made by operating the file control block. The file control block refers to an area in the system area allocated for use by the real-time OS and used to store information indicating the directory and file structure (i.e. file/directory information). All the files and directories shown by the directory/file information stored in the file control block are recognized as residing on the removable medium (100 or 101). Thus, when performing the root change function, the root change unit 32 deletes, from the directory/file information stored in the file control block, the directory/file information regarding directories and files belonging to the root/BDMV directory. After the deletion, the root change unit 32 overwrites the directory/file information stored in the file control block to indicate that the MoDESTxx/BDMV directory is located immediately below the root directory. As a result of the overwriting, the MoDESTxx/BDMV directory is set as the root/BDMV directory. Since the root/BDMV directory is deleted prior to execution of the root change function, the BDMV directory becomes the only directory that is recognized in the root/BDMV directory. Upon the end of playback of the MoDESTxx/BDMV directory, the setting of the virtual root directory needs to be released. To this end, the root change unit 32 reads the directory/file information from a corresponding one of the removable mediums 100 and 101 and stores the read directory/file information back into the file control block. In this way, the root change function is performed by appropriately overwriting the directory/file information as described above.

(File System Structure of Removable Mediums 100 & 101 and Built-in Medium 104)

The following describes the file system of the removable mediums 100 and 101 and the built-in medium 104 for storing a BUDA content.

Figure 17:
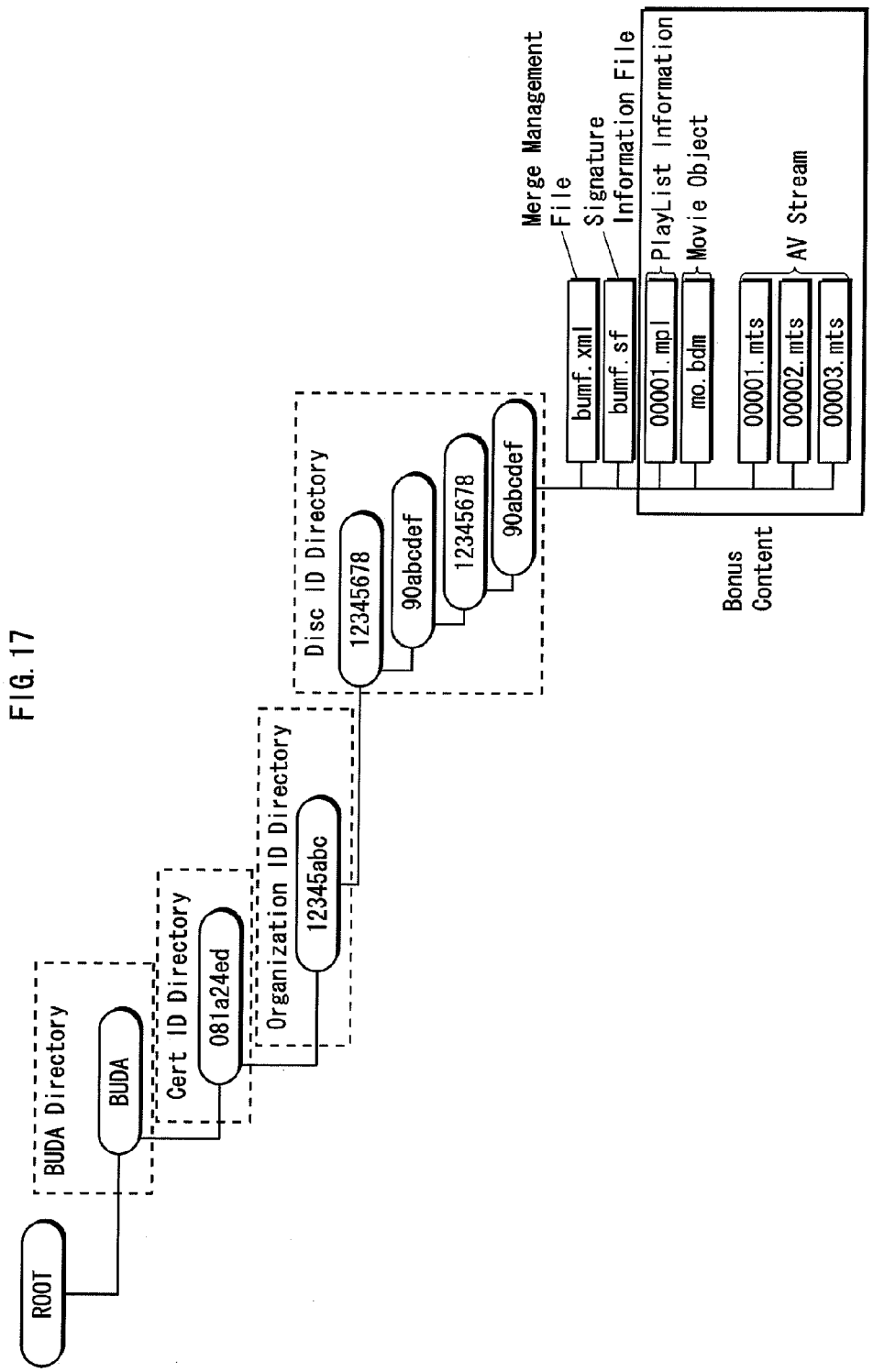
FIG. 17 is a view showing the directory structure of a BUDA directory.

FIG. 17 is a view showing the directory structure of the BUDA directory. Each of the removable mediums 100 and 101 and the built-in medium 104 has a BUDA directory for storing a bonus content, a Cert ID directory, an Organization ID directory, and Disc ID directory. The Disc ID directory includes a merge management information file "bumf.xml", a signature information file "bumf.sf", and additional contents "00001.mpl", "mo.bdm", and "00001.mts".

The root directory (i.e., the BUDA directory) of the BUDA directory is located immediately below the root directory of a corresponding one of the removable mediums 100 and 101 and the built-in medium 104.

The Cert ID directory is a directory that has, as its name, an ID obtained from the merge certificate (bd.cert) on the BD-ROM, and is a directory whose name is composed of eight characters in hexadecimal notation represented by the first 32 bits of 160 bits which represent the SHA-1 digest value of the merge certificate.

The "Organization ID directory" is described in the BD management information (index.bdmv) that is recorded on the BD-ROM and has a name composed of eight characters that is a hexadecimal equivalent of a 32-bit identifier (Organization ID) that identifies the movie provider.

The "Disc ID" directory is composed of four layers of sub-directories. Each of the four layers of sub-directories is assigned with a directory name composed of eight or less characters. Each sub-directory has an eight-character name in hexadecimal notation represented by a set of 32 bits, which is a quarter of 128 bits constituting the Disc ID being the identifier of the BD-ROM. The Disc ID is written in the BD management information (index.bdmv) on the BD-ROM, and thus can be obtained by opening the index.bdmv. In an example case provided in the present embodiment, four directory names "12345678", "90abcdef", "12345678", and "90abcdef" are obtained by dividing the 32-character (128-bit) Disc ID "1234567890abcdef1234567890 abcdef", by 8 characters (32 bits) starting with the least significant bit. This arrangement enables the Disc ID to correspond to the 8.3 format without omitting meaningful characters among the characters constituting the Disc ID. This renders the four layers of sub-directories strictly associated with the Disc ID.

The Disc ID directory contains "merge management information file", "signature information file", and "bonus content". These files form the core of generating the virtual package. The contents of the files will be described in detail in the following.

The "merge management information file" is information that indicates the correspondence between a file path of an bonus content on either of the removable mediums 100 and 101 and the built-in medium 104 and a file path for an "alias access" on the virtual package. The merge management information file is stored in the Disc ID directory, with a file name "bumf.xml".

FIG. 18 shows the internal structure of the merge management information. The merge management information shown in FIG. 18 indicates correspondence between the file paths on the removable mediums 100 and 101 and the built-in medium 104 and the file paths on the virtual package, with respect to the three additional contents: 00001.mpl, mo.bdm, and 00001.mts. The file paths on the removable mediums 100 and 101 and the built-in medium 104 are in conformity with the 8.3 format.

The description of the file paths in FIG. 18 will be explained in more detail. The 8.3-format file path "12345abc/12345678/90abcdef/12345678/90abcdef/00001.mpl" used in the removable mediums 100 and 101 and the built-in medium 104 corresponds to a file path "BDMV/PLAYLIST/00001.mpls" used in the virtual package. This example coincides with the previously mentioned figure, so that the path from the Cert ID directory to the bonus content is described.

The 8.3-format file path "12345abc/12345678/90abcdef/12345678/90abcdef/mo.bdm" used in the removable mediums 100 and 101 and the built-in medium 104 corresponds to a file path "BDMV/PLAYLIST/00001.bdmv" used in the virtual package.

The 8.3-format file path "12345abc/12345678/90abcdef/12345678/90abcdef/00001.mts" used in the removable mediums 100 and 101 and the built-in medium 104 corresponds to a file path "BDMV/PLAYLIST/00001.m2ts" used in the virtual package. The files merged into the virtual package shown in the figure are actually contained in the MoDESTxx/BDMV directory. Yet, by virtue of the MoDESTRootChange API, those files are processed as being contained in the root/BDMV directory.

Figure 19:
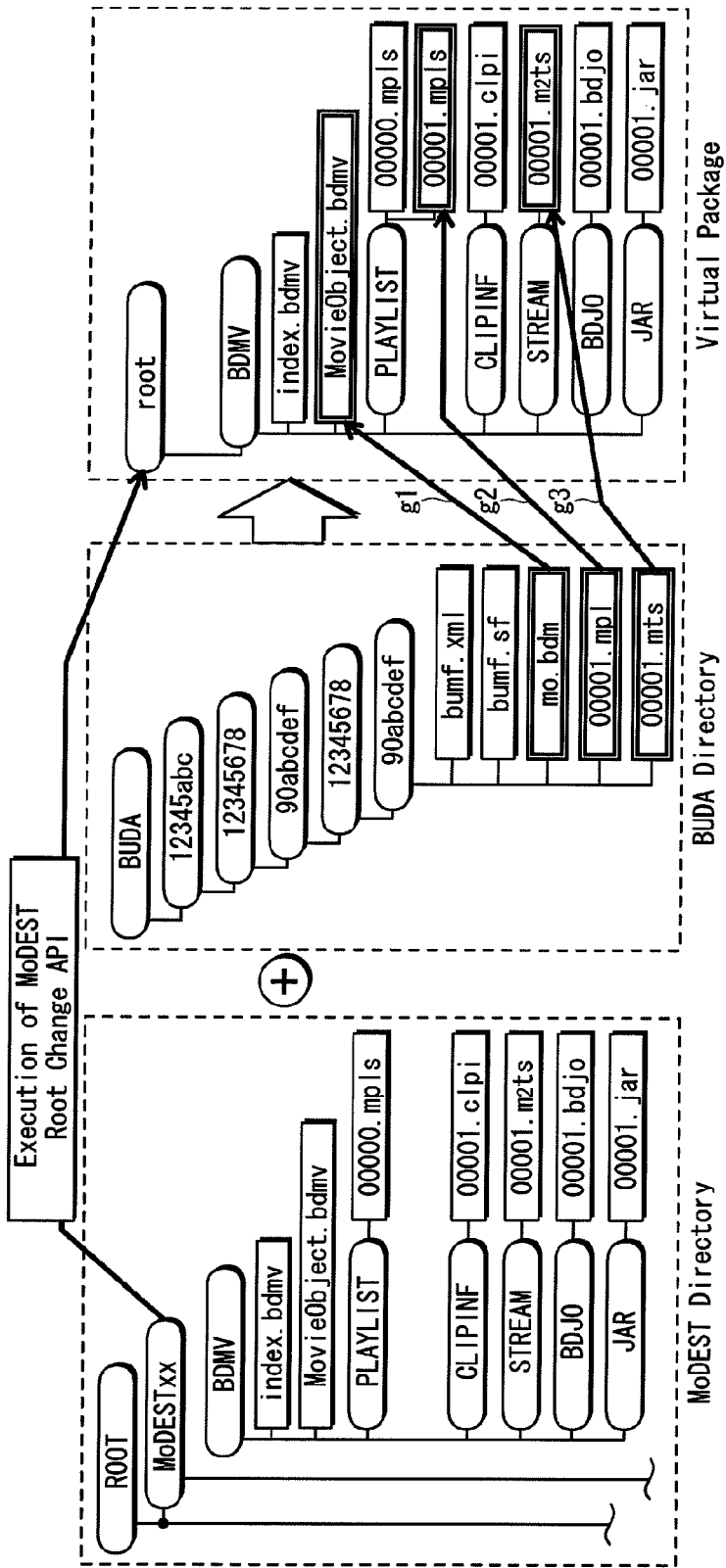
FIG. 19 shows the process where a content recorded on the MoDESTxx/BDMV is merged with a BUDA content recorded on the removable medium, based on the merge management information.

FIG. 19 shows the process where a content recorded on the MoDESTxx/BDMV is merged with a BUDA content recorded on the removable medium, based on the merge management information.

The left-hand side of the figure shows the MoDESTxx/BDMV directory, the middle of the figure shows the BUDA directory, and the right-hand side of the figure shows the virtual package. Since the merge management information file is set as shown in FIG. 19, of the data stored on each of the removable mediums 100 and 101 and the built-in medium 104, three bonus contents "mo.bdm" "00001.mpl" and "00001.mts" that are contained in the directories below the BUDA directory, namely "12345abc", "12345678" "90abcdef" "12345678" "90abcdef" are merged into the directory structure of the virtual package, as indicated by the arrows g1, g2, and g3. The above process of incorporating files on the removable mediums 100 and 101 and the built-in medium 104 into the directory structure described in the merge management information is called "merge (merging)".

The above-described merge enables mo.bdm to be accessed with an alias file name "MovieObject.bdmv" that is present in the BDMV directory.

The above-described merge also enables 00001.mpl to be accessed with an alias file name "00001.mpls" that is present in the PLAYLIST directory under the BDMV directory.

The above-described merge also enables 00001.mts to be accessed with an alias file name "00001.m2ts" that is present in the STREAM directory under the BDMV directory.

As described above, the alias access becomes possible. Thus, mo.bdm, 00001.mpl, and 00001.mts can be treated as being present in BDMV/MovieObject.bdmv, BDMV/PLAYLIST/00001.mpls, and BDMV/STREAM/00001.m2ts, respectively.

The "signature information file" is a file indicating an electronic signature applied by the provider to the merge management information file, and is stored in the Disc ID directory with a file name "bumf.sf". In general, an encrypted hash value is used as the electronic signature, where the encrypted hash value is generated by calculating a hash value for the information that needs to be protected from tampering, and encrypting the hash value using a predetermined private key. Examples of the information that needs to be protected from tampering include a file name of a bonus content, and a file path to be used for recording a bonus content onto the built-in medium 104. The file path is recorded in the LFN format, and is written in the merge management information file. Thus, a hash value is calculated for a file path written in the merge management information file. Note that in this signature information file, the hash value for the merge management information file is encrypted using a private key corresponding to a public key contained in the merge certificate recorded on the BD-ROM.

Of the two bonus contents shown in FIG. 17, "00001.mpl" stores PlayList information, and "mo.bdm" stores a Movie object. Other than these, any file to be recorded on the BD-ROM can be selected as a target of the bonus content, in so far as the file can be supplied to the user. Also, a file (with extension "clpi") storing index.bdmv or Clip information, a Java archive file (with extension "Jar"), or a file (with extension "bdjo") storing a BD-J object can be selected as a target of the bonus content. This completes the explanation of the normal data area.

Figure 20:
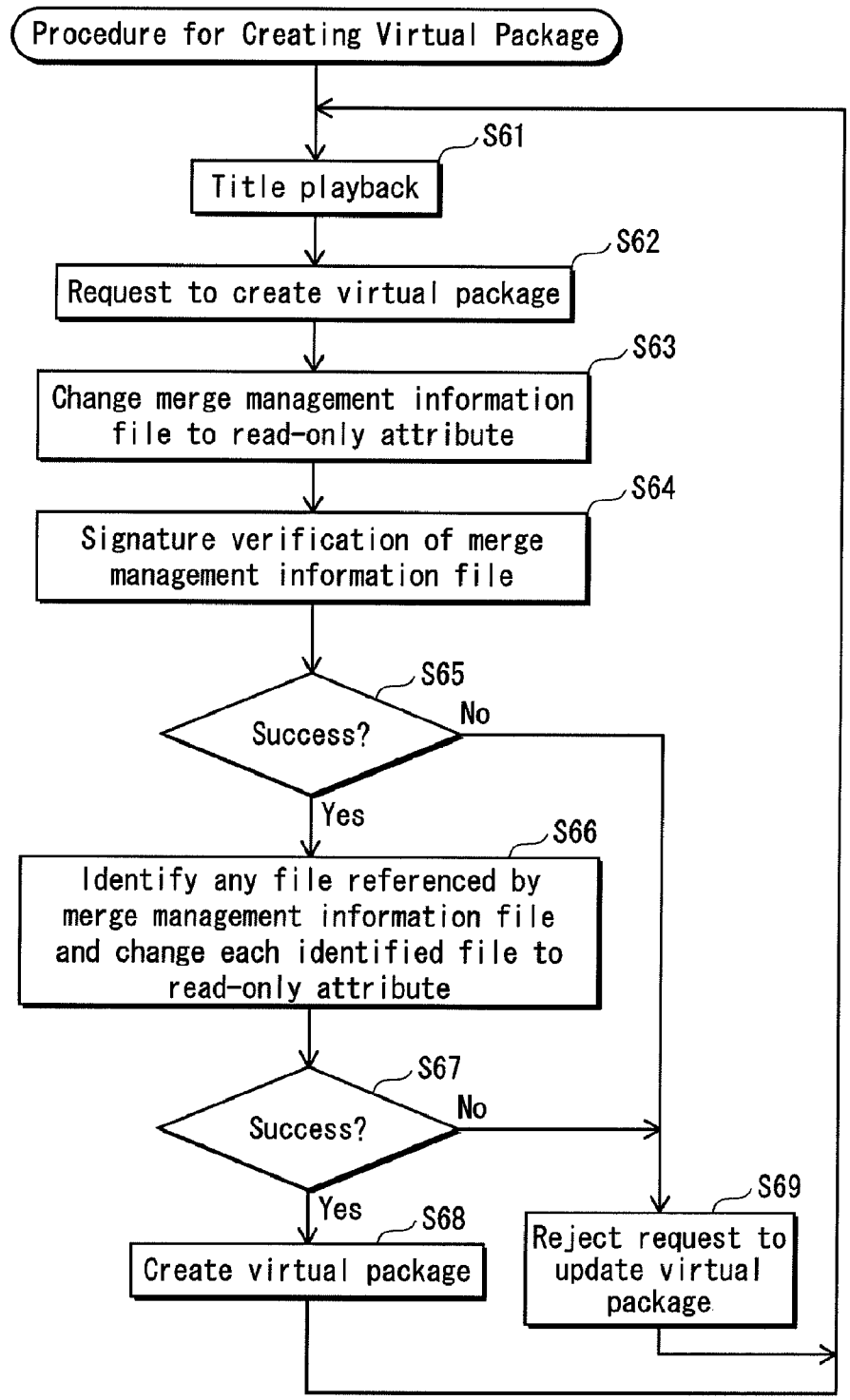
FIG. 20 is a flowchart showing the procedure of creating a virtual package.

FIG. 20 is a flowchart showing the procedure of creating a virtual package. A title is played back in the BD-J mode (Step S61). During the playback of the title, the BD-J application requests an update of the virtual package (Step S62).

The value of the argument that is given when an update of the virtual package is requested is composed of a file path indicating the position of a merge management information file and a file path indicating the position of a signature information file corresponding to the merge management information file.

When the virtual file system 23 receives a virtual package update request, the state of the virtual file system 23 is set to "update in preparation" and the specified merge management information file is changed to a read-only attribute so as not to be rewritten (Step S63). Then the signature of the merge management information file is verified using the signature information file having been specified when the virtual package update request was issued (Step S64).

When the verification in Step S64 results in the failure (No in Step S65), the virtual file system 23 stops the virtual package update process, returns the attribute of the new merge management information file from "read-only" to the previous one before the reception of the virtual package update request, and throws a virtual package update request rejection notification event (Step S69).

When the verification in Step S64 results in the success (Yes in Step S65), the virtual file system 23 checks whether or not there are files on the removable mediums 100 and 101 and the built-in medium 104 referred to by the new merge management information file, and when there are such files, changes the attribute of the files from the BD-J application to "read-only" (Step S66).

When there are no such files, on the removable mediums 100 and 101 and the built-in medium 104, that are required for the creation of the virtual package and are referred to by the merge management information file (No in Step S67), the virtual file system 23 stops the virtual package update process, returns the attributes of the files that was changed in steps S63 and S66 back to the previous attributes present before the reception of the virtual package update request, and throws a virtual package update request rejection notification event to the BD-J application (Step S69).

After it is confirmed that all the files that are required for the creation of the virtual package and are referred to by the new merge management information file exist on the removable mediums 100 and 101 and the built-in medium 104, and the process of changing the attribute of the files from the BD-J application to "read-only" is completed (Yes in Step S67), the virtual file system creates the virtual package based on the merge management information file (Step S68).

After the -creation of the virtual package, the "read-only" attribute is removed from the files on the removable mediums 100 and 101 and the built-in medium 104 that are referred to by the old merge management information file but not by the new merge management information file. As a result, those files can be read and written by the BD-J application. On the other hand, the "read-only" attribute is maintained for the new merge management information file and the files on the removable mediums 100 and 101 and the built-in medium 104 that are referred to by the new merge management information file.

According to the present embodiment described above, any file contained in MoDESTxx/BDMV directory is specified by a file path and incorporated into a virtual package. Thus, the need is eliminated to use a different file path depending on whether the file to be incorporated into the virtual package is located in the root/BDMV directory or the MoDESTxx/BDMV directory, which reduces the work load required for authoring.

Embodiment 6

In Embodiment 6 of the present invention, a description is given of elementary streams multiplexed into an AV stream stored in the MoDESTxx directory.

Figure 21:
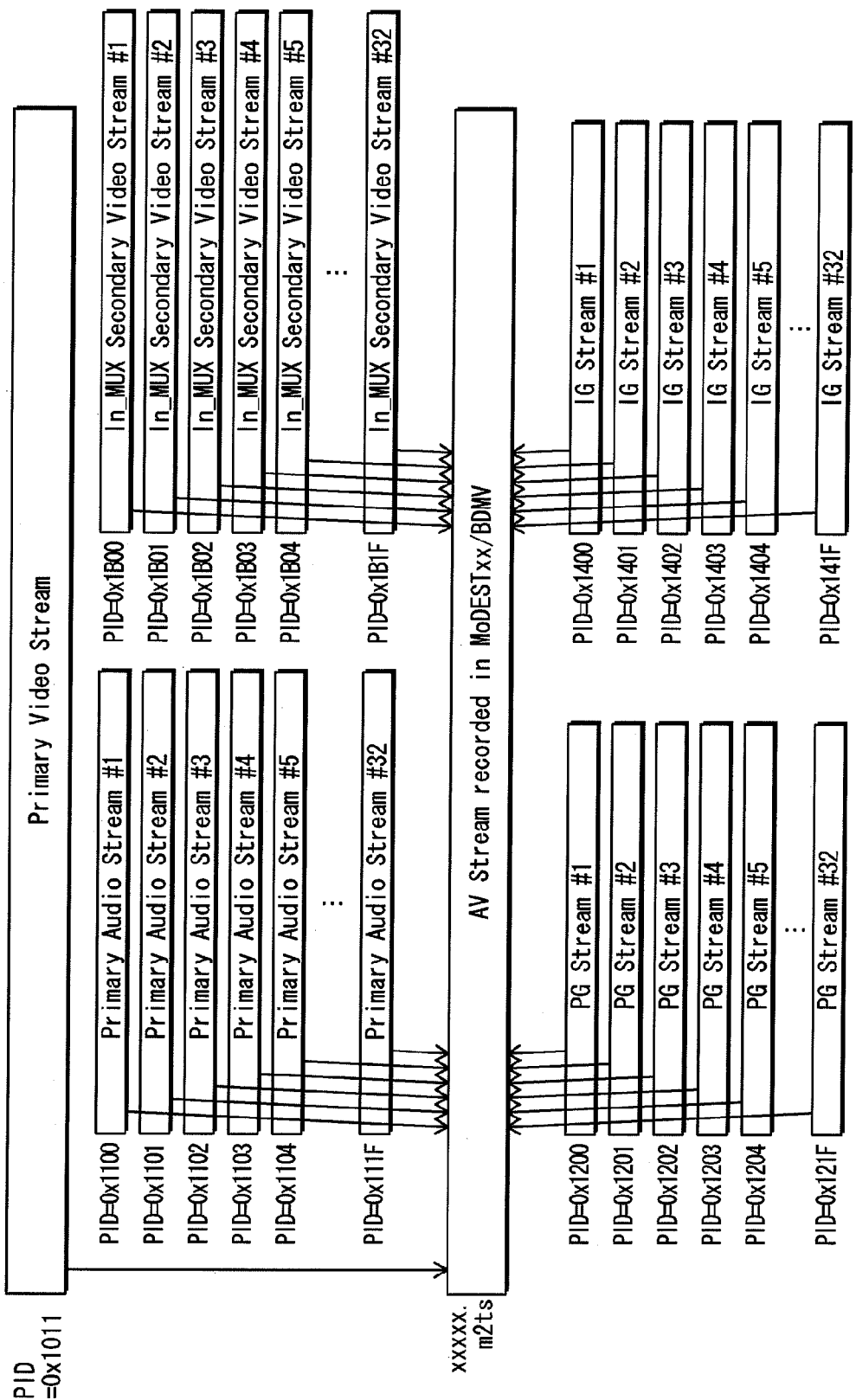
FIG. 21 shows elementary streams multiplexed in an AV stream stored in the MoDESTxx/BDMV directory.

FIG. 21 shows elementary streams multiplexed in an AV stream stored in the MoDESTxx/BDMV directory. The elementary streams multiplexed into an AV stream stored in the MoDESTxx/BDMV directory are: a primary video stream with PID "0x1011"; primary audio streams with PIDs from "0x1100" to "0x111F"; 32 PG streams with PIDs from "0x1200" to "0x121F"; 32 IG streams with PIDs from "0x1400" to "0x141F"; and 32 Secondary video streams with PIDs from "0x1B00" to "0x1B1F".

FIG. 22 shows a PID assignment map of the elementary streams recorded in the MoDESTxx/BDMV directory. The left-hand column of the PID assignment map indicates a plurality of ranges in which the PID values fall. The right-hand column of the PID assignment map indicates the elementary streams that are assigned to the ranges, respectively. From the PID assignment map shown in FIG. 22, the following will be understood: the range of PID value "0x0100" is assigned to program_map; the range of PID value "0x1001" is assigned to PCR; the range of PID value "0x1011" is assigned to Primary video stream; the range of PID values "0x1100" to "0x111F" is assigned to Primary audio streams; the range of PID values "0x1200" to "0x121F" is assigned to PG streams; the range of PID values "0x1400" to "0x141F" is assigned to IG streams; and the range of PID values "0x1B00" to "0x1B1F" is assigned to In_MUX_Secondary video streams.

The AV streams to be recorded in the MoDESTxx/BDMV directory have been explained up to now. The following will explain in detail the AV streams to be recorded into the BUDA directory.

Figure 23:
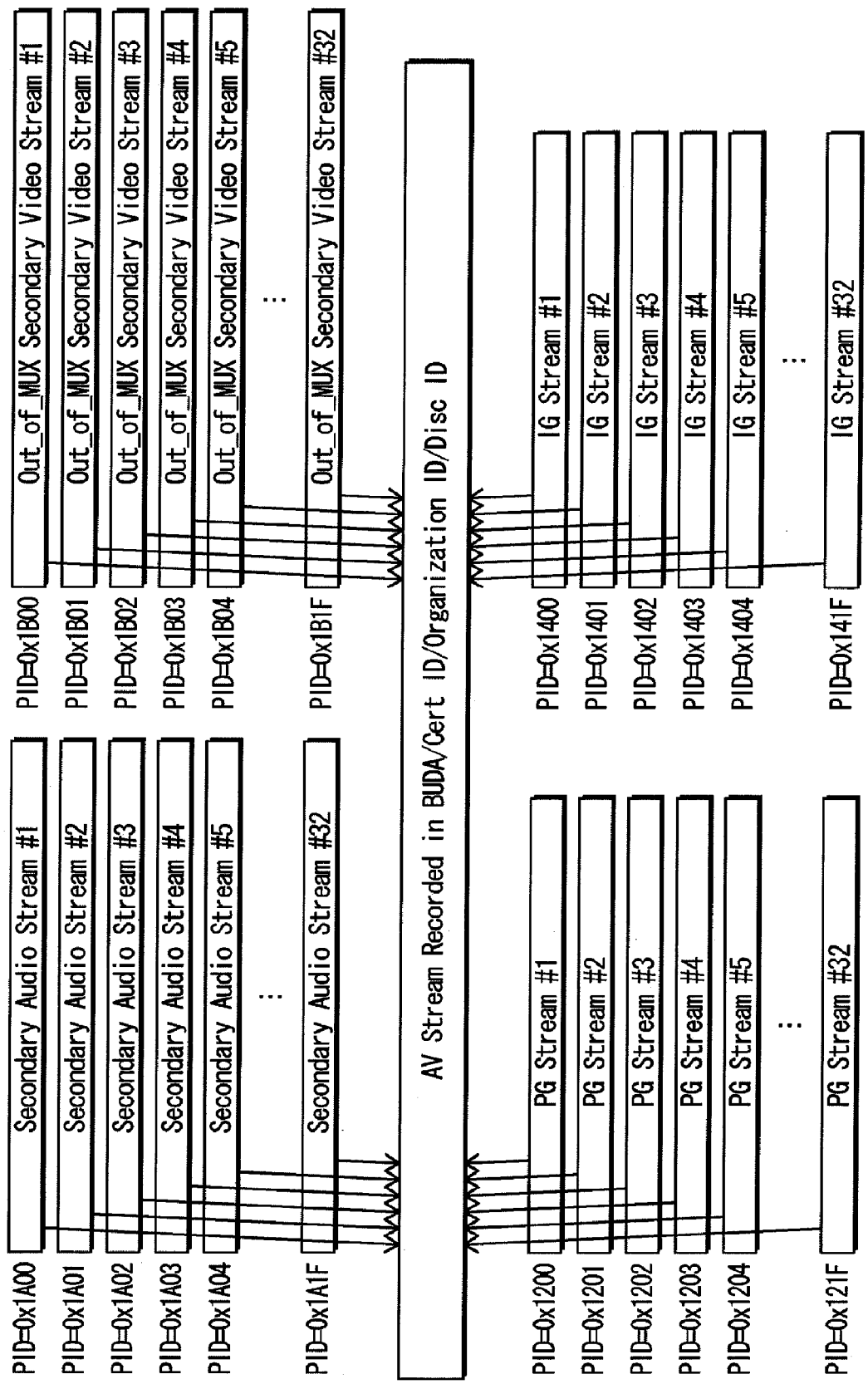
FIG. 23 shows elementary streams multiplexed in an AV stream to be recorded into the BUDA directory.

FIG. 23 shows elementary streams multiplexed in an AV stream to be recorded into the BUDA directory. The elementary streams multiplexed in an AV stream to be recorded into the BUDA directory are: secondary audio streams with PIDs from "0x1A00" to "0x1A1F"; 32 Out_of_MUX Secondary video streams with PIDs from "0x1B00" to "0x1B1F"; 32 PG streams with PIDs from "0x1200" to "0x121F"; and 32 IG streams with PIDs from "0x1400" to "0x141F". As in the secondary video stream shown in FIG. 23, a Secondary video stream that is multiplexed with an AV stream other than the primary video stream is called "Out_of_MUX Secondary video stream". Not limited to the Secondary video streams, in general, an elementary stream to be multiplexed with an AV stream other than the Primary video stream is called "Out_of_MUX stream".

FIG. 24 shows a PID assignment map of the elementary streams multiplexed into the AV stream to be stored in the BUDA directory. The left-hand column of the PID assignment map indicates a plurality of ranges in which the PID values fall. The right-hand column of the PID assignment map indicates the elementary streams that are assigned to the respective ranges. From the PID assignment map shown in FIG. 24, the following will be understood: the range of PID value "0x0100" is assigned to program_map; the range of PID value "0x1001" is assigned to PCR; the range of PID value "0x1200" to "0x121F" is assigned to the PG streams; the range of PID values "0x1400" to "0x141F" is assigned to IG streams; the range of PID values "0x1A00" to "0x1A1F" is assigned to the secondary audio streams, the range of PID values "0x1B00" to "0x1B1F" is assigned to the secondary video streams.

<Primary Video Stream>

The Primary video stream is a stream that constitutes a main body of a movie, and is composed of picture data of SD images of 720×480 format and HD images of 1920×1080 format. The available formats of the video streams include VC-1, MPEG4-AVC, and MPEG2-Video. In the MPEG4-AVC video streams, time stamps such as PTS and DTS are attached to the IDR-Pictures, I-Pictures, P-Pictures, and B-Pictures, and the playback control is performed in units of the Pictures. Each portion of a video stream that has the PTS and DTS and is used as a unit in the playback control is called "video presentation unit".

<Secondary Video Stream>

The secondary video stream is a stream that constitutes a commentary or the like of a movie work. The Picture-in-Picture playback can be executed by combining the playback image of the Secondary video stream with the playback image of the Primary video stream. The available formats of the video streams include VC-1, MPEG4-AVC, and MPEG2-Video, and thus each video secondary stream has units each called "video presentation unit".

<Primary Audio Stream>

The Primary audio stream is a stream that represents the main audio of the movie. The available formats of the Primary audio stream include LPCM, DTS-HD, DD/DD+, and DD/MLP. Time stamps are attached to the audio frames constituting the audio streams, and the playback control is performed in units of the audio frames. Each portion of an audio stream that has the time stamp and is used as a unit in the playback control is called "audio presentation unit".

<Secondary Audio Stream>

The Secondary audio stream is an audio stream that represents the sub-audio of the movie, and is not recorded on the MoDESTxx/BDMV directory.

<PG Stream>

The PG stream is a graphics stream representing the subtitle for a different language. There are as many streams as languages provided for the movie work, such as English, Japanese, and French. The PG stream is composed of functional segments: PCS (Presentation Control Segment); PDS (Pallet Define Segment); WDS (Window Define Segment); and ODS (Object Define Segment). The ODS is a functional segment for defining a graphics object representing the subtitles.

The WDS is a functional segment for defining the bit amount of a graphics object on the screen. The PDS is a functional segment for defining the colors of a graphics object in the drawing. The PCS is a functional segment for defining the page control in displaying the subtitle. The page control includes Cut-In/Out, Fade-In/Out, Color Change, Scroll, and Wipe-In/Out. With use of these, it is possible to achieve various display effects. For example, a subtitle can be faded out while another subtitle is displayed.

This concludes the description of the AV stream stored in the BUDA directory.

The following now describes the details of the AV playback unit 24 according to the present embodiment.

Figure 25:
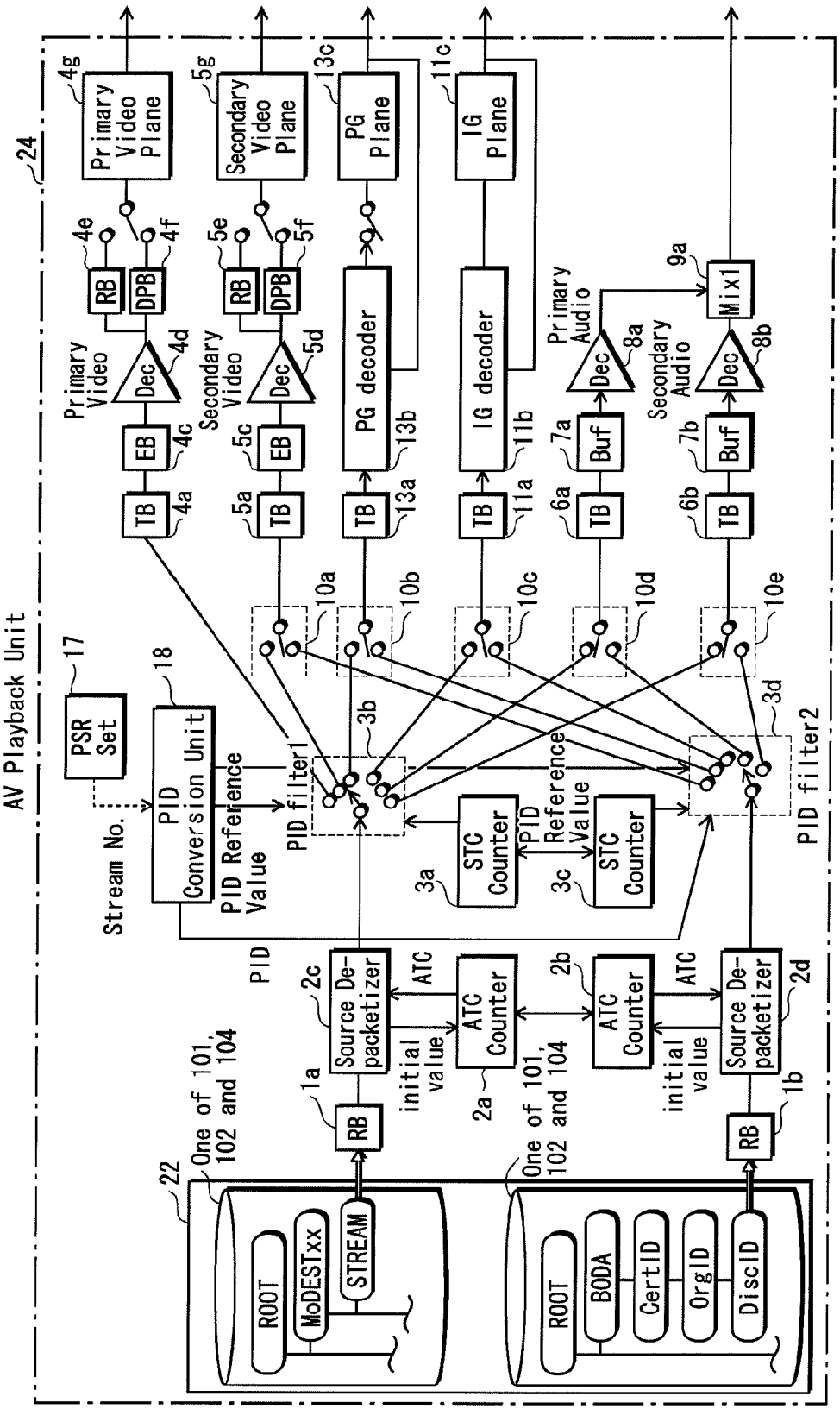
FIG. 25 shows the internal structure of an AV playback unit 24.

FIG. 25 shows the internal structure of the AV playback unit 24. As shown in the figure, the AV playback unit 24 is composed of: read buffers 1*a* and 1*b*; an ATC counters 2*a* and 2*b*; source depacketizers 2*c* and 2*d*; STC counters 3*a* and 3*c*; PID filters 3*b* and 3*d*; a transport buffer (TB) 4*a*; an elementary buffer (EB) 4*c*; a video decoder 4*d*; a re-order buffer 4*e*; a decoded picture buffer 4*f*; a video plane 4*g*; a transport buffer (TB) 5*a*; an elementary buffer (EB) 5*c*; a video decoder 5*d*; a re-order buffer 5*e*; a decoded picture buffer 5*f*; a video plane 5*g*; buffers 6*a* and 6*b*; buffers 7*a* and 7*b*; audio decoders 8*a* and 8*b*; a mixer 9*a*; switches 10*a*, 10*b*, 10*c*, 10*d* and 10*e*; a transport buffer (TB) 11*a*; an interactive graphics decoder 11*b*; an interactive graphics plane 11*c*; a transport buffer (TB) 13*a*; a presentation graphics decoder 13*b*; and a presentation graphics plane 13*c*. Note that the output stage of the playback device 103 is not illustrated in FIG. 25 and described later with reference to another figure showing the internal structure thereof.

The read buffer (RB) 1*a* accumulates source packet sequences read from the MoDESTxx/BDMV directory.

The read buffer (RB) 1*b* accumulates source packet sequences read from the BUDA directory.

The ATC counter 2*a* is reset upon receipt of an ATS of the first source packet in the playback section from among the source packets constituting the MoDESTxx/BDMV directory. The ATC counter 2*a* subsequently outputs ATCs to the source depacketizer 2*a*.

The ATC counter 2*b* is reset upon receipt of an ATS of the first source packet in the playback section from among the source packets constituting the AV stream stored in the BUDA directory. The ATC counter 2*a* subsequently outputs ATCs to the source depacketizer 2*b*.

The source depacketizer 2*c* extracts TS packets from source packets constituting the AV stream stored in the MoDESTxx/BDMV directory and sends out the TS packets. At the sending, the source depacketizer 2*d* adjusts the input timing to the decoder according to an ATS of each TS packet. To be more specific, the source depacketizer 2*c* sequentially transfers the respective TS packets to the PID filter 3*a* at TS_Recording_Rate, each at the instant when the value of the ATC generated by the ATC counter 2*a* reaches the ATS value of that specific source packet.

The source depacketizer 2*d* extracts TS packets from source packets constituting the AV stream stored in the BUDA directory and sends out the TS packets. At the sending, the source depacketizer 2*d* adjusts the input timing to the decoder according to an ATS of each TS packet. To be more specific, the source depacketizer 2*d* sequentially transfers the respective TS packets to the PID filter 3*b* at TS_Recording_Rate, each at the instant when the value of the ATC generated by the ATC counter 2*b* reaches the ATS value of that specific source packet.

The STC counter 3*a* is reset upon receipt of a PCR of the AV stream stored in the MoDESTxx/BDMV directory and outputs an STC. The PID filter 3*a* performs demultiplexing with reference to this STC. The PID filter 3*b* is a demultiplexer for AV streams stored in the MoDESTxx/BDMV directory and outputs, among source packets output from the source depacketizer 2*a*, ones having given PID reference values to the video decoder 8*b*, the interactive graphics decoder 11*b*, and the presentation graphics decoder 13*b*. The elementary streams input to each decoder after being passed through the PID filter 3*a* are subjected to decoding and playback based on the PCR of the AV stream stored in the MoDESTxx/BDMV directory.

The STC counter 3*c* is reset upon receipt of a PCR of the AV stream stored in the BUDA directory and outputs an STC.

The PID filter 3*d* is a demultiplexer for the AV stream stored in the BUDA directory and outputs, among source packets output from the source depacketizer 2*b*, ones having given PID reference values to the audio decoder 4*d*, the video decoder 5d, the audio decoder 8a, the interactive graphics decoder 11b, and the presentation graphics decoder 13b. Thus, the elementary streams input to each decoder after being passed through the PID filter 3b are subjected to decoding and playback based on the PCR of the AV stream stored in the BUDA directory.

The transport buffer (TB) 4a is a buffer for temporarily storing TS packets carrying the primary video stream stored in the MoDESTxx/BDMV directory output from the PID filter 3b.

The Elementary Buffer (EB) 4c is a buffer for temporarily storing coded pictures (I pictures, B pictures, and P pictures).

The decoder (Dec) 4d acquires multiple frame images by decoding individual pictures constituting the primary video stored in the MoDESTxx/BDMV directory at every predetermined decoding time period (DTS) and writes the frame images to the video plane 4g.

The re-order buffer 4e is a buffer for changing the order of decoded pictures from the decoded order to the order for display.

The decoded picture buffer 4f is a buffer for storing uncompressed pictures acquired through the decoding process by the decoder 4d.

The primary video plane 4g is a memory area for storing pixel data that is worth one picture of the primary video. The pixel data is represented by a 16-bit YUV value, and the video plane 4g stores therein pixel data at a resolution of 1920×1080.

The transport buffer (TB) 5a is a buffer for temporarily storing TS packets carrying the secondary video stream output from the PID filter 3b.

The elementary buffer (EB) 5c is a buffer for temporarily storing coded pictures (I pictures, B pictures, and P pictures).

The decoder (Dec) 5d acquires multiple frame images by decoding individual pictures constituting the secondary video at every predetermined decoding time period (DTS) and writes the frame images to the video plane 5g.

The re-order buffer 5e is a buffer for changing the order of decoded pictures from the decoded order to the order for display.

The decoded picture buffer 5f is a buffer for storing uncompressed pictures acquired through the decoding process by the decoder 5d.

The secondary video plane 5g is a memory area for storing pixel data that is worth one picture of the secondary video. The pixel data is represented by a 16-bit YUV value, and the secondary video plane stores therein pixel data at a resolution of 1920×1080.

The buffer 6a is a buffer for temporarily storing TS packets carrying the primary audio stream output from the demultiplexer 3a and for supplying the TS packets to the audio decoder 8a in the in a first-in first-out manner.

The buffer 6b is a buffer for temporarily storing TS packets carrying the secondary audio stream output from the demultiplexer 3b and for supplying the TS packets to the audio decoder 8b in the in a first-in first-out manner.

The audio decoder 8a converts TS packets stored in the buffer 6a into PES packets, decodes the PES packets to acquire uncompressed LPCM audio data, and outputs the acquired audio data. This achieves a digital output of the primary audio stream.

The audio decoder 8b converts TS packets stored in the buffer 6b into PES packets, decodes the PES packets to acquire uncompressed LPCM audio data, and outputs the acquired audio data. This achieves a digital output of the secondary audio stream.

The mixer 9a performs a mixing of the LPCM digital audio output from the audio decoder 8a with the LPCM digital audio output from the audio decoder 8b.

The switch 10a is used to selectively supply either TS packets read from the MoDESTxx/BDMV directory or from the BUDA directory to the secondary video decoder 5d.

The switch 10b is used to selectively supply either TS packets read from the MoDESTxx/BDMV or from the BUDA directory to the presentation graphics decoder 13b.

The switch 10c is used to selectively supply either TS packets read from the MoDESTxx/BDMV directory or from the BUDA directory to the Interactive Graphics decoder 11b.

The switch 10d is used to selectively supply, to the audio decoder 8a, either TS packets carrying the primary audio stream demultiplexed by the demultiplexer 3d or TS packets carrying the primary audio stream demultiplexed by the demultiplexer 3b.

The switch 10e is used to selectively supply, to the audio decoder 8b, either TS packets carrying the secondary audio stream demultiplexed by the PID filter 3d or TS packets of the secondary audio stream demultiplexed by the PID filter 3b.

The transport buffer (TB) 11a is a buffer for temporarily storing TS packets belonging to the IG stream.

The interactive graphics (IG) decoder 11b obtains uncompressed graphics by decoding the IG stream read from the MoDESTxx/BDMV directory or the BUDA directory, and writes the obtained uncompressed graphics to the IG plane 11c.

The interactive graphics (IG) plane 11c is a plane on which pixel data constituting the uncompressed graphics obtained as a result of decoding by the IG decoder 11b is written.

The transport buffer (TB) 13a temporarily stores TS packets belonging to the PG stream.

The presentation graphics (PG) decoder 13b decodes a PG stream read from the MoDESTxx/BDMV directory or the BUDA directory and writes the uncompressed graphics to the presentation graphics plane 13c. Through the decoding by the PG decoder 13b, the subtitles appear on the screen.

The presentation graphics (PG) plane 13c is a memory having an area of one screen, and stores one screen of uncompressed graphics.

The PSR set 17 is a set of registers provided within the playback device 103. The set of registers include 64 player setting/status registers (PSRs) and 4,096 general-purpose registers (GPRs). Among the Player Setting/Status Registers, the values (PSR) set in PSR4 to PSR8 are used to represent the current playback point.

Figure 26:
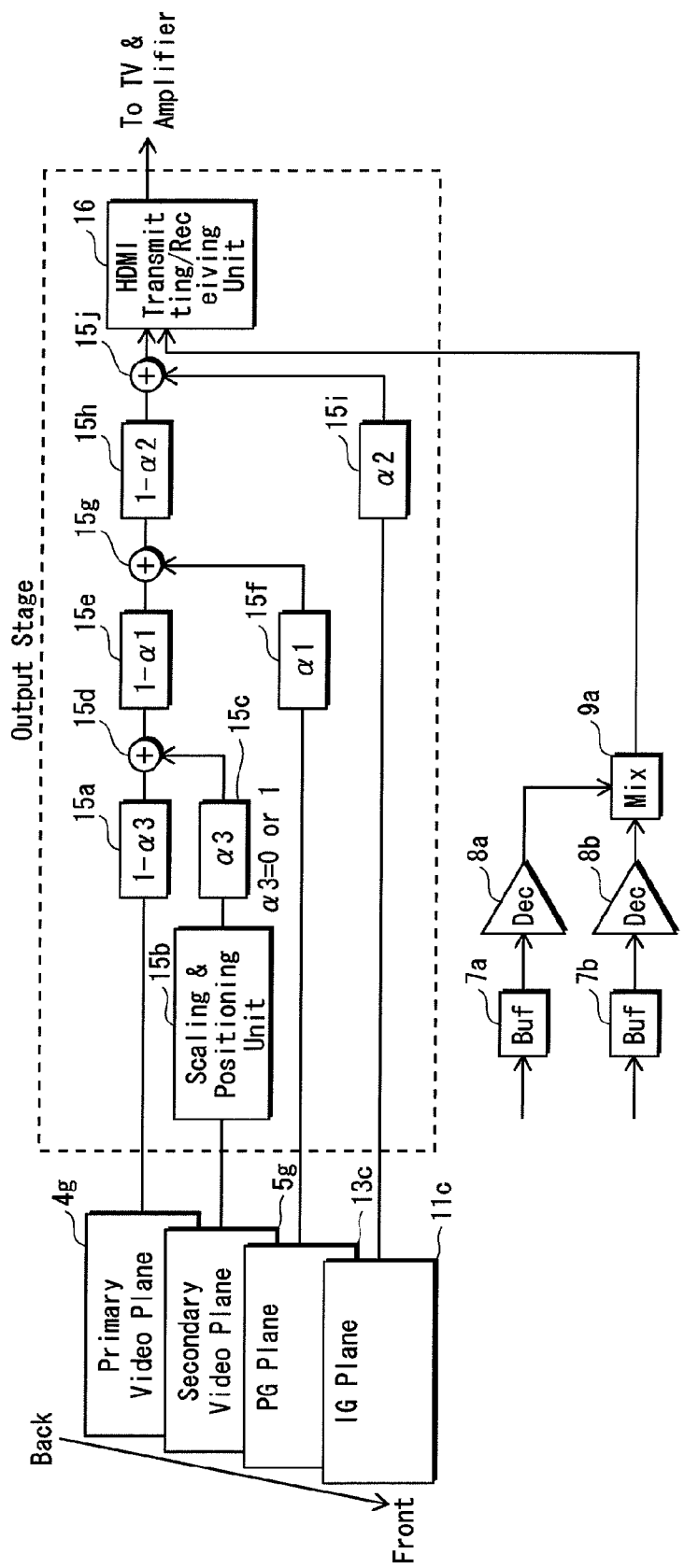
FIG. 26 is a view showing the structure of the output stage of the playback device 103.

This concludes the description of the internal structure of the AV playback unit 24. The following now describes the internal structure of the output stage of the AV playback unit 24. FIG. 26 is a view showing the structure of the output stage of the playback device 103. As shown in the figure, the output stage of the AV playback unit 24 is composed of: a 1-α3 multiplication unit 15a; a scaling and positioning unit 15b; an α3 multiplication unit 15c; an addition unit 15d; a 1-α1 multiplication unit 15e; an α1 multiplication unit 15f; an addition unit 15g; a 1-α2 multiplication unit 15h; an α2 multiplication unit 15i; an addition unit 15j and an HDMI transmission/reception unit 16.

The scaling and positioning unit 15b enlarges or minimizes (i.e. scaling) an uncompressed digital picture stored on the video plane 5g, and changes the display position (i.e. positioning). The enlargement and minimization are performed based on PiP_scale of the metadata, and the change of the position is performed based on PiP_horizontal_position and PiP_vertical_position.

The α3 multiplication unit 15c multiplies, by a transmittance of α3, the luminance of pixels constituting the uncompressed picture on which scaling and positioning have been performed by the scaling and positioning unit 15b.

The addition unit 15d combines the uncompressed digital picture created by the α3 multiplication unit 15c multiplying the luminance of each pixel by a transmittance of α3 and the uncompressed digital picture created by the 1-α3 multiplication unit 15a multiplying the luminance of each pixel by a transmittance of 1-α3, to thereby acquire a composite picture.

The 1-α1 multiplication unit 15e multiplies, by a transmittance of 1-α1, the luminance of pixels constituting the composite digital picture created by the addition unit 15d.

The α1 multiplication unit 15f multiplies, by a transmittance of α1, the luminance of pixels constituting compressed graphics stored in the presentation graphics plane 13c.

The addition unit 15g combines the uncompressed digital picture created by the 1-α1 multiplication unit 15e multiplying the luminance of each pixel by a transmittance of 1-α1 and the uncompressed graphics created by the α1 multiplication unit 15f multiplying the luminance of each pixel by a transmittance of α1, to thereby acquire a composite picture.

The 1-α2 multiplication unit 15h multiplies, by a transmittance of 1-α2, the luminance of pixels constituting the digital picture created by the addition unit 15g.

The α2 multiplication unit 15i multiplies, by a transmittance of α2, the luminance of pixels constituting uncompressed graphics stored in the Interactive Graphics plane 11c.

The addition unit 15j combines the uncompressed digital picture created by the 1-α2 multiplication unit 15h multiplying the luminance of each pixel by a transmittance of 1-α2 and the uncompressed graphics created by the α2 multiplication unit 15i multiplying the luminance of each pixel by a transmittance of α2, thereby to acquire a composite picture.

The HDMI transmitting/receiving unit 16 receives, from another device connected via an HDMI (High Definition Multimedia Interface), information regarding the device, and transmits, to the device connected via the HDMI, digital uncompressed video acquired by the composition of the addition unit 15j together with audio data combined by the mixer 9a.

To execute playback the virtual package, the BUDA directory needs to be provided in a suitable recording medium, depending on which of the elementary streams described above is to be played.

In the case where a content to be played via the virtual package is a picture-in-picture content, it is necessary to combine a primary video stream with a secondary video stream. The primary video stream is in the 1920×1080 format corresponding to the resolution of HD images. The secondary video stream is in the 720×480 format having a resolution corresponding to SD images. To meet this end, a high bandwidth is required for reading from the MoDESTxx/BDMV directory and from the BUDA directory. It is therefore desirable to provide the BUDA directory on a recording medium that is different from the removable medium having the MoDESTxx directory. Specifically, in the case where the MoDESTxx/BDMV directory is provided on either of the removable mediums 100 and 101, the BUDA directory is preferably provided on the built-in medium 104. In the case where the removable mediums are BD-R and BD-RE, the BUDA directory may be provided on a semiconductor memory card.

Similarly, in the case where a content to be played via the virtual package is a stereoscopic content, it is necessary to combine a primary video stream for left eye and a secondary video stream for right eye. The primary video stream is in the 1920×1080 format having a resolution corresponding to SD images. The secondary video stream is in the 1920×1080 format also corresponding to HD images. To meet this end, a higher bandwidth is required for reading from the MoDESTxx/BDMV directory and from the BUDA directory. It is therefore desirable to provide the BUDA directory on a recording medium that is different from the removable medium 100 or 101 having the MoDESTxx directory, i.e., it is desirable to provide the BUDA directory on the built-in medium 104.

On the other hand, in the case where a content to be played via a virtual package is a combination of an AV stream stored in the MoDESTxx/BDMV directory with one or more of Presentation Graphics stream, Interactive Graphics stream, secondary audio stream stored in the BUDA directory, the bandwidth is not required to be as high as that required in the former cases. It is therefore applicable to provide the BUDA directory on the same removable medium as the MoDESTxx directory.

(Supplementary Notes)

Up to now, the present invention has been described through the best modes or embodiments for carrying the invention that the Applicant recognize as of now. However, further improvements or changes can be added regarding the following technical topics. Whether to select any of the embodiments or the improvements and changes to implement the invention is optional and may be determined by the subjectivity of the implementer.

It should be appreciated that the examples described above are illustrative only and are not intended to limit the scope of the invention. Various other applications may be made by those skilled in the art.

(Programming Language Application Range)

It is described in the embodiments that Java™ language is used as the virtual machine programming language. However, not limited to Java™, other programming languages, such as B-Shell, Perl Script, and ECMA Script, which are used in UNIX™ OS or the like, are available.

(Real-Time Recording by Recording Device)

The recording device 102 may be a household BD recorder, BD camcorder, or digital cameral. In such a case, the root/BDMV directory and the MoDESTxx/BDMV directory may be created during real-time recording by the recording device 102. In this case, the AV streams may be transport streams that are obtained by the recording device by self-encoding the analog input signals by the real time encoding, or may be transport streams that are obtained by the recording device by partializing the digitally input transport streams.

In the real-time recording, the recording device performs the process of generating the Clip information and PlayList information on the memory, as well as performing the process of recording an AV stream. More specifically, the recording device generates the Clip information and PlayList information, that are described in the embodiments, on the memory. After recording the AV stream, the recording device writes the generated Clip information and PlayList information onto the recording medium. With this structure, it is possible to generate, without the need to use an authoring system, the Clip information and PlayList information that are described in the embodiments by using a home recording device or a personal computer that is provided with the functions of the recording device. Further, the AV stream, Clip information and PlayList information generated in this way may be written onto a write-once type recording medium.

(Target of AV Playback)

The target of AV playback is not limited to the one defined for the BD-ROM, but may be any content that is composed of a digital stream, map information, and PlayList information. The digital stream is a multiplexed stream obtained by multiplexing the video stream and audio stream that have been encoded by the encoding method such as MPEG2 or MPEG4-AVC. The multiplexed digital stream is called "VOB" in the DVD Video-Recording standard.

The map information is information that indicates relationships between the address information of the access unit (referring to a playback unit that can be decoded independently) in the above-described video stream, and the playback time on the playback time axis of the video stream. The map information is called "Time Map" in the DVD Video-Recording standard.

The PlayList information is information that defines one or more playback sections each by a pair of pieces of time information, which are a start point and an end point.

(Realization of Control Procedure)

Both the control procedures explained in the above-described embodiments using the flowcharts and the control procedures of the functional components explained in the above-described embodiments satisfy the requirements for the "program invention", since the above-mentioned control procedures are realized concretely by using the hardware resources and are the creation of a technical idea utilizing natural laws.

Creation Process of Startup Program Constituting First Playback Title

The startup program constituting the First Playback title may be created in the following manner. First, a software developer writes, in a programming language, a source program for implementing the flowcharts or the functional components described above. When writing the source program for implementing the flowcharts or the functional components, the software developer may use class structures, variables, array variables, and calls for external functions, in accordance with the syntax of that programming language. In the program writing, a MoDESTRootChange API call and system property are used.

The resulting source program is supplied as a file to a compiler. The compiler translates the source program into an object program.

The translation performed by the compiler includes processes such as the parsing, optimization, resource allocation, and code generation. In the process of parsing, the characters and phrases, sentence structure, and meaning of the source program are analyzed and the source program is converted into an intermediate program. In the process of optimization, the intermediate program is subjected to such processes as the basic block setting, control flow analysis, and data flow analysis. In the process of resource allocation, to adapt to the instruction sets of the target processor, the variables in the intermediate program are allocated to the register or memory of the target processor. In the process of code generation, each intermediate instruction in the intermediate program is converted into a program code, and an object program is obtained.

The object program created in the above manner is composed of one or more program codes that cause the computer to execute each step in the flowchart or each procedure of the functional components. There are various types of program codes such as the native code of the processor and JAVA™ bytecode. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like to embody the respective steps shown in the flowcharts.

After the object program is generated, the programmer activates a linker. The linker allocates the memory spaces to the object programs and the related library programs, and links them together to generate a load module. The generated load module is based on the presumption that it is read by a computer and causes the computer to execute the procedures indicated in the flowcharts and the procedures of the functional components. In this way, the startup program constituting the First Playback title is created.

<System LSI>

It is desirable to implement as one system LSI parts of the hardware of the playback device 103 that are mainly composed of logical elements, excluding mechanical structural elements (the BD drive, removable medium drive, built-in medium drive) and the structural elements (video plane, and graphics plane) that are implemented on a high-capacity memory. This is because the parts mainly composed of logical elements can be integrated with high density.

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback device 103.

Such a system LSI can be embedded into various types of devices that can play back images, such as a television, game machine, personal computer, one-segment mobile phone, as well as into the playback device 103. The system LSI thus greatly broadens the use of the present invention.

When an elementary buffer, video decoder, audio decoder, and graphics decoder are integrated into a system LSI, it is desirable that the system LSI conforms to the Uniphier architecture.

A system LSI conforming to the Uniphier architecture includes the following circuit blocks.

Data Parallel Processor (DPP)

The DPP is an SIMD-type processor where a plurality of elemental processors perform a same operation. The DPP achieves a parallel decoding of a plurality of pixels constituting a picture by causing operating units, respectively embedded in the elemental processors, to operate simultaneously by one instruction.

Instruction Parallel Processor (IPP)

The IPP includes: a local memory controller that is composed of instruction RAM, an instruction cache, data RAM, and a data cache; a processing unit that is composed of an instruction fetch unit, a decoder, an execution unit, and a register file; and a virtual multi processing unit that causes the processing unit to execute a parallel execution of a plurality of applications.

MPU Block

The MPU block is composed of: peripheral circuits such as an ARM core, an external bus interface (Bus Control Unit: BCU), a DMA controller, a timer, a vector interrupt controller; and peripheral interfaces such as UART, GPIO (General Purpose Input Output), and a sync serial interface.

Stream I/O Block

The stream I/O block performs data input/output with the drive device, removable medium, and SD memory card drive device which are connected onto the external busses via the USB interface and the ATA packet interface.

AV I/O Block

The AV I/O block, which is composed of audio input/output, video input/output, and OSD controller, performs data input/output with the television and the AV amplifier.

Memory Control Block

The memory control block performs reading and writing from/to the SD-RAM connected therewith via the external buses. The memory control block is composed of an internal bus connection unit for controlling internal connection between blocks, an access control unit for transferring data with the SD-RAM connected to outside of the system LSI, and an access schedule unit for adjusting requests from the blocks to access the SD-RAM.

The following describes a detailed production procedure. First, a circuit diagram of a part to be the system LSI is drawn, based on the drawings that show structures of the embodiments. And then the constituent elements of the target structure are realized using circuit elements, ICs, or LSIs.

As the constituent elements are realized, buses connecting between the circuit elements, ICs, or LSIs, peripheral circuits, interfaces with external entities and the like are defined. Further, the connection lines, power lines, ground lines, clock signals and the like are defined. For these definitions, the operation timings of the constituent elements are adjusted by taking into consideration the LSI specifications, and bandwidths necessary for the constituent elements are secured. With other necessary adjustments, the circuit diagram is completed.

After the circuit diagram is completed, the implementation design is performed. The implementation design is a work for creating a board layout by determining how to arrange the parts (circuit elements, ICs, LSIs) of the circuit and the connection lines onto the board.

After the implementation design is performed and the board layout is created, the results of the implementation design are converted into CAM data, and the CAM data is output to equipment such as an NC (Numerical Control) machine tool. The NC machine tool performs the SoC implementation or the SiP implementation. The SoC (System on Chip) implementation is a technology for printing a plurality of circuits onto a single chip. The SiP (System in Package) implementation is a technology for packaging a plurality of circuits by resin or the like. Through these processes, a system LSI of the present invention can be produced based on the internal structure of the playback device 103 described in each embodiment above.

It should be noted here that the integrated circuit generated as described above may be called IC, LSI, super LSI, ultra LSI, or the like, depending on the level of the integration.

It is also possible to achieve the system LSI by using the FPGA (Field Programmable Gate Array). In this case, a lot of logic elements are to be arranged lattice-like, and vertical and horizontal wires are connected based on the input/output combinations described in LUT (Look-Up Table), so that the hardware structure described in each embodiment can be realized. The LUT is stored in the SRAM. Note that the contents of the SRAM are erased when the power is off. Therefore, when the FPGA is used, it is necessary to define the Config information so as to write, onto the SRAM, the LUT for realizing the hardware structure described in each embodiment.

INDUSTRIAL APPLICABILITY

The present invention provides more attractive services of individual sales of contents, in good compliance with existing DVD/BD technologies, and thus highly usable for both content providers and player developers.

What is claimed is:

1. A recording medium having a hierarchical directory structure, comprising:
    a root directory;
    a default directory below the root directory;
    a service domain directory below the root directory; and
    a movie directory below the service domain directory,
    wherein the default directory contains a startup program,
    wherein the service domain directory is created at a time when an audiovisual stream is received via a Manufacturing on Demand service or an Electric Sell Through service,
    wherein the movie directory contains the audiovisual stream,
    wherein the startup program is a program to be first executed by a playback device upon loading of the recording medium to the playback device,
    wherein, when executed, the startup program causes the playback device to display a menu,
    wherein, in response to a user operation made on the menu to select the movie directory, the startup program causes the playback device to execute a root change function, and
    wherein, when executed, the root change function causes the playback device to recognize that the service domain directory, to which the selected movie directory belongs, is a virtual root directory.

2. The recording medium according to claim 1,
    wherein the root change function is executed by calling a programming interface, and
    wherein, upon an occurrence of exception handling as a result of calling the programming interface, the startup program causes the playback device to inform a user that playback of the recording medium is not supported.

3. The recording medium according to claim 1,
    wherein the root change function is executed by calling a programming interface,
    wherein the startup program judges whether or not the root change function is supported based on a system property of the playback device indicating whether or not the root change function is supported, and
    wherein, upon judging that the root change function is not supported, the startup program causes the playback device to inform a user that playback of the recording medium is not supported.

4. The recording medium according to claim 1,
    wherein the movie directory contains a playback control program for playback control,
    wherein the playback control program instructs the playback device to execute playback of the audiovisual stream, and defines a procedure to be executed by the playback device in response to a user operation to stop playback, and
    wherein the procedure to be executed in response to the user operation to stop playback is to re-display the menu for selecting the movie directory, if the playback device supports the root change function.

5. The recording medium according to claim 1,
wherein the movie directory contains a playback control program for playback control,
wherein the playback control program instructs the playback device to execute playback of a virtual package,
wherein the virtual package is a combination of data stored in the movie directory and data stored in another directory residing on the recording medium or on another recording medium, and
wherein the playback control program instructs the playback device to create the virtual package, by using a file path in which the service domain directory to which the selected movie directory belongs is specified as the virtual root directory.

6. A recording device comprising:
a processor;
a creating unit that creates, in a recording medium, (i) a default directory below a root directory, (ii) a service domain directory below the root directory, and (iii) a movie directory below the service domain directory at a time when an audiovisual stream is received via a Manufacturing on Demand service or an Electric Sell Through service;
an acquiring unit that acquires the audiovisual stream; and
a write unit that writes, using the processor, a startup program into the default directory and the audiovisual stream into the movie directory located below the service domain directory,
wherein the startup program is a program to be first executed by a playback device upon loading of the recording medium to the playback device,
wherein, when executed, the startup program causes the playback device to display a menu,
wherein, in response to a user operation made on the menu to select the movie directory, the startup program causes the playback device to execute a root change function, and
wherein, when executed, the root change function causes the playback device to recognize that the service domain directory, to which the selected movie directory belongs, is a virtual root directory.

7. The recording device according to claim 6,
wherein the service domain directory is a first service domain directory that is created at a time when a user first receives the Manufacturing on Demand service or the Electric Sell Through service, and
wherein the write unit creates, without updating the default directory, another service domain directory for each service subsequently received by the user.

8. The recording device according to claim 6,
wherein the write unit does not update the startup program contained in the default directory when the user subsequently receives the Manufacturing on Demand service or the Electric Sell Through service.

9. A playback device for reading an audiovisual stream from a recording medium to execute playback of the audiovisual stream, the playback device comprising:
a processor;
a selecting unit that executes, upon loading of the recording medium to the playback device, a startup program to display a menu and to receive a user operation made on the menu to select a movie directory; and
a playback unit that executes, using the processor, playback of the audiovisual stream contained in the selected movie directory by recognizing that a service domain directory, to which the selected movie directory belongs, is a virtual root directory,
wherein the recording medium has a hierarchical directory structure which includes (i) a root directory, (ii) a default directory below the root directory, (iii) the service domain directory below the root directory, and (iv) the movie directory below the service domain directory,
wherein the default directory contains the startup program,
wherein the service domain directory is created at a time when an audiovisual stream is received via a Manufacturing on Demand service or an Electric Sell Through service, and
wherein the movie directory contains the audiovisual stream.

10. The playback device according to claim 9,
wherein the playback unit executes playback of a virtual package,
wherein the virtual package is a combination of data stored in the movie directory and data stored in another directory residing on the recording medium or on another recording medium, and
wherein the movie directory contains a playback control program, the playback control program instructing the playback device to create the virtual package by using a file path, in which the service domain directory to which the selected movie directory belongs is specified, as the virtual root directory.

11. A recording method comprising:
creating, in a recording medium, (i) a default directory below a root directory, (ii) a service domain directory below the root directory, and (iii) a movie directory below the service domain directory at a time when an audiovisual stream is received via a Manufacturing on Demand service or an Electric Sell Through service;
acquiring the audiovisual stream;
writing a startup program into the default directory; and
writing the audiovisual stream into the movie directory located below the service domain directory,
wherein the startup program is a program to be first executed by a playback device upon loading of the recording medium to the playback device,
wherein, when executed, the startup program causes the playback device to display a menu,
wherein in response to a user operation made on the menu to select the movie directory, the startup program causes the playback device to execute a root change function, and
wherein, when executed, the root change function causes the playback device to recognize that the service domain directory, to which the selected movie belongs, is a virtual root directory.

12. A playback method for reading an audiovisual stream from a recording medium and executing playback of the audiovisual stream, the playback method comprising:
executing, upon loading of the recording medium to a playback device, a startup program to display a menu and receiving a user operation made on the menu to select a movie directory; and
executing playback of the audiovisual stream contained in the selected movie directory by recognizing that a service domain directory, to which the selected movie directory belongs, is a virtual root directory,
wherein the recording medium has a hierarchical directory structure which includes (i) a root directory, (ii) a default directory below the root directory, (iii) the service domain directory below the root directory, and (iv) the movie directory below the service domain directory,
wherein the default directory contains the startup program, wherein the service domain directory is created at a time when an audiovisual stream is received via a Manufacturing on Demand service or an Electric Sell Through service, and wherein the movie directory contains the audiovisual stream.

* * * * *